(12) United States Patent
Kilian et al.

(10) Patent No.: US 11,923,881 B2
(45) Date of Patent: Mar. 5, 2024

(54) INTERFERENCE DETECTION AND SUPPRESSION IN NON-COORDINATED SYSTEMS

(71) Applicant: Fraunhofer-Gesellschaft zur Förderung der angewandten Forschung e.V., Munich (DE)

(72) Inventors: Gerd Kilian, Erlangen (DE); Josef Bernhard, Erlangen (DE); Karol Bieg, Erlangen (DE); Eberhard Gamm, Ebermannstadt (DE); Clemens Korn, Erlangen (DE); Jakob Kneissl, Erlangen (DE); Frank Obernosterer, Nuremberg (DE); Raimund Meyer, Fürth (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 500 days.

(21) Appl. No.: 17/074,939

(22) Filed: Oct. 20, 2020

(65) Prior Publication Data

US 2021/0036727 A1   Feb. 4, 2021

Related U.S. Application Data

(63) Continuation of application No. PCT/EP2019/059939, filed on Apr. 17, 2019.

(51) Int. Cl.
*H04B 1/10* (2006.01)
*H04L 1/20* (2006.01)

(52) U.S. Cl.
CPC ............. *H04B 1/1027* (2013.01); *H04L 1/20* (2013.01)

(58) Field of Classification Search
CPC ................................ H04B 1/1027; H04B 1/20
See application file for complete search history.

(56) References Cited

U.S. PATENT DOCUMENTS

| 5,267,272 | A | 11/1993 | Cai et al. |
|---|---|---|---|
| 9,577,798 | B1 | 2/2017 | Melis et al. |
| 2004/0047324 | A1 | 3/2004 | Diener |
| 2006/0234660 | A1 | 10/2006 | Kwak |
| 2007/0002982 | A1* | 1/2007 | Heikkila ........... H04L 1/20 375/346 |

(Continued)

FOREIGN PATENT DOCUMENTS

| DE | 102011082098 B4 | 3/2013 |
|---|---|---|
| DE | 102016220886 B3 | 3/2018 |

(Continued)

OTHER PUBLICATIONS https://de.wikipedia.org/wiki/Halbwertsbreite, last accessed: Jan. 31, 2018.
https://de.wikipedia.org/wiki/Normalverteilung, last accessed: May 2, 2018.
https://de.wikipedia.org/wiki-Histogramm, last accessed Oct. 23, 2018.

(Continued)

*Primary Examiner* — Curtis B Odom
(74) *Attorney, Agent, or Firm* — Perkins Coie LLP; Michael A. Glenn

(57) ABSTRACT

A data receiver is configured to receive a signal, the signal comprising interferences of an interference-infested transmission channel, the data receiver being configured to form a histogram of receive information of a signal portion of the received signal and to determine mean receive information and/or a noise measure from the histogram.

15 Claims, 41 Drawing Sheets

(56) References Cited

U.S. PATENT DOCUMENTS

| | | | |
|---|---|---|---|
| 2013/0045004 | A1 | 2/2013 | Geyer |
| 2014/0176341 | A1 | 6/2014 | Bernhard et al. |
| 2014/0308034 | A1 | 10/2014 | Chung et al. |
| 2014/0325319 | A1 | 10/2014 | Cai et al. |
| 2015/0347351 | A1 | 12/2015 | Kazemi et al. |
| 2019/0288741 | A1 | 9/2019 | Kilian et al. |

FOREIGN PATENT DOCUMENTS

| | | | |
|---|---|---|---|
| JP | 2002290344 A | | 10/2002 |
| WO | 03081925 A1 | | 10/2003 |
| WO | 2012032376 A1 | | 3/2012 |
| WO | WO2015053947 | | 4/2015 |
| WO | 2015128385 A1 | | 9/2015 |

OTHER PUBLICATIONS

Friedrichs, B., et al., "Kanalcodierung. Grundlagen und Anwendungen in modernen Kommunikationssystemen", Springer-Verlag, 1994, 1994.

Kilian, G., et al., "Improved coverage for low-power telemetry systems using telegram splitting", In Proceedings of 2013 European Conference, on Smart Objects, Systems and Technologies (SmartSysTech), Erlangen,/Nuremberg, Germany, XP-002763748, ISBN 978-3-8007-3521-1, 6 pages., 2013.

Kilian, G., et al., "Increasing Transmission Reliability for Telemetry Systems Using Telegram Splitting", IEEE Transactions on Communications, vol. 63, No. 3, pp. 949-961, Mar. 2015., 2015.

Lohninger, Hans, Savitzky-Golay-Filter-Koeffizienten. Grundlagen der Statistik, Mar. 19, 2011, 2011.

\* cited by examiner

US 11,923,881 B2

INTERFERENCE DETECTION AND SUPPRESSION IN NON-COORDINATED SYSTEMS

CROSS-REFERENCE TO RELATED APPLICATIONS

This application is a continuation of copending International Application No. PCT/EP2019/059939, filed Apr. 17, 2019, which is incorporated herein by reference in its entirety, and additionally claims priority from German Application No. 10 2018 206 162.9, filed Apr. 20, 2018, which is also incorporated herein by reference in its entirety.

BACKGROUND OF THE INVENTION

Embodiments refer to a data receiver and, in particular, to a data receiver for receiving a signal comprising interferences of an interference-infested channel. Further embodiments refer to a method for receiving a signal and, in particular, to a method for receiving a signal comprising interferences of an interference-infested channel. Some embodiments refer to interference detection and suppression in non-coordinated systems.

A telegram splitting-based sensor network is known from DE 10 2011 082 098 B4, in which battery-operated sensor nodes divide a data packet (or telegram) to be transmitted into a plurality of partial data packets, each of which is shorter than the data packet, and transmit them distributed in time and/or frequency according to a jump pattern, wherein the plurality of partial data packets are each shorter than the data packet. Between the partial data packets, there may be transmission pauses in which no transmission takes place.

In a typical sensor network, several 100,000 sensor nodes can be covered by a single base station. Since the sensor nodes have only very small batteries, coordination of the transfers is hardly possible in most cases. The telegram splitting method provides very high transfer security.

During the simultaneous or time-overlapping emission of a plurality of data packets divided into partial data packets and/or the simultaneous transfer of data packets from other data transmitters of other radio systems over an uncoordinated channel (e.g. ALOHA or slotted-ALOHA access method), e.g. in a non-exclusive band (e.g. ISM band), interference between transfers of different data transmitters, e.g. of the same radio system or of different radio systems, may occur during data transfer.

During this disturbance, the transferred data (symbols) are corrupted. This disturbed data can be recovered with the help of a forward error correction (FEC), wherein the performance of forward error correction depends strongly on whether it is known which data are disturbed.

The present invention is based on the object of improving the performance of a receiver-side recovery of data transferred over an interference-infested channel.

SUMMARY

An embodiment may have a data receiver, wherein the data receiver is configured to receive a signal, the signal having interferences of an interference-infested transmission channel, wherein the data receiver is configured to form a histogram of receive information of a signal portion of the received signal and to determine mean receive information and/or a noise measure from the histogram, wherein the data receiver is configured to iteratively adjust a resolution of the histogram by restricting the upper and/or lower limits of the histogram until a half-width of a distribution of receive information of the histogram occupies a predetermined region in the histogram.

Another embodiment may have a data receiver, wherein the data receiver is configured to receive a signal, the signal having interferences of an interference-infested transmission channel, wherein the data receiver is configured to form a histogram of receive information of a signal portion of the received signal and to determine mean receive information and/or a noise measure from the histogram, wherein the receive information of the signal portion are amplitude information, wherein the data receiver is configured to gain the amplitude information by means of a non-linear function.

Another embodiment may have a data receiver, wherein the data receiver is configured to receive a signal and scale the same with an averaged impulse response to obtain normalized received data symbols, the signal having interferences of an interference-infested transmission channel, the signal having at least one data packet or partial data packet which is transferred over the interference-infested channel, wherein the data receiver is configured to determine reliability information for the received data symbols of the at least one data packet or partial data packet based on a first symbol-based noise measure estimation and/or a second symbol-based noise measure estimation, wherein the data receiver is configured to, in the case of the first symbol-based noise measure estimation, determine a noise measure of a subset of the received data symbols of the at least one data packet or partial data packet, the subset having at least two symbols, wherein the data receiver is configured to, in the case of the second symbol-based noise measure estimation, determine a noise measure symbol by symbol for the received data symbols of the at least one data packet or partial data packet.

Another embodiment may have a data receiver, wherein the data receiver is configured to receive a signal, the signal having interferences of an interference-infested transmission channel, wherein the data receiver is configured to form a combined histogram of receive information of at least two different signal portions of the received signal, wherein the data receiver is configured to determine noise power information from the combined histogram, wherein the data receiver is configured to form at least two histograms of receive information of the two different signal portions of the received signal, wherein the data receiver is configured to combine the at least two histograms bin by bin to obtain the combined histogram.

Still another embodiment may have a data receiver, wherein the data receiver is configured to receive a signal, the signal having interferences of an interference-infested transmission channel, wherein the data receiver is configured to divide the signal into a plurality of subband signals, the plurality of subband signals having different subbands of the signal, wherein the data receiver is configured to determine power information of samples or symbols of an equal temporal signal portion of the plurality of subband signals, wherein the data receiver is configured to perform summation of the respective power information for each sample instant of the signal portion to obtain a set of sum power information for the signal portion, and wherein the data receiver is configured to calculate a minimum of the respective power information for each sample instant of the signal portion to obtain a set of minimum power information for the signal portion, wherein the data receiver is configured to form a sum histogram of the set of sum power information, wherein the data receiver is configured to form a minimum histogram of the set of minimum power information.

According to another embodiment, a method for receiving a signal, the signal having interferences of an interference-infested transmission channel, may have the steps of: forming a histogram of a signal portion of the received signal, and determining mean receive information and/or a noise measure from the histogram, wherein, when forming the histogram, a resolution of the histogram is iteratively adjusted by restricting the upper and/or lower limits of the histogram until a half-width of a distribution of receive information of the histogram occupies a predetermined region in the histogram.

According to another embodiment, a method for receiving a signal, the signal having interferences of an interference-infested transmission channel, may have the steps of: forming a histogram of a signal portion of the received signal, and determining mean receive information and/or a noise measure from the histogram, wherein the receive information of the signal portion are amplitude information, wherein the amplitude information are gained by means of a non-linear function.

According to another embodiment, a method for receiving a signal, the signal having interferences of an interference-infested transmission channel, the signal having at least one data packet or partial data packet which is transferred over the interference-infested channel, may have the steps of: scaling the signal with an averaged impulse response to obtain normalized received data symbols, determining reliability information for the received data symbols of the at least one data packet or partial data packet based on a first symbol-based noise measure estimation and/or a second symbol-based noise measure estimation, wherein, in the case of the first symbol-based noise measure estimation, a noise measure of a subset of the received data symbols of the at least one data packet or partial data packet is determined, the subset having at least two symbols, wherein, in the case of the second symbol-based noise measure estimation, a noise measure is determined symbol by symbol for the received data symbols of the at least one data packet or partial data packet.

According to another embodiment, a method for receiving a signal, the signal having interferences of an interference-infested transmission channel, may have the steps of: forming at least two histograms of reception power information of two different signal portions of the received signal, combining the at least two histograms bin by bin to obtain a combined histogram, determining noise power information from the combined histogram, wherein at least two histograms of receive information of the two different signal portions of the received signal are formed, wherein the at least two histograms are combined bin by bin to obtain the combined histogram.

According to another embodiment, a method for receiving a signal, the signal having interferences of an interference-infested transmission channel, may have the steps of: dividing the signal into a plurality of subband signals, the plurality of subband signals having different subbands of the signal, determining power information of samples or symbols of an equal temporal signal portion of the plurality of subband signals, performing summation of the respective power information for each sample instant of the signal portion to obtain a set of sum power information for the signal portion, calculating a minimum of the respective power information for each sample instant of the signal portion to obtain a set of minimum power information for the signal portion, forming a sum histogram of the set of sum power information, forming a minimum histogram of the set of minimum power information.

Another embodiment may have a non-transitory digital storage medium having stored thereon a computer program for performing a method for receiving a signal, the signal having interferences of an interference-infested transmission channel, the method having the steps of: forming a histogram of a signal portion of the received signal, and determining mean receive information and/or a noise measure from the histogram, wherein, when forming the histogram, a resolution of the histogram is iteratively adjusted by restricting the upper and/or lower limits of the histogram until a half-width of a distribution of receive information of the histogram occupies a predetermined region in the histogram, when said computer program is run by a computer.

Still another embodiment may have a non-transitory digital storage medium having stored thereon a computer program for performing a method for receiving a signal, the signal having interferences of an interference-infested transmission channel, the method having the steps of: forming a histogram of a signal portion of the received signal, and determining mean receive information and/or a noise measure from the histogram, wherein the receive information of the signal portion are amplitude information, wherein the amplitude information are gained by means of a non-linear function, when said computer program is run by a computer.

Another embodiment may have a non-transitory digital storage medium having stored thereon a computer program for performing a method for receiving a signal, the signal having interferences of an interference-infested transmission channel, the signal having at least one data packet or partial data packet which is transferred over the interference-infested channel, the method having the steps of: scaling the signal with an averaged impulse response to obtain normalized received data symbols, determining reliability information for the received data symbols of the at least one data packet or partial data packet based on a first symbol-based noise measure estimation and/or a second symbol-based noise measure estimation, wherein, in the case of the first symbol-based noise measure estimation, a noise measure of a subset of the received data symbols of the at least one data packet or partial data packet is determined, the subset having at least two symbols, wherein, in the case of the second symbol-based noise measure estimation, a noise measure is determined symbol by symbol for the received data symbols of the at least one data packet or partial data packet, when said computer program is run by a computer.

Another embodiment may have a non-transitory digital storage medium having stored thereon a computer program for performing a method for receiving a signal, the signal having interferences of an interference-infested transmission channel, the method having the steps of: forming at least two histograms of reception power information of two different signal portions of the received signal, combining the at least two histograms bin by bin to obtain a combined histogram, determining noise power information from the combined histogram, wherein at least two histograms of receive information of the two different signal portions of the received signal are formed, wherein the at least two histograms are combined bin by bin to obtain the combined histogram, when said computer program is run by a computer.

Another embodiment may have a non-transitory digital storage medium having stored thereon a computer program for performing a method for receiving a signal, the signal having interferences of an interference-infested transmission channel, the method having the steps of: dividing the signal into a plurality of subband signals, the plurality of subband signals having different subbands of the signal, determining power information of samples or symbols of an equal temporal signal portion of the plurality of subband signals, performing summation of the respective power information for each sample instant of the signal portion to obtain a set of sum power information for the signal portion, calculating a minimum of the respective power information for each sample instant of the signal portion to obtain a set of minimum power information for the signal portion, forming a sum histogram of the set of sum power information, forming a minimum histogram of the set of minimum power information, when said computer program is run by a computer.

Embodiments provide a data receiver, the data receiver being configured to receive a signal, the signal comprising interference of an interference-infested transmission channel, the data receiver being configured to form a histogram of receive information [e.g. received powers, absolute values of amplitudes, or absolute values of n-th roots of amplitudes] of a signal portion [e.g. a set of symbols or a set of samples] of the received signal and to determine from the histogram mean receive information and/or a noise measure [e.g. noise variance] [e.g. of the signal portion (e.g. the set of symbols or samples)].

In embodiments, the data receiver is configured to determine receive information of a set of received symbols or a set of samples [e.g. corresponding to the signal portion] of the received signal, and to form the histogram of the determined receive information of the set of received symbols or the set of samples.

In embodiments, the receive information of the signal portion are power information or amplitude information.

In embodiments, the power information are reception powers [e.g. a reception power value per symbol or sample].

In embodiments, the data receiver is configured to gain the amplitude information by means of a non-linear function.

In embodiments, the amplitude information are absolute values of amplitudes or absolute values of n-th roots of amplitudes or n-th roots of absolute values of amplitudes.

In embodiments, the data receiver is configured to determine the mean receive information based on a maximum of a distribution [e.g. Gaussian curve] of receive information of the histogram.

In embodiments, the data receiver is configured to determine the noise measure [e.g. the noise variance] starting from a maximum of a distribution [e.g. Gaussian curve] of histogram receive information based on a half-width of the distribution [e.g. Gaussian curve] of histogram receive information.

In embodiments, the data receiver is configured to iteratively adjust a resolution of the histogram by restricting the upper and/or lower limits [e.g. of receive information (x-axis)] of the histogram until a half-width of a distribution [e.g. Gaussian curve] of receive information of the histogram occupies a given area [e.g. width] in the histogram.

In embodiments, the data receiver is configured to adjust the resolution of the histogram by restricting the upper and/or lower limits [of receive information] of the histogram iteratively by the following steps:

1. determining a distance between a maximum and a half-width or another given width [e.g. 1/10 of the maximum] of the distribution [e.g. Gaussian curve] of receive information of the current histogram [e.g. generally speaking there are two reference points, wherein the limits are then restricted until the distance between the two reference points exceeds a threshold],
2. restricting the upper and/or lower limits [e.g. of receive information] of the current histogram based on the determined distance between the maximum and the half-width of the distribution [e.g. Gaussian curve] of receive information,
3. forming an updated histogram with an updated resolution based on the restricted upper and/or lower limits [e.g. wherein, when forming the updated histogram, receive information outside the upper and lower limits [e.g. of receive information] are not considered,
4. repeating steps 1 to 3 until the distance between the maximum and the half-width or another given width of the distribution [e.g. Gaussian curve] of received information, determined in step 1, is greater than or equal to a given value.

In embodiments, the data receiver is configured to perform a non-linear quantization of the receive information and to form the histogram of the non-linearly quantized receive information.

For example, in contrast to root formation, it is not the receive information that can be modified, but the histogram bins. This is advantageous if the length of the receive information is much greater than the number of histogram bins.

In embodiments, the receive information are absolute values of amplitudes of a set of received symbols or a set of samples [e.g. corresponding to the signal portion], wherein the non-linear quantization corresponds to a root calculation of the amplitudes of the set of received symbols or the set of samples.

In embodiments, the data receiver is configured to filter [e.g. to low-pass-filter] the histogram.

In embodiments, the data receiver is configured to low-pass filter the histogram.

In embodiments, the signal comprises at least one data packet or a plurality of partial data packets which are transferred over the interference-infested channel, the data receiver being configured to use the determined mean receive information and the noise measure for the further processing of the at least one data packet or the plurality of partial data packets.

In embodiments, the data receiver is configured to form the histogram of receive information of a signal portion of the received signal, which is composed of a plurality of partial signal portions, the plurality of partial signal portions comprising the plurality of partial data packets.

In embodiments, the data receiver is configured to determine the noise variance from the histogram, wherein the data receiver is configured to calculate a median of the received information [e.g. reception powers, amplitude absolute values, or n-th root amplitude absolute values] of a signal portion [e.g. of a set of symbols or a set of samples] of the received signal, and to obtain a mean receive information [e.g. of the signal portion (e.g. of the set of symbols or samples)].

In embodiments, the signal comprises at least two data packets or partial data packets which are transferred over the interference-infested channel, wherein there are transfer pauses [e.g. transmission pauses] between the at least two data packets or partial data packets, wherein the data receiver is configured to place the signal portion in a transmission pause between the at least two data packets or partial data packets.

In embodiments, the signal portion is composed of at least two partial signal portions. The data receiver is configured to place the at least two partial signal portions in different transfer pauses between the at least two partial data packets.

In embodiments, a maximum of a distribution of receive information of the histogram is zero.

In embodiments, the receive information are amplitudes of symbols or samples of the signal portion.

In embodiments, the data receiver is configured to determine only the noise measure from the histogram.

In embodiments, the data receiver is configured to determine a mean value [e.g. of an absolute value] of a reception amplitude and a standard deviation of the noise based on the determined mean receive information and the noise variance, wherein the data receiver is configured to determine a threshold value [e.g. reception amplitude threshold value] based on the determined mean value [e.g. of the absolute value] of the reception amplitude and the standard deviation of the noise, the data receiver being configured not to consider symbol or samples of the signal portion the reception amplitudes of which [e.g. the absolute values of reception amplitudes of which] are above a threshold, in further processing [e.g. detection of decoding] [e.g. of receives data packets or partial data packets] [e.g. in order to suppress interferences of the interference-infested channel].

In embodiments, the data receiver is configured not to consider, or weight less, symbols or samples of the signal portion, the reception amplitudes [e.g. whose absolute values of reception amplitudes] of which are below the threshold value and which have a predetermined distance [e.g. one, two, three, or four symbols or samples] to symbols or samples, the reception amplitudes [e.g. whose absolute values of reception amplitudes] of which are above the threshold value, during further processing [e.g. detection or decoding] [e.g. of received data packets or partial data packets] [e.g. as symbols or samples of the signal portion whose reception amplitudes (e.g. whose absolute values of reception amplitudes) are below the threshold value] [e.g. to suppress interferences of the interference-infested channel].

In embodiments, the data receiver is configured to weight symbols or samples of the signal portion based on a distribution [e.g. Gaussian curve] of receive information of the histogram for further processing [e.g. decoding or detection] [e.g. of received data packets or partial data packets] [e.g. to suppress interference of the interference-infested channel].

In embodiments, the data receiver is configured to weight the symbols or samples of the signal portion based on the determined mean receive information and/or the noise measure.

In embodiments, the signal comprises at least one data packet or partial data packet which is transferred over the interference-infested channel, wherein the at least one data packet or partial data packet comprises a synchronization sequence, wherein the data receiver is configured to perform iterative further processing [e.g. synchronization and/or demodulation] of the at least one data packet or partial data packet based on the synchronization sequence of the at least one data packet or partial data packet, and to suppress interferences of the interference-infested channel in at least one iteration step of the iterative further processing of the at least one data packet or partial data packet, the interferences of the interference-infested channel being suppressed by not considering symbols or samples of the synchronization sequence that are above the above threshold, and/or weighting symbols or samples of the synchronization sequence less that do not have the above distance to symbols or samples, and/or weighting symbols or samples of the synchronization sequence.

In embodiments, the data receiver is configured to perform the iterative further processing [e.g. synchronization and/or demodulation] of the at least one data packet or partial data packet by the following steps:

1. performing a first synchronization [e.g. frequency and/or phase synchronization] of the at least one received data packet or partial data packet while suppressing the interferences of the interference-infested channel,
2. updating the interference suppression of the interference-infested channel using the results of the first synchronization,
3. performing a second synchronization [e.g. frequency and/or phase synchronization] of the at least one received data packet or partial data packet while suppressing the interferences of the interference-infested channel
4. updating the interference suppression of the interference-infested channel using the results of the second synchronization.

Further embodiments provide a data receiver, the data receiver being configured to receive a signal, the signal comprising interferences of an interference-infested transmission channel, the data receiver being configured to calculate a median of receive information [e.g. reception powers, absolute values of amplitudes, or absolute values of n-th roots of amplitudes] of a signal portion [e.g. of a set of symbols or a set of samples] of the received signal to obtain mean receive information [e.g. of the signal portion (e.g. of the set of symbols or samples)].

Further embodiments provide a data receiver, the data receiver being configured to receive a signal and scale it with an averaged impulse response to obtain normalized received data symbols, wherein the signal comprises interferences of an interference-infested transmission channel, wherein the signal comprises at least one data packet or partial data packet [e.g. a plurality of partial data packets] transmitted over the interference-infested channel, wherein the data receiver is configured to determine reliability information [e.g. LLR values] for the received data symbols of the at least one data packet or partial data packet [e.g. per data packet or partial data packet] based on a first symbol-based noise measure estimate [e.g. AWGN-optimized LLR scaling] and/or a second symbol-based noise measure estimation [e.g. interference-optimized LLR scaling], wherein the data receiver is adapted to determine, in case of the first symbol-based noise measure estimation [e.g. AWGN-optimized LLR scaling], a noise measure over a subset of the received data symbols of the at least one data packet or partial data packet, wherein the subset comprises at least two symbols, wherein the data receiver is configured to determine, in the case of the second symbol-based noise measure estimation [e.g. interference-optimized LLR scaling] for the received data symbols of the at least one data packet or partial data packet, a noise measure symbol by symbol [e.g. for each symbol].

In embodiments, the data receiver is configured to determine [e.g. to average] the noise measure using noise values of the first subset of the received data symbols of the at least one data packet or partial data packet in case of the first symbol-based noise measure estimation [e.g. AWGN-optimized LLR scaling].

In embodiments, the data receiver is configured to determine a first noise measure over a first subset [e.g. a first half] of the data symbols of the at least one data packet or partial data packet and a second noise measure over a second subset [e.g. a second half] of the data symbols of the at least one data packet or partial data packet in case of the first symbol-based noise measure estimation [e.g. AWGN-optimized LLR scaling].

In embodiments, the data receiver is configured to determine, in case of the second symbol-based noise measure estimation [e.g. interference-optimized LLR scaling] for the received data symbols of the at least one data packet or partial data packet, a noise measure symbol by symbol [e.g. for each symbol] based on a noise value of the respective data symbol and at least one noise value of an adjacent data symbol [e.g. by sliding averaging over the same].

In embodiments, the data receiver is configured to determine an interference rate of the interference-infested channel, and, depending on the determined interference rate, to determine reliability information [e.g. LLR values] for the received symbols of the at least one data packet or partial data packet either based on the first symbol-based noise measure estimation [e.g. AWGN-optimized LLR scaling] or based on the second symbol-based noise measure estimation [e.g. interference-optimized LLR scaling].

In embodiments, the data receiver is configured to determine the reliability information [e.g. LLR values] for the received symbols of the at least one data packet or partial data packet separately based on the first noise measure estimation [e.g. AWGN-optimized LLR scaling] and the second noise measure estimation [e.g. interference-optimized LLR scaling] in order to obtain first reliability information and second reliability information and combine them for further processing (e.g. decoding).

In embodiments, the data receiver is configured to determine the reliability information [e.g. LLR values] for the received data symbols of the at least one data packet or partial data packet separately based on the first symbol-based noise measure estimation [e.g. AWGN-optimized LLR scaling] and the second symbol-based noise measure estimation [e.g. interference-optimized LLR scaling] in order to obtain first reliability information and second reliability information for separate further processing (e.g. separate decoding).

In embodiments, the signal comprises a plurality of partial data packets, the data receiver being configured to determine impulse responses of the plurality of partial data packets, the data receiver being adapted to determine the averaged impulse response based on the determined impulse responses.

In embodiments, the data receiver is configured to determine the impulse response of the respective partial data packet by averaging the synchronization symbols and the reception signal values containing the synchronization symbols.

In embodiments, the data receiver is configured to determine a noise power of the respective partial data packet based on the impulse response or a reel-valued version of the impulse response [e.g. mean reception power].

In embodiments, the data receiver is configured to determine the noise power of the respective partial data packet based on calculating a difference between received symbols [e.g. synchronization symbols] of the respective partial data packet and a version of received symbols reconstructed based on the determined impulse response.

In embodiments, the data receiver is configured to determine the averaged impulse response only based on the determined impulse responses of those partial data packets of the plurality of partial data packets whose determined noise powers do not exceed a given noise power.

In embodiments, the data receiver is configured to sort the determined noise powers of the plurality of sub-packages in ascending order, wherein the data receiver is configured to iteratively determine, starting from the mean value of the L smallest noise powers, a difference with the respective next largest noise power until a growth factor of the respective difference exceeds a predetermined threshold, wherein those partial data packets which have the respective next larger noise value whose growth factor exceeds the threshold or a noise value which is larger than the respective next larger noise value are not taken into account in the determination of the averaged impulse response.

Further embodiments provide a data receiver, the data receiver being configured to receive a signal, wherein the signal comprises interferences of an interference-infested transmission channel, wherein the data receiver is configured to form at least two histograms of reception power information [e.g. reception powers, logarithmic reception powers] of two different signal portions [e.g. of a set of samples or a set of symbols] of the received signal [for example a first histogram of received power information of a first signal portion of the received signal and a second histogram of reception power information of a second signal portion of the received signal], wherein the data receiver is configured to combine the at least two histograms [e.g. distributions of reception power information of the at least two histograms] bin by bin [e.g. to add them] to obtain a combined histogram, wherein the data receiver is configured to determine noise power information [e.g. noise power] from the combined histogram.

In embodiments, the data receiver is configured to determine reception power information [e.g. reception powers, logarithmic reception powers] of at least two sets of samples or symbols of the at least two signal portions, and to form the at least two histograms of the determined reception power information of the at least two sets of samples or symbols.

In embodiments, the reception power information are reception powers or logarithmic reception powers.

In embodiments, the data receiver is configured to determine the noise power information based on a maximum of a distribution of combined reception power information of the combined histogram.

Further embodiments provide a data receiver, the data receiver being configured to receive a signal [e.g. a broadband signal], the signal comprising interferences of an interference-infested transmission channel, the data receiver being configured to divide the signal into a plurality of sub-band signals [e.g. a plurality of channels], wherein the plurality of subband signals comprise different [e.g. partially overlapping] subbands of the signal, wherein the data receiver is configured to determine power information [e.g. reception powers, logarithmic reception powers] of samples or symbols of a same temporal signal portion of the plurality of subband signals [e.g. to obtain a two-dimensional array of power information, a first dimension of the two-dimensional array describing the plurality of subband signals, a second dimension of the two-dimensional array describing the sampling instants], wherein the data receiver is configured to perform summation over the respective power information [e.g. of the two-dimensional array] for each sampling instant of the signal portion to obtain a set of sum power information for the signal portion, and wherein the data receiver is configured to perform minimum calculation [e.g. minimum search] over the respective power information [e.g. of the two-dimensional array] for each sampling instant of the signal portion to obtain a set of minimum power information for the signal portion, wherein the data receiver is configured to form a sum histogram over the set of sum power information, wherein the data receiver is configured to form a minimum histogram over the set of minimum power information.

In embodiments, the determined power information form a matrix of power information, wherein rows of the matrix describe the plurality of subband signals, wherein columns of the matrix describe sampling instants, wherein the data receiver is configured to perform the summation over the respective power information column by column, wherein the data receiver is configured to perform the minimum calculation over the respective power information column by column.

In embodiments, the data receiver is configured to determine a sum noise power from the sum histogram, wherein the data receiver is configured to determine a minimum noise power from the minimum histogram.

In embodiments, the data receiver is configured to determine the sum noise power based on a maximum of a distribution of sum power information of the sum histogram, the data receiver being configured to determine the minimum noise power based on a maximum of a distribution of minimum power information of the minimum histogram.

In embodiments, the reception power information are reception powers or logarithmic reception powers.

Further embodiments provide a method for receiving a signal, the signal comprising interferences of an interference-infested transmission channel. The method comprises a step of forming a histogram over a signal portion of the received signal. The method further comprises a step of determining mean receive information and/or a noise measure from the histogram.

Further embodiments provide a method for receiving a signal, the signal comprising interferences of an interference-infested transmission channel. The method comprises a step of forming a median over receive information of a signal portion of the received signal to obtain mean receive information.

Further embodiments provide a method for receiving a signal, the signal comprising interferences of an interference-infested transmission channel, the signal comprising at least one data packet or partial data packet transmitted over the interference-infested channel. The method comprises a step of scaling the signal with an averaged impulse response to obtain normalized received data symbols. The method further comprises a step of determining reliability information for the received data symbols of the at least one data packet or sub-data packet based on a first symbol-based noise measure estimation and/or a second symbol-based noise measure estimation, wherein in the case of the first symbol-based noise measure estimation, a noise measure is determined over a subset of the received data symbols of the at least one data packet or partial data packet, the subset comprising at least two symbols, wherein in the case of the second symbol-based noise measure estimation, a noise measure is determined symbol by symbol for the received data symbols of the at least one data packet or partial data packet.

Further embodiments provide a method for receiving a signal, the signal comprising interferences of an interference-infested transmission channel. The method comprises a step of forming at least two histograms of reception power information of two different signal portions of the received signal. The method further comprises a step of bin-wise combining the at least two histograms to obtain a combined histogram. The method further comprises a step of determining noise power information from the combined histogram.

Further embodiments provide a method for receiving a signal, the signal comprising interferences of an interference-infested transmission channel. The method comprises a step of dividing the signal into a plurality of subband signals, the plurality of subband signals having different subbands of the signal. The method further comprises a step of determining power information of samples or symbols of a same temporal signal portion of the plurality of subband signals. The method further comprises a step of performing summation of the respective power information for each sampling instant of the signal portion to obtain a set of sum power information for the signal portion. The method further comprises a step of performing minimum calculation for each sampling instant of the signal portion over the respective power information to obtain a set of minimum power information for the signal portion. The method further comprises a step of forming a sum histogram of the set of sum power information. The method further comprises a step of forming a minimum histogram of the set of minimum power information.

BRIEF DESCRIPTION OF THE DRAWINGS

Embodiments of the present invention are described in more detail with reference to the enclosed Figures, in which.

DETAILED DESCRIPTION OF THE INVENTION

Figure 1:
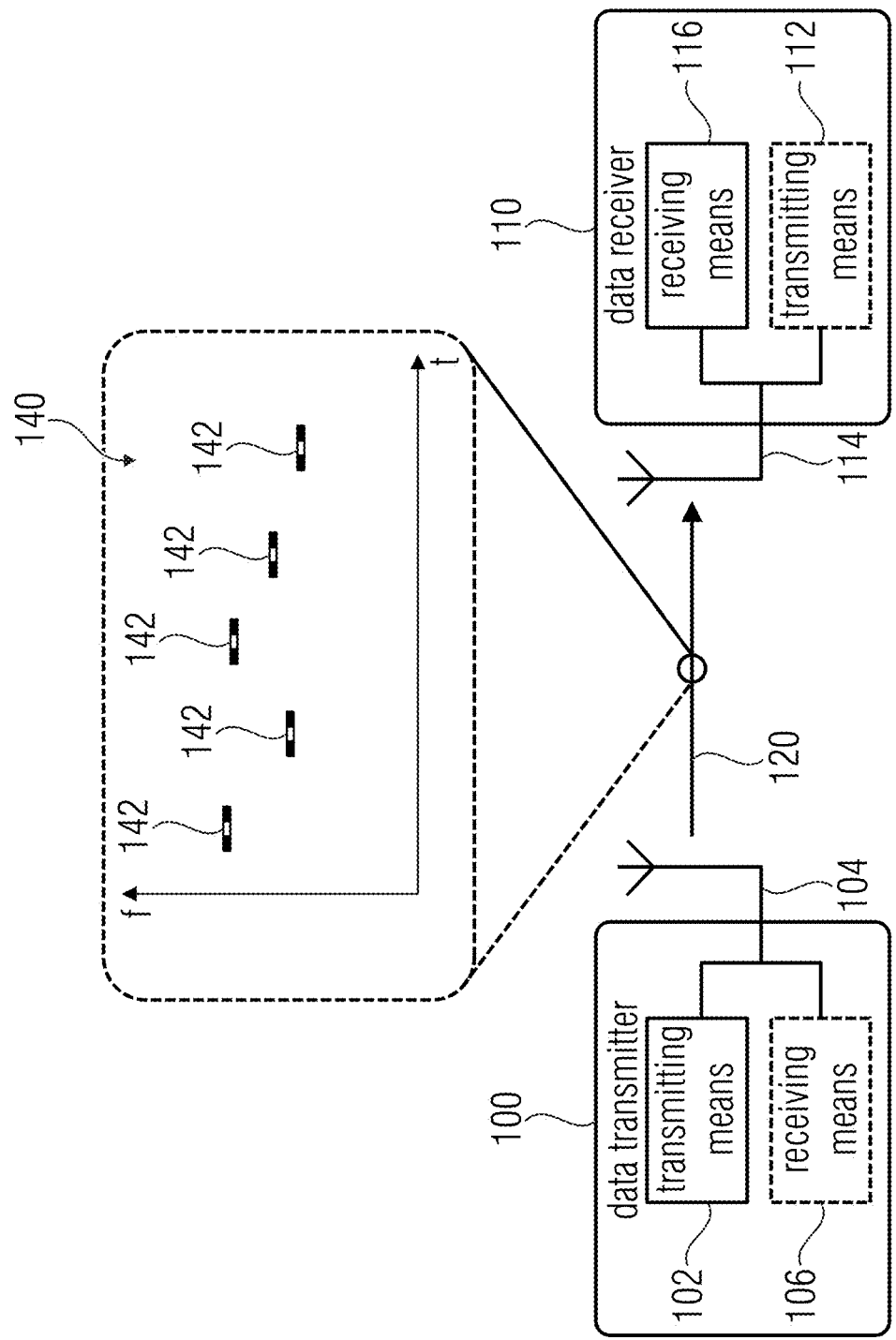
FIG. 1 shows a schematic block diagram of a system comprising a data transmitter and a data receiver, according to an embodiment of the present invention.

In the following description of the embodiments of the present invention, the same reference numerals are used in the figures for identical or similarly acting elements, so that their description is interchangeable.

1. Telegram Splitting-Based Radio Transfer System

FIG. 1 shows a schematic block diagram of a system comprising a data transmitter 100 and a data receiver 110. The data transmitter 100 can be configured to transmit a signal 120, the signal 120 comprising at least two separate partial data packets 142. The data receiver 110 can be configured to receive the signal 120 (or a version of the signal 120 modified by the transmission channel)) which comprises the at least two separate partial data packets 142.

As can be seen in FIG. 1, the at least two separate partial data packets 142 are separated or spaced from each other in time and/or frequency. The distribution of the at least two separate partial data packets 142 in time and/or frequency can be done according to a hopping pattern 140.

In embodiments, the data transmitter 100 can comprise transmitting means (or transmitter module, or transmitter) 102 configured to transmit the signal 120. The transmitting means 102 can be connected to an antenna 104 of the data transmitter 100. The data transmitter 100 can also comprise receiving means (or receiver module, or receiver) 106 configured to receive a signal. The receiving means 106 can be connected to the antenna 104 or another (separate) antenna of the data transmitter 100. The data transmitter 100 can also comprise a combined transceiver.

In embodiments, the data receiver 110 can comprise receiving means (or receiving module, or receiver) 116 configured to receive the signal 120. The receiving means 116 can be connected to an antenna 114 of the data receiver 110. In addition, the data receiver 110 can comprise transmitting means (or transmitter module, or transmitter) 112 configured to transmit a signal. The transmitting means 112 can be connected to the antenna 114 or another (separate)

antenna of the data receiver 110. The data receiver 110 can also comprise a combined transceiver.

In embodiments, the data transmitter 100 can be a sensor node, while the data receiver 110 can be a base station. Typically, a communication system comprises at least one data receiver 110 (base station) and a number of data transmitters (sensor nodes, such as heating meters). Of course, it is also possible for the data transmitter 100 to be a base station, while the data receiver 110 is a sensor node. It is also possible for both the data transmitter 100 and the data receiver 110 to be sensor nodes. It is also possible for both the data transmitter 100 and the data receiver 110 to be base stations.

The data transmitter 100 and the data receiver 110 can be configured to transmit and/or receive data using a telegram splitting method. A data packet (or telegram) containing the data is divided into a plurality of partial data packets (or sub-data packets) 142 and the partial data packets 142 are transmitted according to a hopping pattern 140 distributed in time and/or frequency from the data transmitter 100 to the data receiver 110, wherein the data receiver 110 reassembles (or combines) the partial data packets 142 to obtain the actual data packet. Each of the partial data packets 142 contains only a part of the data packet 120. The data packet can also be channel-coded, so that only a part of the partial data packets 142 is used for error-free decoding of the data packet, rather than all of the partial data packets 142.

As already mentioned, the temporal distribution of the plurality of partial data packets 142 can be carried out according to a time and/or frequency hopping pattern 140.

A time hopping pattern can specify a sequence of transmission instants or transmission time intervals using which the partial data packets are transmitted. For example, a first partial data packet can be transmitted at a first transmission instant (or in a first transmission time slot) and a second partial data packet at a second transmission instant (or in a second transmission time slot), wherein the first transmission instant and the second transmission instant are different. The time hopping pattern can define (or predetermine or specify) the first transmission instant and the second transmission instant. Alternatively, the time hopping pattern can specify the first transmission instant and a time interval between the first transmission instant and the second transmission instant. Of course, the time hopping pattern can also specify only the time interval between the first transmission instant and the second transmission instant. There can be transmission pauses between the partial data packets, in which no transmission takes place. The partial data packets can also overlap in time.

A frequency hopping pattern can specify a sequence of transmission frequencies or transmission frequency hops using which the partial data packets are transmitted. For example, a first partial data packet can be transmitted at a first transmission frequency (or in a first frequency channel) and a second partial data packet at a second transmission frequency (or in a second frequency channel), wherein the first transmission frequency and the second transmission frequency are different. The frequency hopping pattern can define (or predetermine or specify) the first transmission frequency and the second transmission frequency. Alternatively, the frequency hopping pattern can specify the first transmission frequency and a frequency interval (transmission frequency hop) between the first transmission frequency and the second transmission frequency. Of course, the frequency hopping pattern can also specify only the frequency interval (transmission frequency hop) between the first transmission frequency and the second transmission frequency.

Of course, the plurality of partial data packets 142 can also be transmitted from the data transmitter 100 to the data receiver 110 distributed both in time and in frequency. The distribution of the plurality of partial data packets in time and frequency can be performed in correspondence with a time-frequency hopping pattern. A time-frequency hopping pattern can be the combination of a time hopping pattern and a frequency hopping pattern, i.e. a sequence of transmission instants or transmission intervals using which the partial data packets 142 are transmitted, wherein transmission frequencies (or transmission frequency hops) are associated to the transmission instants (or transmission time intervals).

Figure 2:
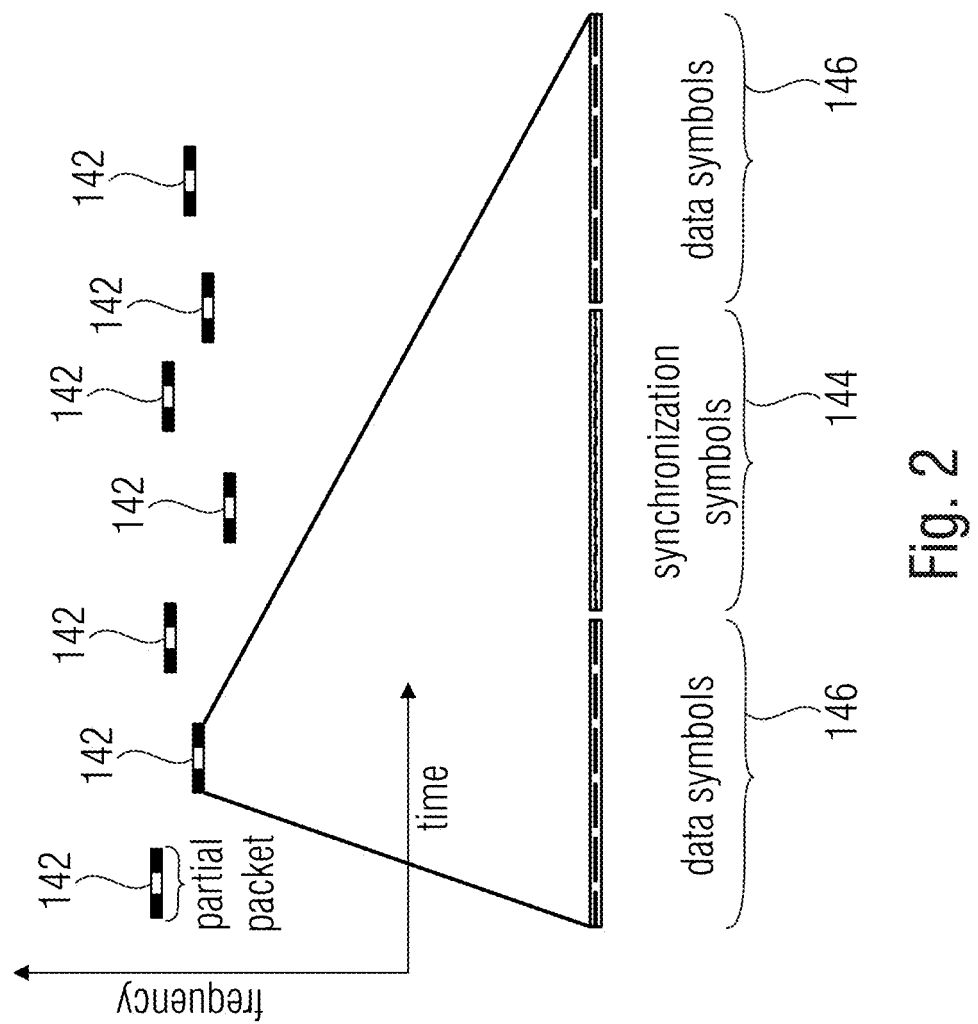
FIG. 2 shows, in a diagram, an occupancy of the transmission channel during the transmission of a plurality of partial data packets according to a time-frequency hopping pattern.

FIG. 2 shows an occupancy of the transmission channel when transferring a plurality of partial data packets 142 in correspondence with a time-frequency hopping pattern in a diagram. Thus, the ordinate describes frequency and the abscissa describes time.

As can be recognized in FIG. 2, the data packet 120 can exemplarily be divided into n=7 partial data packets and transferred from the data transmitter 100 to the data receiver 110 distributed in time and frequency in correspondence with a time-frequency hopping pattern.

As can also be recognized in FIG. 2, the plurality of partial data packets 142 can, apart from data (data symbols 146 in FIG. 2), also contain pilot sequences (pilot symbols (or synchronization symbols) 144 in FIG. 2) based on which the data receiver 110 detects the partial data packets 142 in a reception signal 120 or receive data stream.

Due to the uncoordinated or asynchronous transfer of data from many participants, overlaps of the signals between the participants occur during the transfer. In addition, when using an unlicensed band, disturbances with participants from other networks result. Due to the uncoordinated transfer, it is not possible to perform at the receiver a successive interference cancellation by means of decoding the strongest signal and subtracting the re-encoded signal since the precise reception instant and the frequency are not known or a sufficiently precise estimation usually is not possible. The situation is similar for the transfer of other systems since no information on data rate and modulation method are present as to the external disturbance.

As has already been mentioned before, most systems use FEC for error correction, which is what this invention is based on. It deals with techniques of improving the disturbance immunity of systems using FEC.

In these cases, in particular in the case of FECs with soft-decision input, it is of advantage to know which symbols can be assumed to be disturbed by another transfer. These symbols can then be weighted specifically before being supplied to the FEC (this being referred to as scaling the LLRs) in order to reduce or eliminate their influence.

Subsequently, embodiments of the data receiver 110 which receives a signal 120 in such an interference-infested channel will be described.

2. Determining the Signal Power and Noise Variance in a Static Channel

Figure 3:
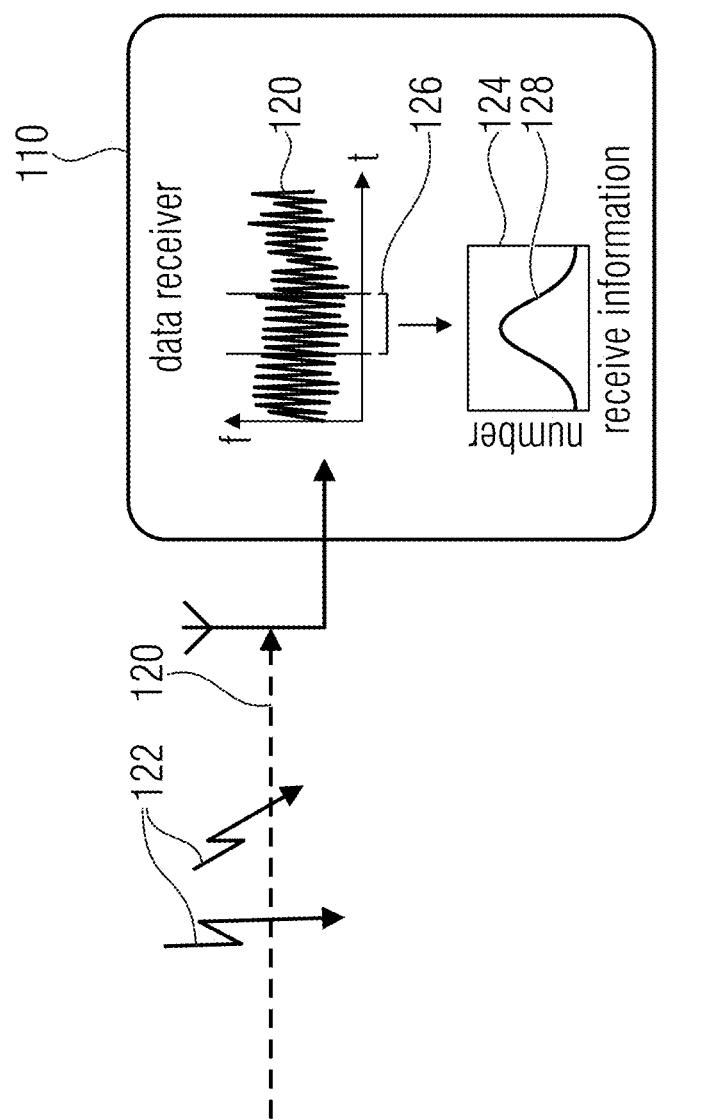
FIG. 3 shows a schematic block diagram of a data receiver, according to an embodiment of the present invention.

FIG. 3 shows a schematic block diagram of a data receiver 110 in accordance with an embodiment. The data receiver 110 is configured to receive a signal 120, the signal 120 comprising interferences 122 of an interference-infested transmission channel.

The data receiver 110 is configured to form a histogram 124 of receive information (for example power information or amplitude information) of a signal portion 126 (for example of a set of symbols or a set of samples) of the received signal 120 and to determine from the histogram 124 mean receive information and/or a noise measure (for example noise variance) (for example of the signal portion 126 (for example of the set of symbols or samples)).

In embodiments, the histogram 124 can be a graphical representation of the abundance distribution of the receive information, wherein the receive information here can exemplarily be classified into bins of constant or variable width.

In embodiments, the data receiver 110 can be configured to determine receive information (for example power information or amplitude information) for a set of samples or symbols of the signal portion 126 and to form the histogram 124 of the determined receive information (for example power information or amplitude information).

For example, the data receiver 110 can be configured to determine, for each sample or each symbol of the signal portion 126 of the received signal 120, receive information (for example power information, like reception power, or amplitude information, like absolute value of the amplitude or absolute value of the n-th root of the amplitude) in order to obtain the determined receive information for the set of samples or symbols of the signal portion 126 and to form the histogram 124 of the determined receive information.

In embodiments, the data receiver 110 can be configured to determine the mean receive information based on a maximum of a distribution 126 (for example Gaussian curve) of receive information of the histogram.

In embodiments, the data receiver 110 can be configured to determine the noise measure (for example the noise variance) starting from a maximum of a distribution (like Gaussian curve) of receive information of the histogram 124 based on a half-width of the distribution 128 (like Gaussian curve) of receive information of the histogram 124.

In embodiments, the receive information can be power information or amplitude information, like reception powers (for example, a reception power value per symbol or sample), absolute values of the amplitude or absolute values of n-th roots of amplitudes (like an absolute value of the amplitude or absolute value of an n-th root of an amplitude of the sample or symbol).

Embodiments assume a (quasi) static channel, which means that there is no/little temporal change in the channel during transfer. This is, for example, the case if both the data transmitter 100 and the data receiver 110 are stationary or only move so slowly that the change of the channel is slower than the duration of transfer.

In order to be able to recognize presumably disturbed symbols, it is of advantage to be able to differentiate between noisy and disturbed symbols. Using the signal power and the noise variance is suitable for differentiating in the static channel. A detailed description of how the disturbed symbols are determined from these two parameters will be described below, for example in chapter 3.

In embodiments, determining the signal power and the noise variance can be performed after the detection in the decoder, but before the synchronization (frequency, time and phase estimation). It can be assumed that a coarse frequency and time estimation has been performed by the detection and the error is smaller than the following parameters:

$\Delta t < T_S / 2$ $\Delta f < f_S / 4$, $T_S$ representing the symbol duration and $f_S$ the symbol rate of the system.

The following method works for any kinds of modulation. In case a modulation method of equal amplitude is to be employed for all the constellation points (all the symbols are located on the unit circle) (for example MSK, M-PSK, FSK), exemplarily, apart from the pilot symbols, the unknown data symbols may also be used for determining the signal power and the noise variance. In case the signal amplitude is dependent on the constellation point of the modulation method (like QAM), it is possible to use only the pilot symbols. In the second case, the reception amplitude can be normalized to the modulation point, so that all the symbols comprise the same power in the case of an ideal transfer with no noise.

If a method of constant envelope (like FSK or MSK) is used, instead of using the symbols after matched filtering, the complex baseband samples before the matched filtering can also be used. In this case, however, it is to be kept in mind that oversampling of the signal is relatively low, in order to restrict the noise influence outside the useful bandwidth.

The general approach of determining the signal amplitude by means of mean value calculation does not work in interference channels since the disturbances exhibit an unknown amplitude and, consequently, corrupt the result.

This approach in turn is based on the assumption that at least a part of the symbols or samples is undisturbed, which, however, is not a restriction since, when nearly all the symbols are disturbed, it is impossible, even when perfectly knowing the disturbed symbols, to reconstruct the data using FEC.

Figure 4:
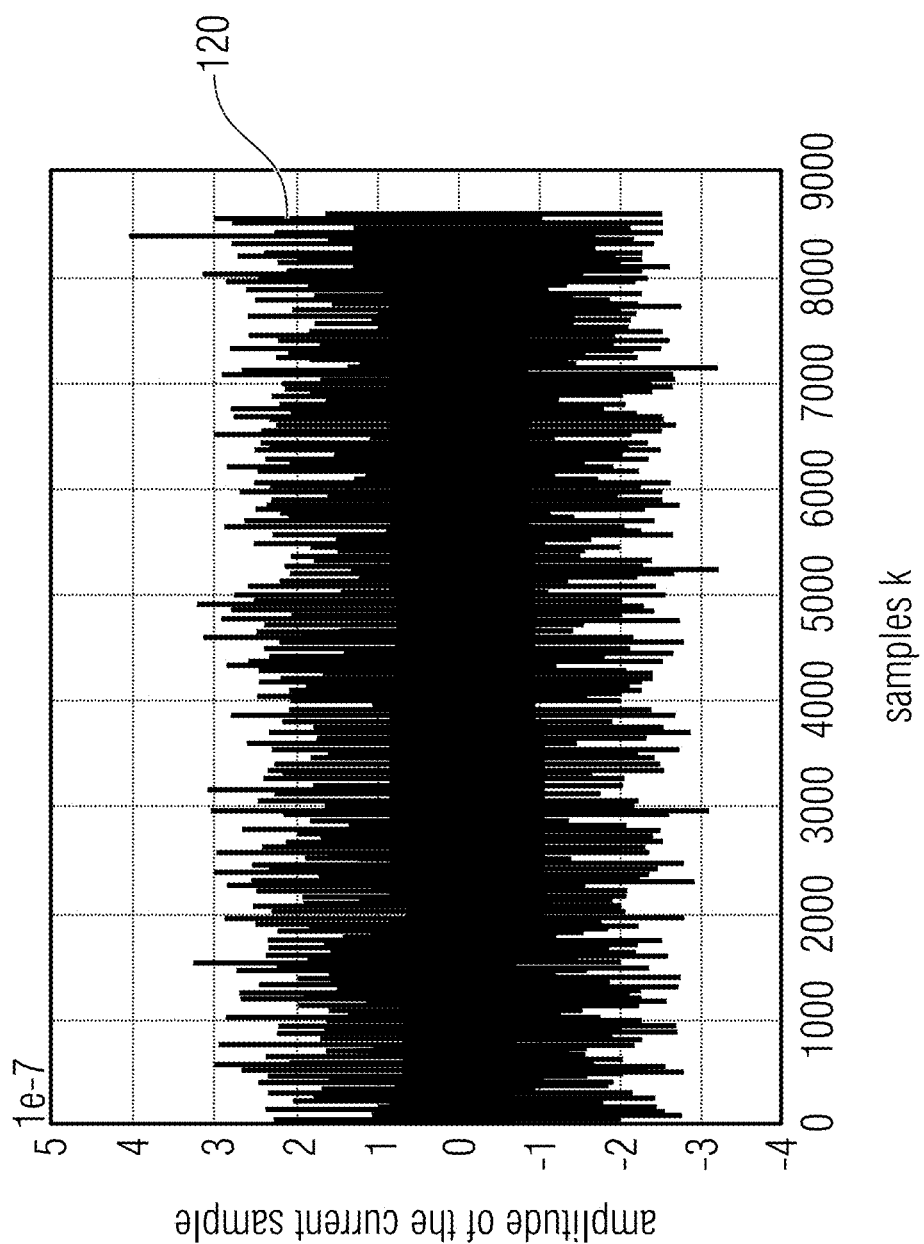
FIG. 4 shows, in a diagram, a course of a received signal, the signal having a telegram and the signal not having any disturbances (interferences)

FIG. 4 shows a course of a received signal 120 in a diagram, wherein the signal comprises a telegram and wherein the signal 120 does not comprise disturbances (interferences). Thus, the ordinate describes amplitude and the abscissa describes samples. In other words, FIG. 4 shows an exemplary course of signal amplitudes of a telegram without disturbances. It deals with a complex baseband signal of MSK modulation (with frequency offset), wherein the signal power can be calculated by squaring the signal amplitudes.

Figure 5:
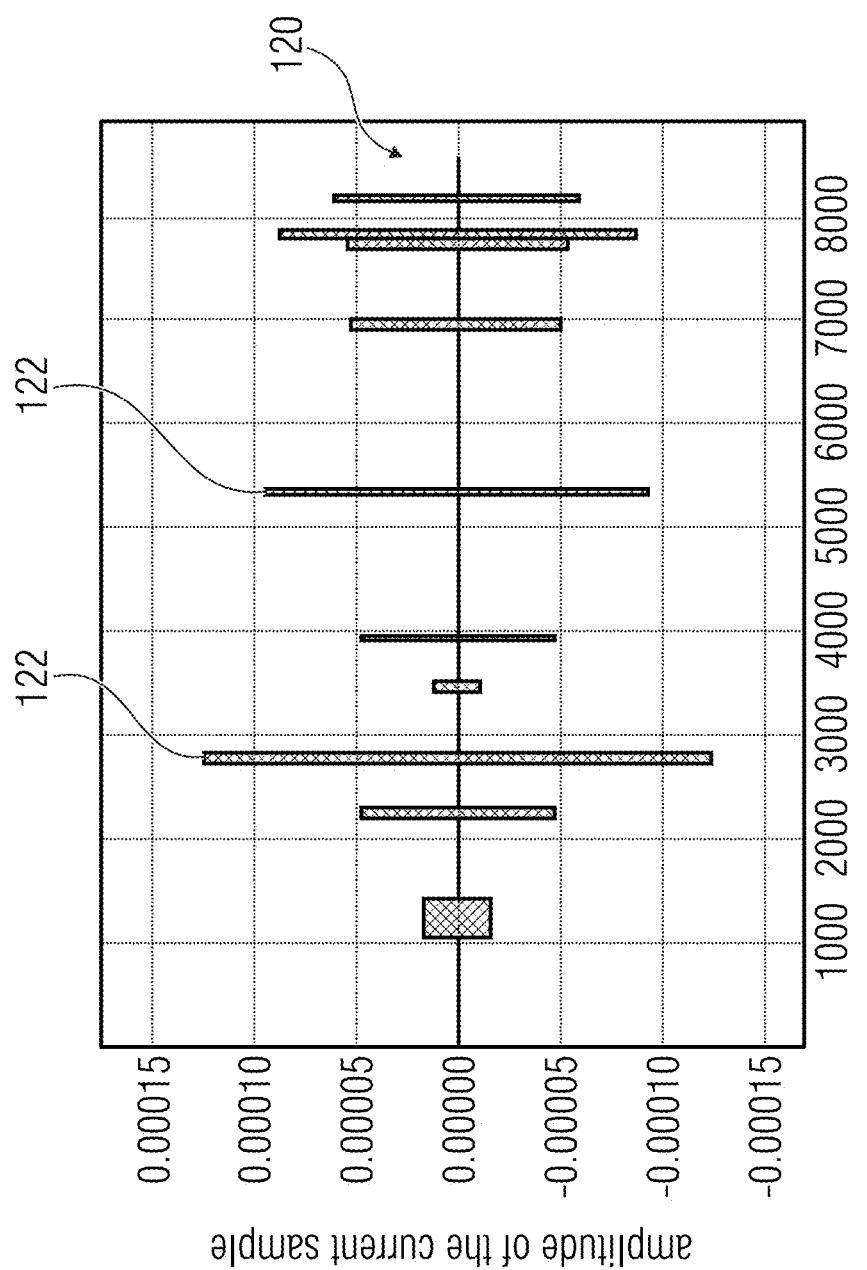
FIG. 5 shows, in a diagram, a course of a received signal, the signal having interferences.

FIG. 5 shows a course of a received signal 120 in a diagram, wherein the signal 120 comprises disturbances (interferences 122). Thus, the ordinate describes amplitude and the abscissa describes samples. In other words, FIG. 5 shows a case in which certain disturbances 122 have arrived at the data receiver 110 with partly considerably higher amplitudes. In this case, signal power and noise variance are to be determined.

Due to the normalized signal amplitude for the modulation method, all the received symbols/samples comprise the same signal power (without noise). Due to the noise, the signal powers are distributed at the data receiver 110 in a Gaussian manner, wherein the top of the obtained Gaussian curve is dependent on channel attenuation and the width is dependent on the noise power. In received symbols, the power of which is far outside the range of the Gaussian curve, it can be assumed that these are very probably disturbed and can be discarded, for example.

In order to obtain these symbols, at first the powers of the received samples or symbols can be calculated. This can exemplarily be performed by squaring the signal amplitudes.

If a histogram of the determined powers of the received samples or symbols is formed, the maximum of the distribution in the histogram is (for example, exactly) at the reception power (=transmission power−channel attenuation). The width of the curve or distribution can specify the noise variance.

Due to the arbitrary amplitude distribution of the disturbers 122 (see FIG. 5), the disturbed symbols have only very little influence on the distribution of the values in the histogram.

Figure 6:
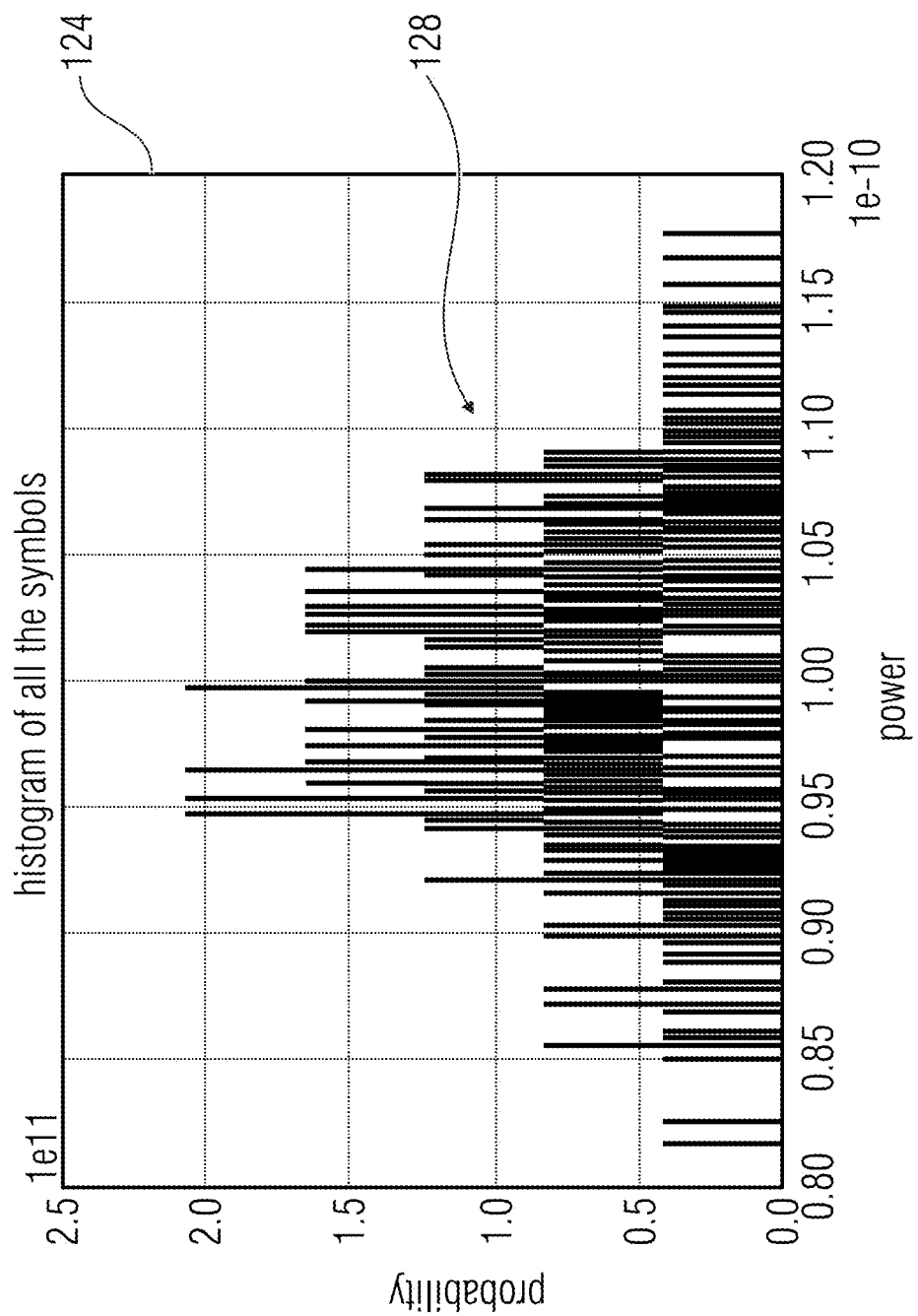
FIG. 6 shows, in a diagram, a histogram of the determined powers of the samples or symbols of a received signal which does not have any additional disturbances (interferences)

FIG. 6 shows a histogram 124 of the determined powers of the samples or symbols of a received signal 120 which does not comprise additional disturbances (interferences), in a diagram. Thus, the ordinate describes probability and the abscissa describes power. In other words, FIG. 6 shows a typical histogram of a received telegram without disturbances (histogram of transfer with a reception power of −100 dBm and a noise power of −120 dBm with no additional disturbances). The maximum which represents the reception power can be determined in the histogram 124. The noise variance a [3] can be determined from the half-width of the Gaussian distribution of the noise and, from this, the noise power can be determined.

Figure 7:
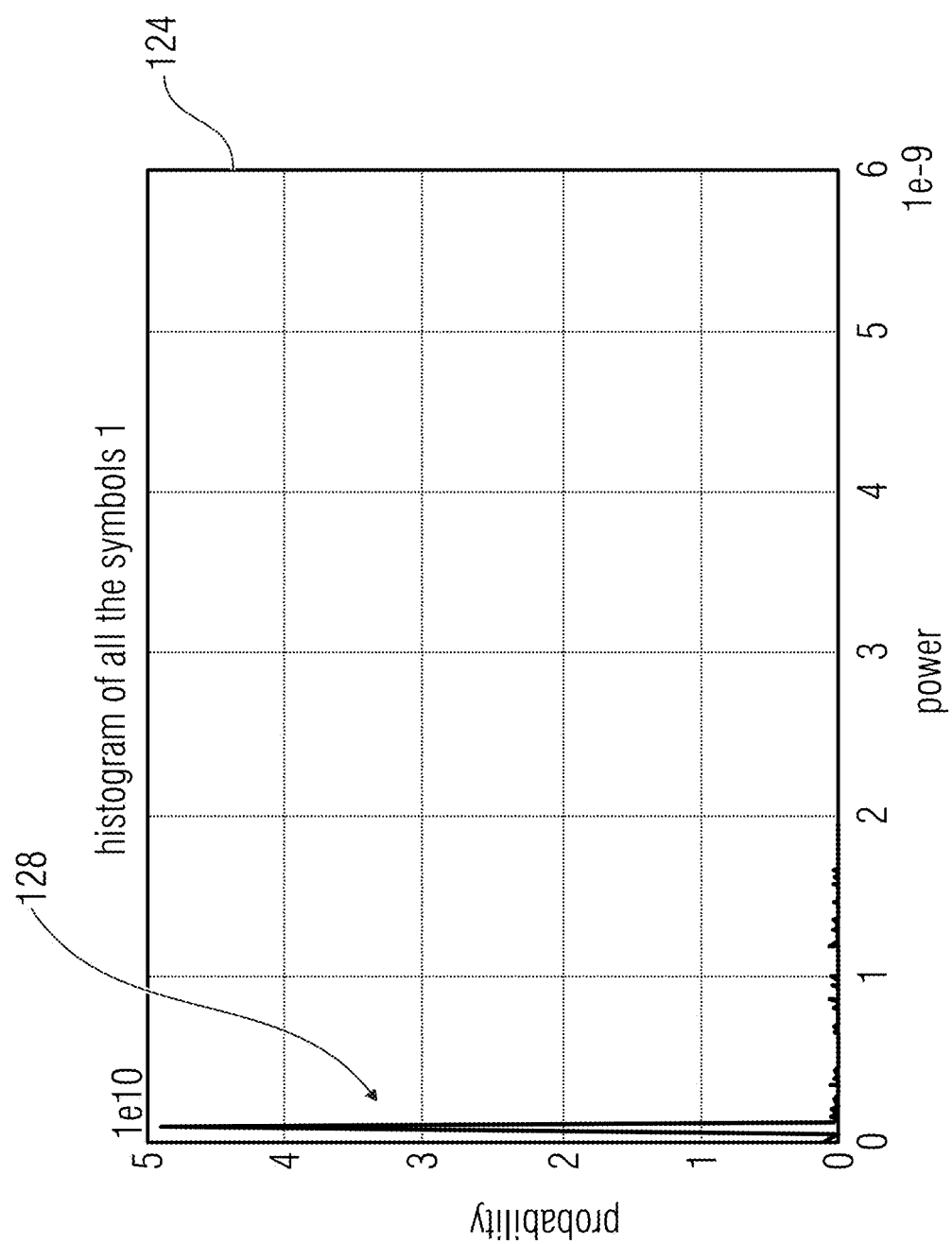
FIG. 7 shows, in a diagram, a histogram of the determined powers of the samples or symbols of a received signal, the signal having additional disturbances (interferences)

FIG. 7 shows a histogram 124 of the determined powers of the samples or symbols of a received signal 120 in a histogram, the signal 120 comprising additional disturbances (interferences). Thus, the ordinate describes probability and the abscissa describes power. In other words, FIG. 7 shows another histogram having the same channel parameters (histogram of transfer with a reception power of −100 dBm and a noise power of −120 dBm), wherein, however, in this case there are additional disturbances 122 in the channel. As can be recognized in FIG. 7, the position of the maxima and the half-width are not changed by the disturbances.

In embodiments, a histogram 124 of the symbols/samples can be formed for determining the reception power of the undisturbed receive symbols and their noise variance. From this histogram 124, the signal power and the noise power can be determined using the maximum and the half-width around the maximum.

As can be recognized in FIG. 7, due to the variation of the amplitudes of the disturbances 122, the resolution of the histogram 124 may be reduced very strongly by the high dynamics of the disturbances in the region of the maximum. Here, the exact maximum and the half-width can, under certain circumstances, be determined only very poorly or not at all.

In embodiments, an iterative approximation of the maximum can be performed until the resolution of the histogram 124 is sufficiently precise. Typically, the half-width can be ¼ to ⅙ of the overall resolution of the histogram 124. Here, the limits (upper and lower limits) of the allowed region for the histogram can be limited step by step.

In embodiments, the following course can apply:
1. forming the initial histogram without restricting the limits (minimum and maximum represent the minima and the maxima from the input data),
2. searching for the maxima and the approximate half-width,
3. restricting the limits (minimum and maximum),
4. forming another histogram with the restricted limits (all the samples/symbols outside the limits are not considered),
5. repeating steps 2 to 4 until the half-width represents more than a defined width of the histogram.

Figure 8A:
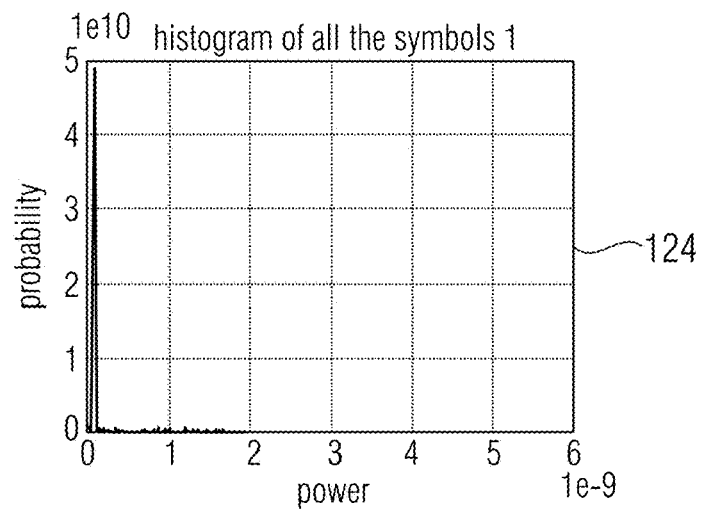
FIG. 8a-c show diagrams of histograms, the determined powers of the samples or symbols of a received signal, the signal having additional disturbances (interferences), where the histograms have different upper and lower limits of powers.
Figure 8B:
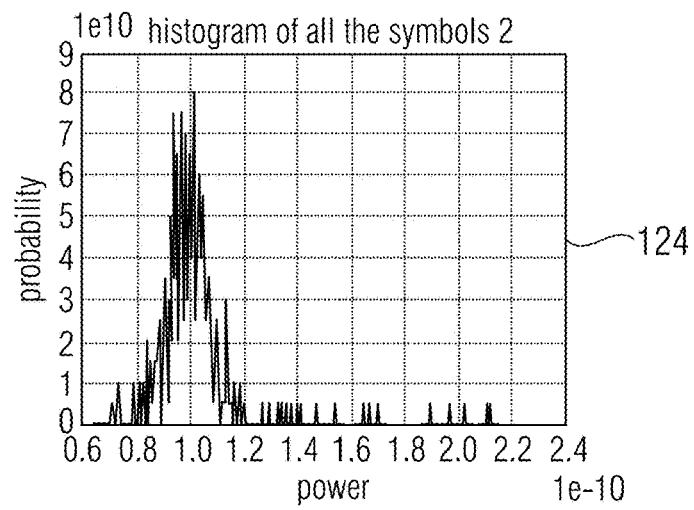
Figure 8C:
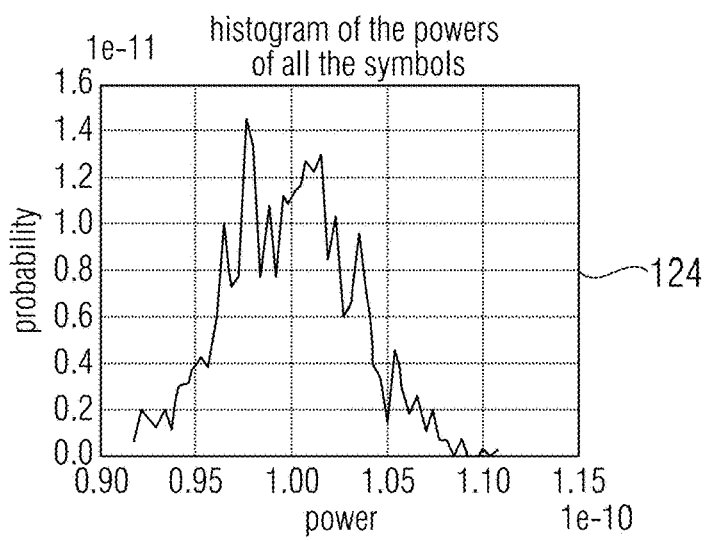

For illustration purposes, FIGS. 8a to 8c show this scheme taking the example of FIG. 7, wherein the disturbances 122 have a much greater dynamic region than the useful signal.

In detail, FIGS. 8a to 8c show diagrams of histograms 124 of the determined powers of the samples or symbols of a received signal 120, the signal 120 comprising additional disturbances (interferences), wherein the histograms 124 comprise different upper and lower limits of powers. Thus, the ordinate describes probabilities and the abscissa describes powers.

As can be recognized in FIGS. 8a to 8c, an approximation can be performed step by step until the resolution of the Gaussian curve has reached the desired width.

In embodiments, the limits of the histograms can be restricted until the width of the Gaussian curve exceeds a certain threshold value.

The method described above will function without any problems as long as the SNR (signal-to-noise ratio) of the useful signal is good. If, however, the SNR decreases, when forming the histogram, under certain circumstances, the maximum of the histogram of the powers of the samples or symbols may no longer be the reception power, but zero, as is shown in FIG. 9.

Figure 9:
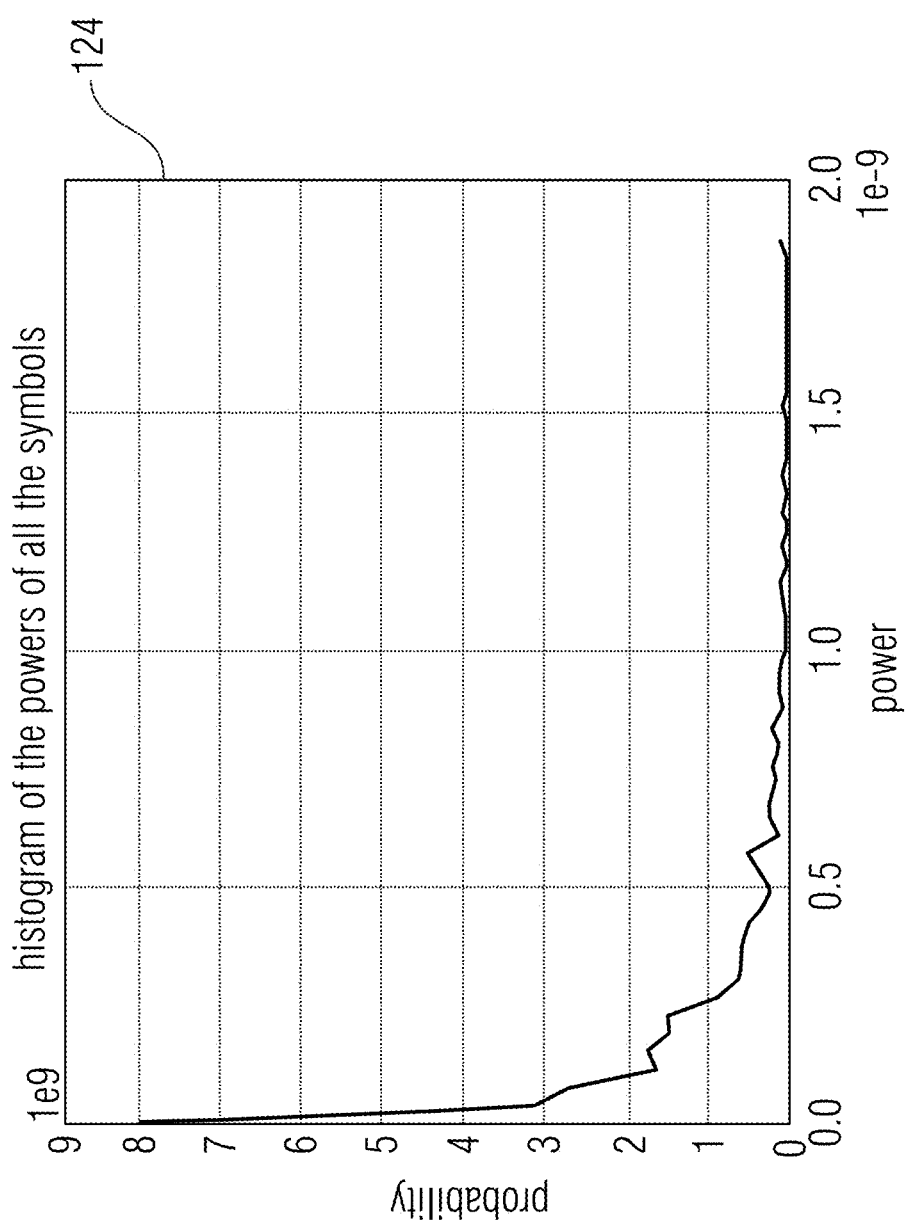
FIG. 9 shows, in a diagram, a histogram of the determined powers of the samples or symbols of a received signal, the signal having a low SNR.

In detail, FIG. 9 shows a histogram 124 of the determined powers of the samples or symbols of a received signal 120 in a diagram, the signal 120 comprising a low SNR. Thus, the ordinate describes probability and the abscissa describes power. In other words, FIG. 9 shows a histogram 124 of the powers of a telegram in the case of a poor SNR in a diagram.

This effect can be easily shown taking the example of binary modulation, wherein the symbols are mapped to an amplitude of +1 or −1.

If the amplitude distribution, including noise, is formed for both constellation points, two Gaussian curves having the maxima at the respective constellation points can be recognized. This is illustrated graphically in FIG. 10 by a first curve 129_1 and a second curve 129_2.

Figure 10:
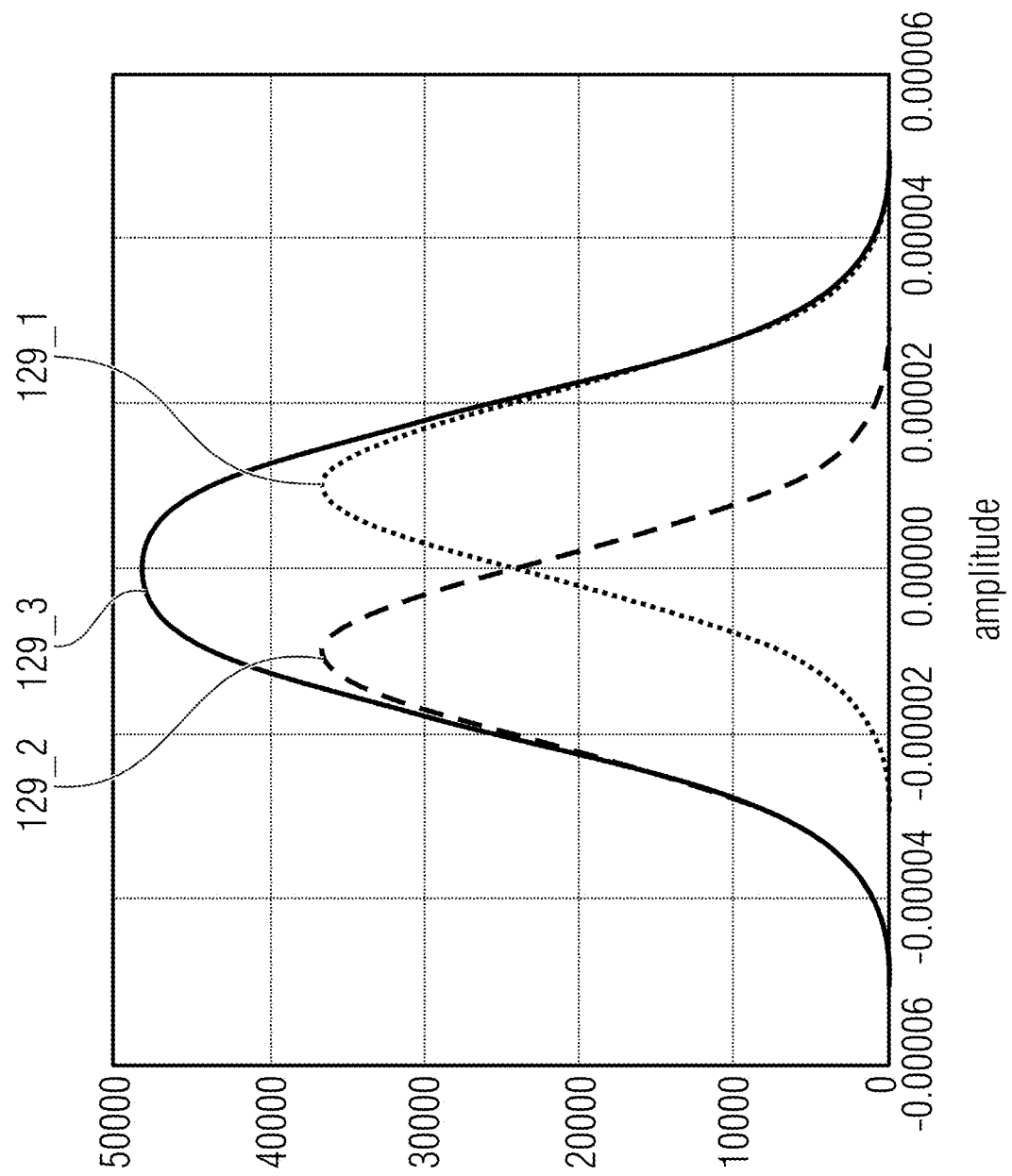
FIG. 10 shows, in a diagram, amplitude distributions of samples or symbols of two constellation points of a binarily modulated signal, the signal having noise.

In detail, FIG. 10 shows amplitude distributions of samples or symbols of two constellation points of a binarily modulated signal in a diagram, the signal comprising noise. Thus, the ordinate describes a number/probability and the abscissa describes amplitude. In FIG. 10, a first curve 129_1 describes the amplitude distribution of the samples or symbols of a first constellation point and a second curve 129_2 describes the amplitude distribution of the samples or symbols of a second constellation point. In addition, in FIG. 10, a third curve 129_3 describes overlapping of the first curve 129_1 and the second curve 129_2 (sum amplitude distribution). In other words, FIG. 10 shows an amplitude distribution of the received samples or symbols with noise and a reception power of −100 dBm.

The width of the Gaussian curves 129_1 and 129_2 is set by the noise power. With relatively little noise, the two curves 129_1 and 129_2 hardly overlap or overlap not at all, wherein, in the case of higher noise (as is shown in FIG. 10), there is significant overlapping between the two curves 129_1 and 129_2. This overlapping can result in wrong decisions in the decoder.

Figure 11:
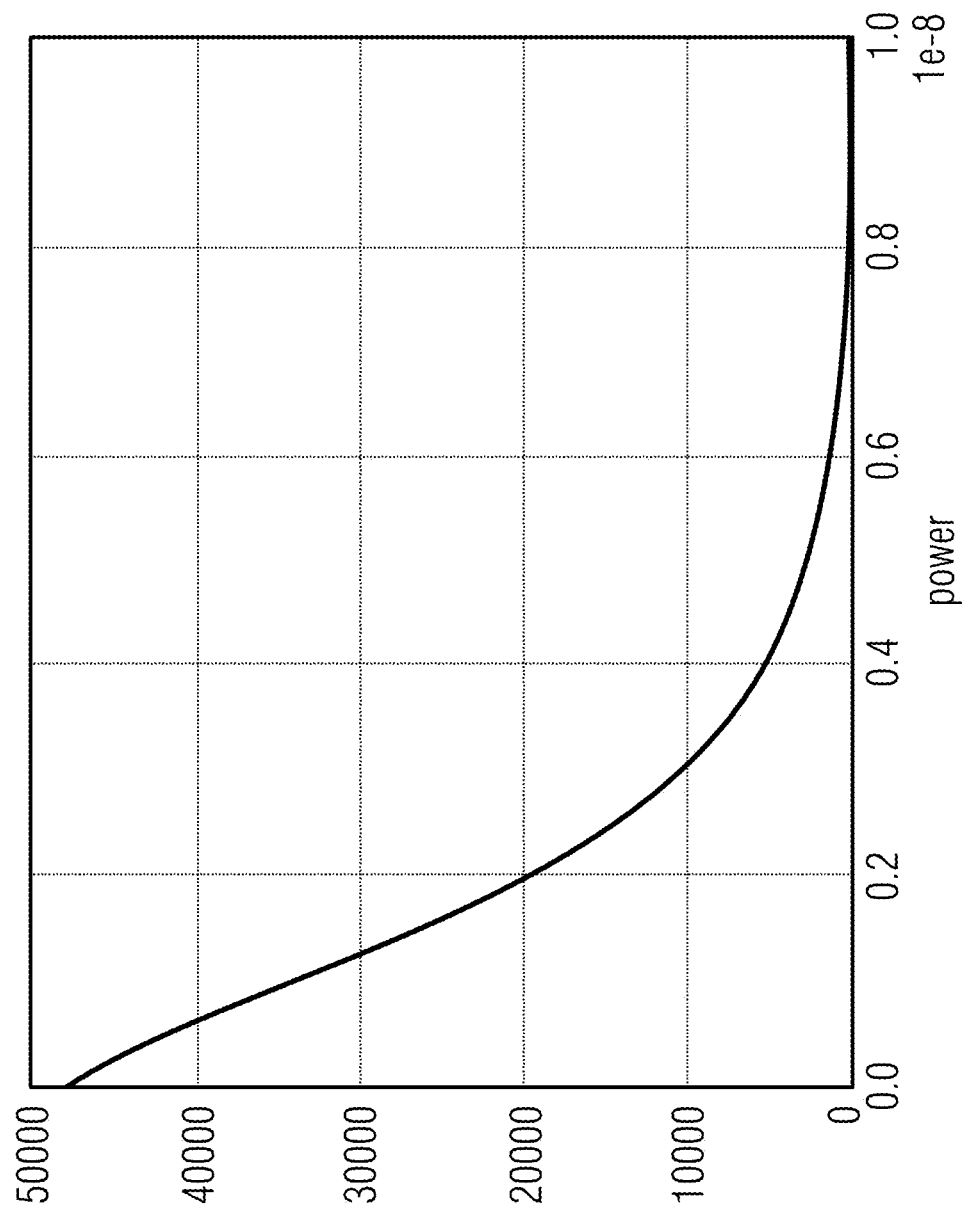
FIG. 11 shows, in a diagram, a power distribution of the sum amplitude distribution from FIG. 10.

FIG. 11 shows a power distribution of the sum amplitude distribution of FIG. 10 in a diagram. Thus, the ordinate describes a number/probability and the abscissa describes power. As can be recognized in FIG. 11, the maximum is not located at the position of the reception power, but zero. The reception power of the signal can no longer be determined from this maximum.

In order to further analyze this problem, an input vector having signal amplitudes which increase linearly (like (1, 2, 3, 4, 5, 6, 7 . . . )*1 e−5) can be generated. Subsequently, this vector can be squared, which corresponds to calculating the power and is shown graphically in FIG. 12.

Figure 12:
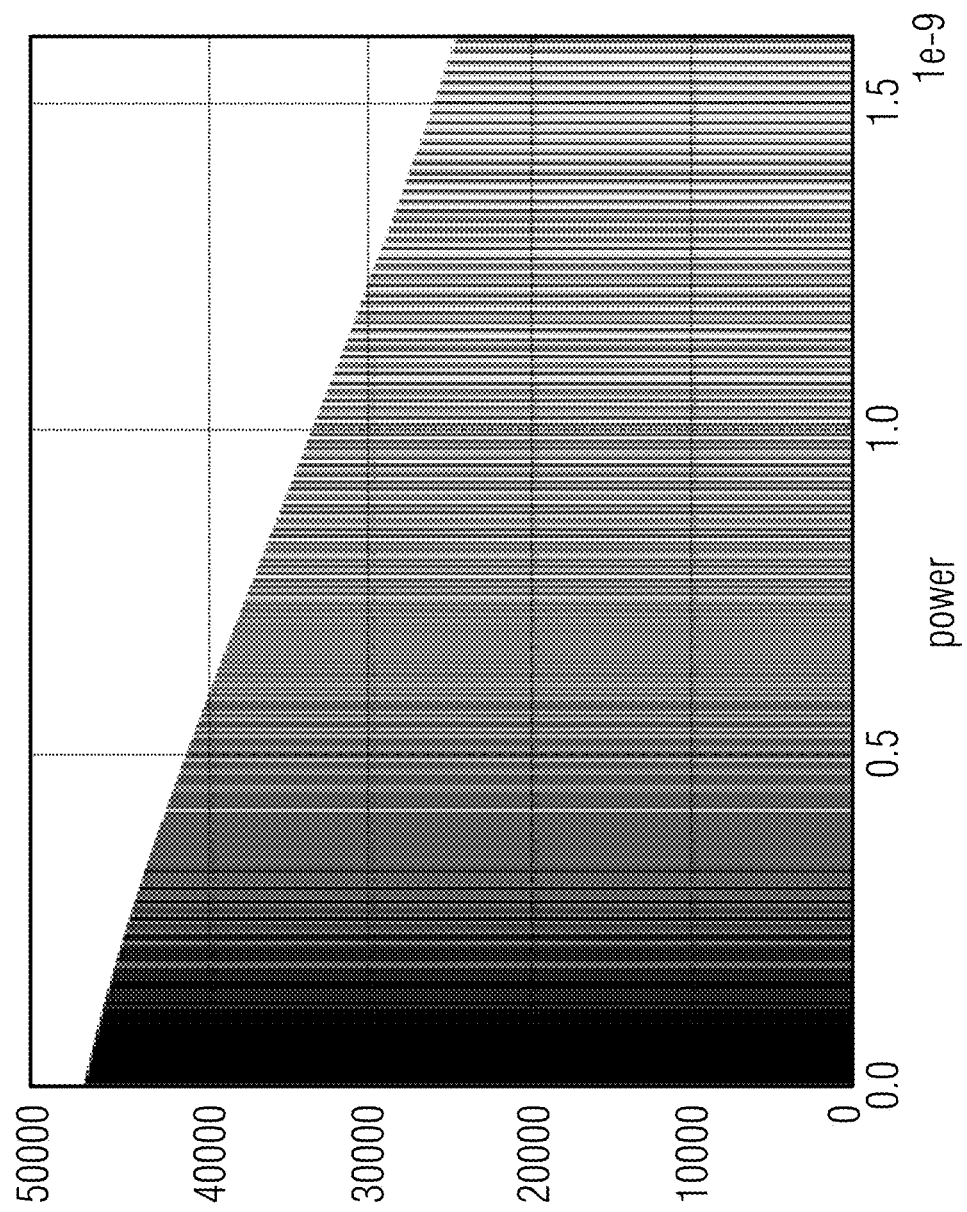
FIG. 12 shows a power distribution of an exemplar telegram with linear amplitude response.

In detail, FIG. 12 shows a power distribution of an exemplary telegram with a linear amplitude course. Thus, the ordinate describes the number/probability and the abscissa describes power.

An accumulation of signal powers in the lower range can be seen, caused by squaring the signal amplitudes. Applied to the histogram calculation of the powers, this means that, in the zero region, there is a higher accumulation than in the upper region and that the maximum is already zero with relatively low noise power values.

In embodiments, the absolute values of the signal amplitudes can be used in the histogram instead of the powers. If a new histogram having the absolute values of the signal amplitudes is formed for the same input data of the histogram of FIG. 9, FIG. 13 will result.

Figure 13:
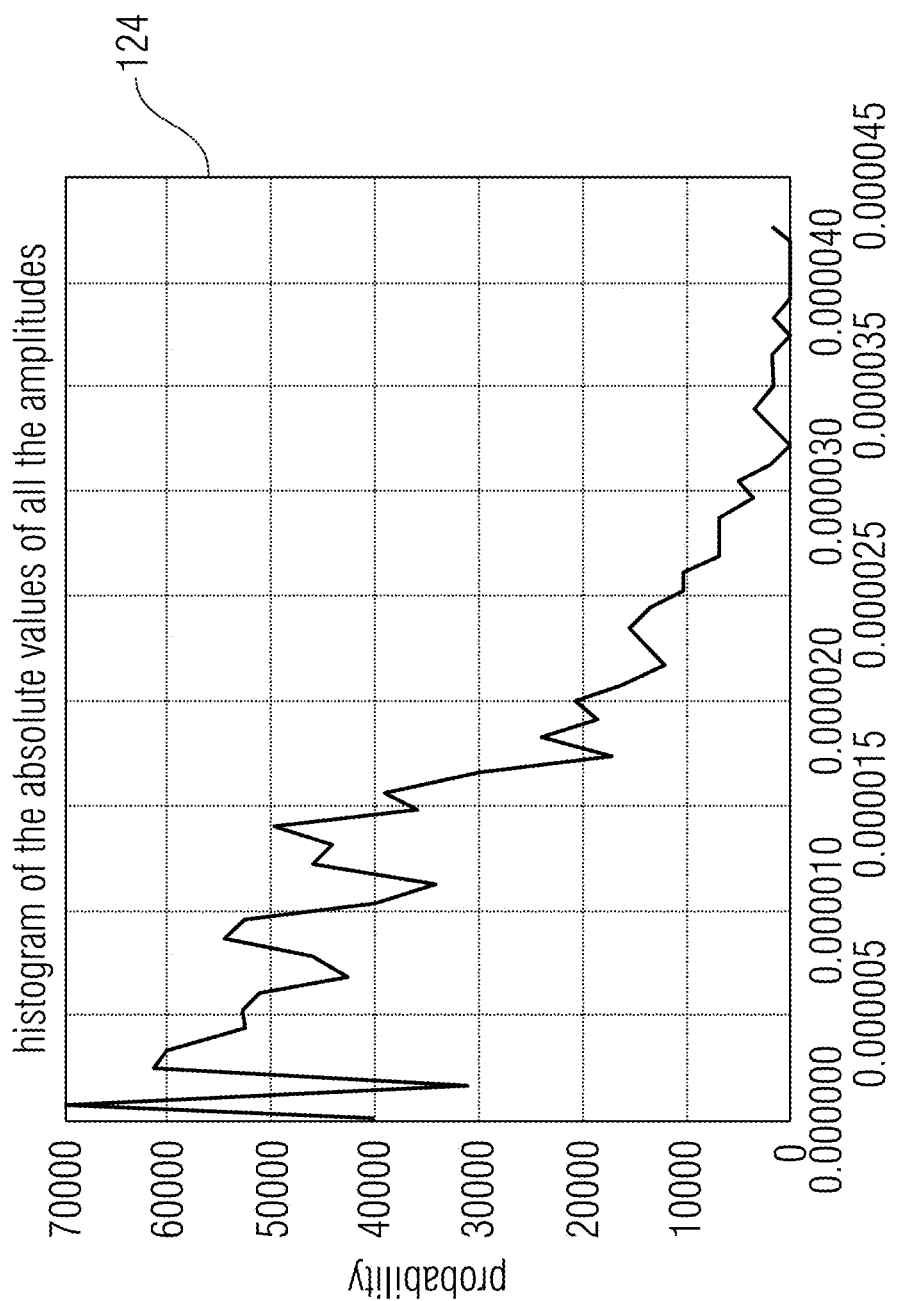
FIG. 13 shows, in a diagram, a histogram of the determined absolute values of the amplitudes of the samples or symbols of a received signal, the signal having a low SNR.

In detail, FIG. 13 shows a histogram 124 of the determined absolute values of the amplitudes of the samples or symbols of a received signal 120 in a diagram, the signal 120 comprising a low SNR. Thus, the ordinate describes probability and the abscissa describes amplitudes.

When compared to FIG. 9, the resolution around the maximum is considerably better, however, the absolute maximum still is close to/at zero.

Another improvement in resolution can be achieved when, instead of the absolute values of the amplitude, the roots (or the n-th root) of the absolute values of the amplitudes are used. This is shown in FIG. 14 for the input vector having linearly increasing amplitudes.

Figure 14:
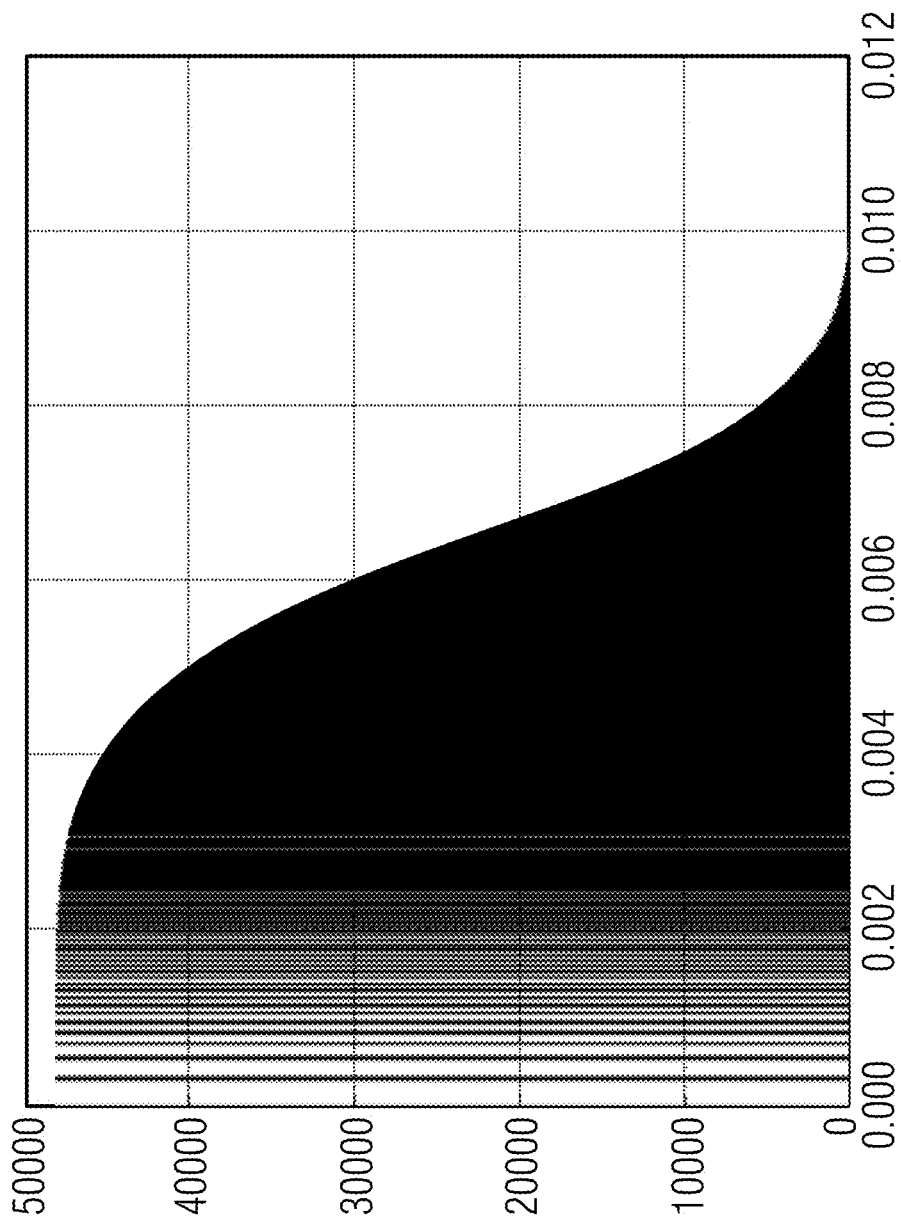
FIG. 14 shows, in a diagram, a distribution of the roots of the amplitudes with the data from FIG. 12.

In detail, FIG. 14 shows a distribution of the roots of the amplitudes with the data from FIG. 12 in a diagram. Thus, the ordinate describes the number/probability and the abscissa describes the amplitudes.

As can be recognized in FIG. 14, there is no longer an accumulation around zero, but with an increasing amplitude value. If another histogram is formed with the data from FIG. 9, the maximum and the width of the noise can be read from the histogram, as is shown in FIG. 15.

Figure 15:
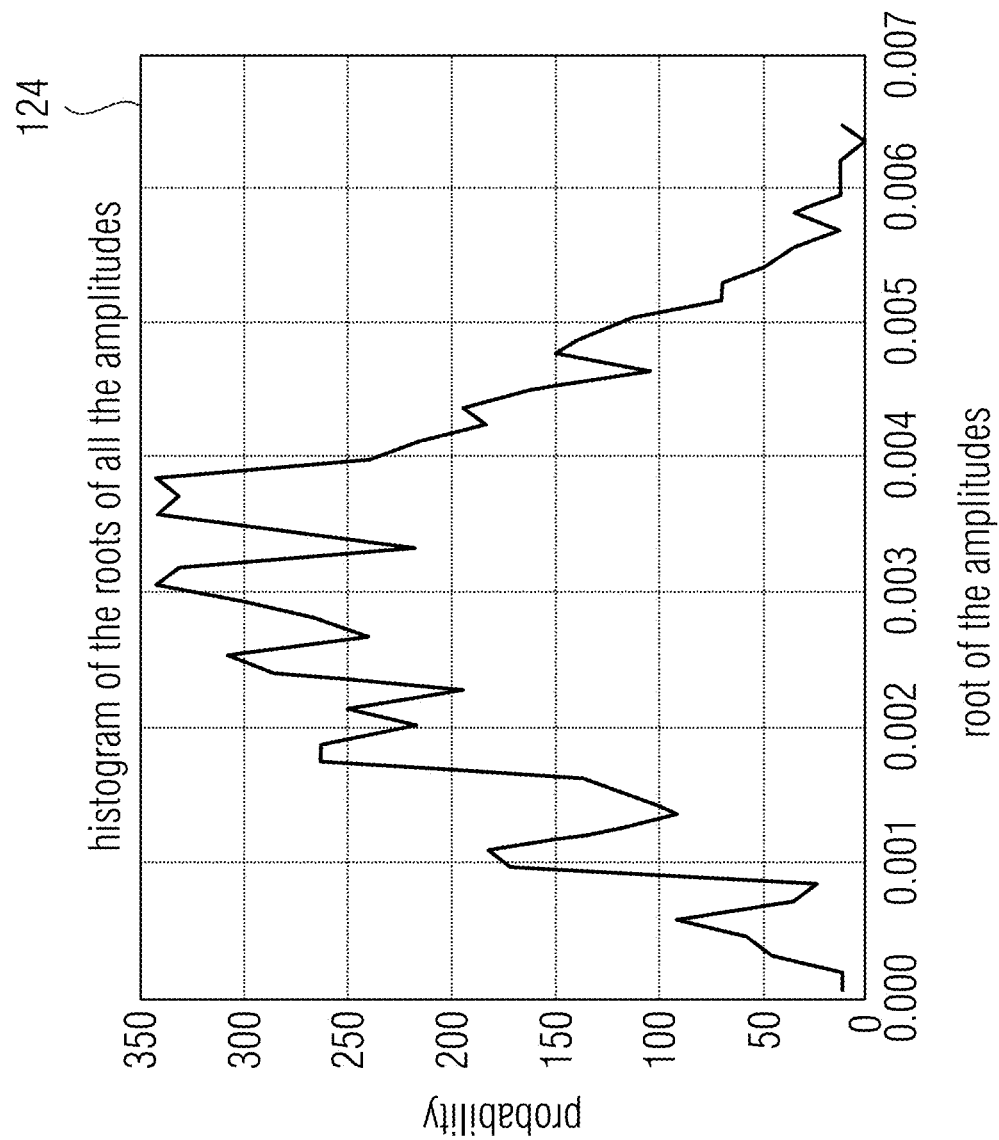
FIG. 15 shows, in a diagram, a histogram of the determined absolute values of the n-th roots of the amplitudes of the samples or symbols of a received signal, the signal having a low SNR.

In detail, FIG. 15 shows a histogram 124 of the determined absolute values of the n-th roots of the amplitudes of the samples or symbols of a received signal 120 in a diagram, the signal 120 comprising a low SNR. Thus, the ordinate describes probability and the abscissa the n-th roots of the amplitudes. In other words, FIG. 15 shows a histogram 124 with the data from FIG. 9 with the absolute values of the roots from the signal amplitudes.

After determining the root of the reception amplitude and the n-th root of the noise variance from the histogram, the signal amplitude and the noise variance can be extracted by an inversion of the n-th root. The power results by squaring the signal amplitude.

In embodiments, instead of the powers, the absolute values of the amplitudes or the absolute values of the n-th roots can be calculated for forming the histogram.

Using the technique described above, the n-th root has to be calculated for each symbol/sample which is used for determining the reception power and the noise. With large amounts of data, this entails a considerable calculating complexity.

In embodiments, the quantization of the histogram bin (classes of the histogram) can be adjusted, instead of calculating the roots.

Previously, all the bins comprised an equal quantization, meaning that the intervals were linear. Quantization can now be performed, which corresponds to a root calculation of the signal amplitudes and has the same result. Here, the bins close to zero exhibit smaller a width than the bins at higher values.

In embodiments, the histogram bins (classes of the histogram) can comprise a non-linear distribution which may exemplarily correspond to calculating the n-th root of the signal amplitudes. The input data in the histogram 124 can be the absolute values of the amplitudes (of the symbols or samples).

It can be recognized from the previous histograms 124 that, under certain circumstances, a strictly monotonous course from the maximum towards the outside cannot be ensured due to the limited number of available symbols or samples. Additionally, under certain circumstances, it is possible for the maximum to be slightly offset and not at the correct value. Under certain circumstances, it is relatively difficult or impossible to correctly determine the maximum and the half-width from such histograms.

In embodiments, the histogram can consequently be filtered using a low-pass filter, for example. This smooths the curve and makes determining the maximum and the half-width easier. A comparison between an unfiltered and a filtered histogram 124 is shown in FIGS. 16a and 16b.

Figure 16B:
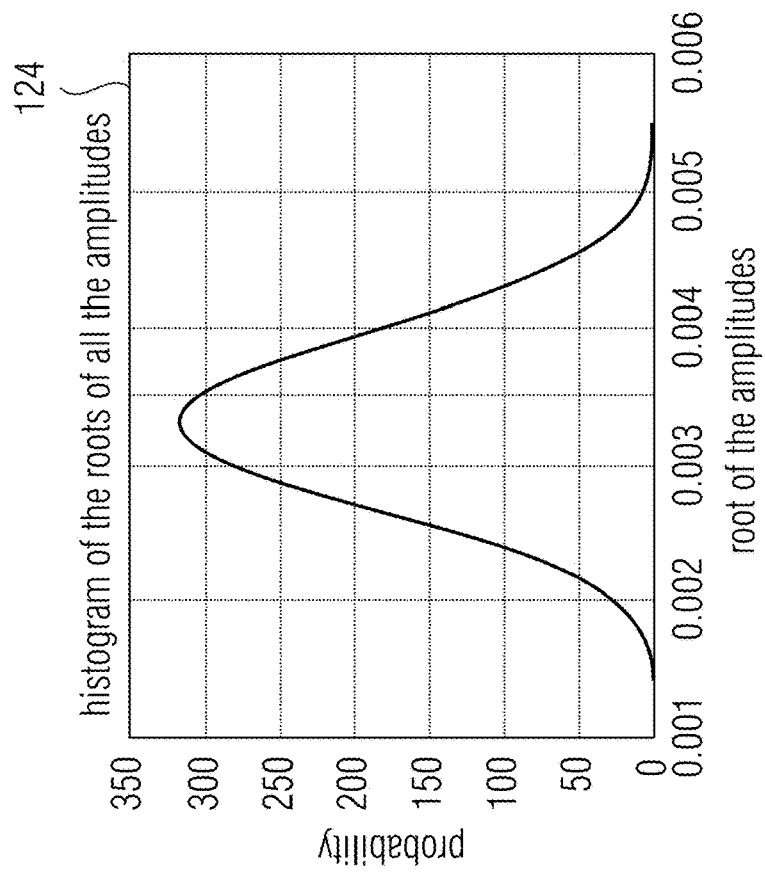
FIG. 16b shows, in a diagram, a filtered histogram of the determined absolute values of the n-th roots of the amplitudes of the samples or symbols of the received signal, the signal having a low SNR.
Figure 16A:
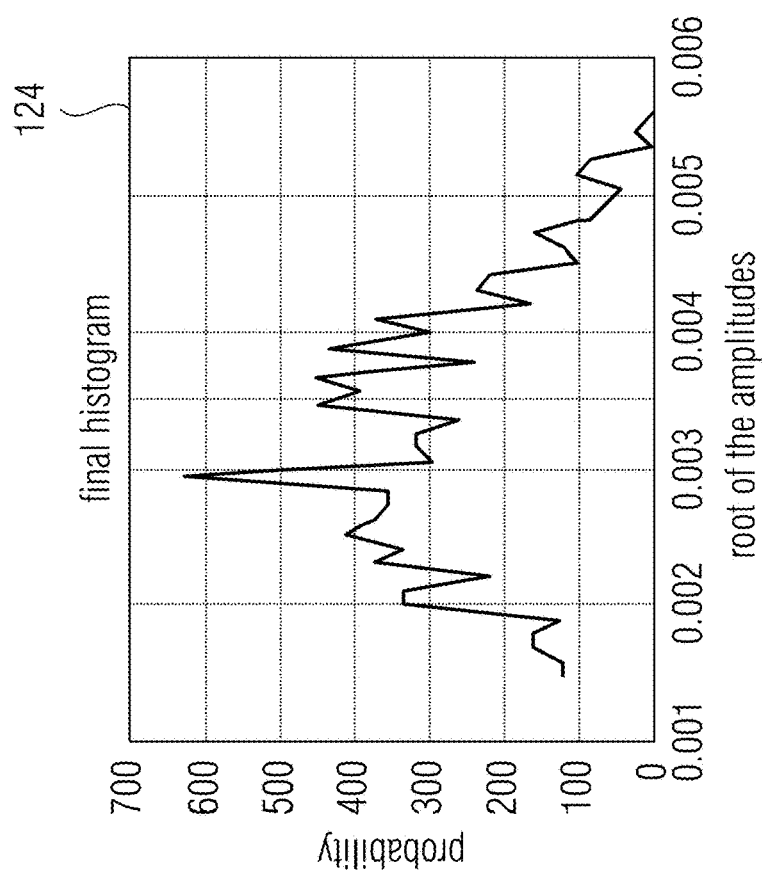
FIG. 16a shows, in a diagram, an unfiltered histogram of the determined absolute values of the n-th roots of the amplitudes of the samples or symbols of a received signal, the signal having a low SNR.

In detail, FIG. 16a shows an unfiltered histogram 124 of the determined absolute values of the n-th roots of the amplitudes of the samples or symbols of a received signal 120 in a diagram, the signal 120 comprising a low SNR, whereas FIG. 16b shows a filtered histogram 124 of the determined absolute values of the n-th roots of the amplitudes of the samples or symbols of the received signal 120 in a diagram, the signal 120 comprising a low SNR. In FIGS. 16a and 16b, the ordinate describes probability and the abscissa describes the respective n-th roots of the amplitudes.

The coefficients of the filter can be adjusted to the length of the histogram 124. In correspondence with the length of the input data, more or less strong filtering may be used.

After calculation, the group delay of the filter can be considered or removed in order not to corrupt the results. In the case of an iterative search, filtering may also be performed in all/certain histogram steps.

In embodiments, the result of calculating the histogram can be subjected to filtering in order to allow easier reading out of the two parameters (maxima and half-width).

3. Determining the Signal Power in a Static Channel

In embodiments, the data receiver 110 can be configured to determine the noise variance from the histogram 124, wherein the data receiver 110 can be configured to form a median of the receive information (for example reception powers, absolute values of the amplitude or absolute values of n-th roots of amplitudes) of a signal portion 126 (for example of a set of symbols or a set of samples) of the received signal 120 and to obtain mean receive information (for example of the signal portion (for example of the set of symbols or samples)).

In embodiments, thus (as an alternative to the histogram calculation from section 2), the signal power can also be determined by forming the median of all the received symbol powers. It can be assumed that less than half of the received symbols are disturbed, or those packets having more than 50% disturbed symbols usually cannot be decoded. This allows approximately estimating the approximate signal power of the undisturbed symbols by means of the median value of all the symbol powers. This is possible since the large powers of the disturbed symbols do not count as much as when calculating the mean value. When less than half of the received symbols are disturbed, the median value will always be in the region of the Gaussian curve of the undisturbed symbols, which allows coarsely determining the powers thereof.

This estimation can of course also be performed using the absolute values of the amplitudes or the roots of the absolute values of the amplitudes.

In embodiments, the median value of the powers can be determined based on the powers of the received symbols or samples. This value can provide an estimation of the power of the undisturbed receive symbols.

4. Determining the Noise Variance in a Static Channel from Transmission Pauses In embodiments, the signal 120 can comprise at least two data packets or partial data packets 142 transferred over the interference-infested channel, wherein there are transfer pauses (like transmission pauses) between the at least two data packets or partial data packets, wherein the data receiver 110 can be configured to place the signal portion 126 in a transfer pause between the at least two data packets or partial data packets 142.

In embodiments, thus (as an alternative to the approach in section 2), the noise power can also be determined from the reception signal during a transmission pause. Here, the receive symbols are considered similarly to section 2, however, with the difference that only noise and, maybe, disturbers are received. The mean value is not expected to be at a zero amplitude, which is why determining the mean value of the symbol amplitudes is omitted, in analogy to section 2. In order to determine the noise variance, the variance or width of the histogram of the receiver powers (or amplitudes) can be determined. This can again be performed in analogy to section 2, where the limits of the histograms are restricted iteratively until a certain half-width is achieved. Alternatively/additionally, in the case of a disturbance, forming the median of the reception amplitudes may provide a coarse estimation of the noise power.

In embodiments, a histogram of the symbols or samples at the time of a transmission pause can be formed for determining the noise variance of undisturbed receive symbols. The noise power can be determined from this histogram using the half-width around the maximum.

5. Detecting the Disturbed Symbols in Static Channels Based on the Transmission Power and Noise Variance In embodiments, the data receiver 110 can be configured to determine a mean value (for example of an absolute value) of a reception amplitude and a standard deviation of the noise based on the determined mean receive information and the noise variance, wherein the data receiver 110 can be configured to determine a threshold value (for example reception amplitude threshold value) based on the determined mean value (for example of the absolute value) of the reception amplitude and the standard deviation of the noise, wherein the data receiver 110 can be configured not to consider symbols or samples of the signal portion 126 the reception amplitudes of which (for example the absolute values of reception amplitudes of which) are above the threshold value in further progressing (like detection or decoding) (for example of received data packets or partial data packets), for example to suppress interferences of the interference-infested channel.

As has already been described above, the performance of the FEC can be improved when knowing, in interference channels, which symbols are disturbed.

In a (quasi)-static channel, the reception amplitudes of all the undisturbed symbols are only dependent on noise and channel attenuation, in case a modulation method of equal amplitude is used for all the constellation points (all the symbols are located on the unit circle), for example M-PSK, FSK, MSK.

If a modulation method is used in which this does not apply, the following method can be applied to the known pilot symbols when these are normalized in power in correspondence with the expected constellation point.

It is known from theory that, with a normally distributed noise (see, for example, [4]), 99.7% of all the amplitudes are within $\mu \pm 3\sigma$, wherein $\mu$ represents the mean value of the reception amplitude of the constellation point and $\sigma$ represents the standard deviation of the noise.

To eliminate the dependence of the mean value on the constellation point, the absolute value of the reception amplitude can be used so that 99.7% of all absolute values of the reception amplitudes are within $|\mu| \pm 3\sigma$.

If the mean value of the absolute value of the reception amplitude and the standard deviation are known (e.g. from section 2), a threshold value can be set with the help of the theory described above, which defines whether the symbols/samples are within the noise variance or not.

The reception power and the noise variance from section 2 can be converted into the mean value of the reception amplitude and the standard deviation of the noise.

All the symbols which are not within the threshold value are presumably disturbed and can be set to zero. These symbols have no influence on the following decoding of the FEC.

Due to the fact that 99.7% of all undisturbed symbols are within the limit, 0.3% of all symbols that have not been disturbed are erroneously assumed to be disturbed and discarded, but this does not have a major impact on performance.

In practice, it has been shown that estimation errors can occur when determining the mean value of the absolute value of the reception amplitude and the standard deviation. Thus, in some scenarios, it is more reasonable to slightly adjust the threshold value, e.g. by choosing a slightly higher threshold value of e.g. $|1.2 \cdot \mu| \pm 4\sigma$ instead of the ideal threshold value $|\mu| \pm 3\sigma$.

It is also possible to use several thresholds iteratively until the decoder reports a correct CRC, for example.

In embodiments, a threshold value can be determined on the basis of the mean value of the reception amplitude and the standard deviation of the noise, above which all symbols are marked as disturbed. These disturbed symbols may not be taken into account or set to zero when decoding the FEC.

Figure 17:
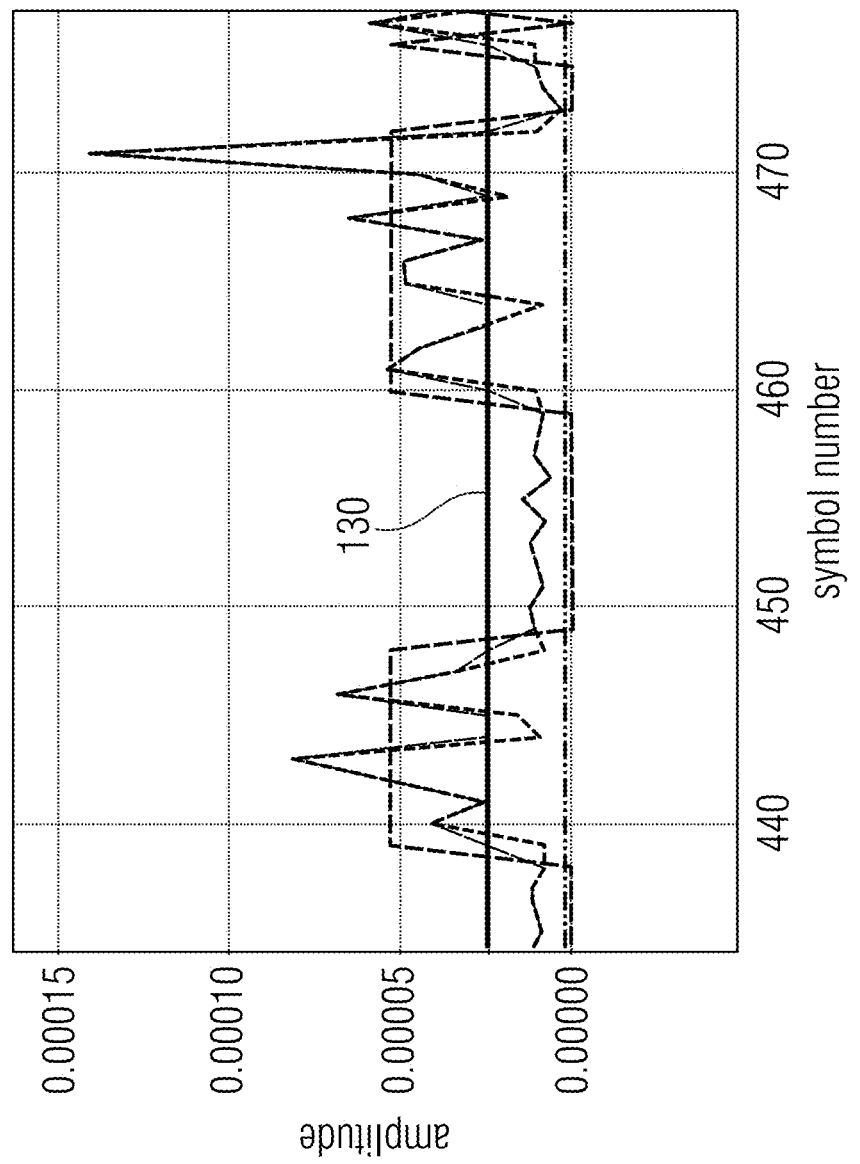
FIG. 17 shows, in a diagram, a course of the absolute values of the amplitudes of a packet portion with disturbances.

FIG. 17 shows a course of the absolute values of the amplitudes of a packet section with disturbances in a diagram. The ordinate describes the amplitude and the abscissa describes the symbol number. In FIG. 17, line 130 describes the determined threshold value so that all symbols above this threshold value are presumably disturbed.

As can be seen in FIG. 17, there are a few symbols which are below the threshold, between the disturbed symbols. However, short disturbances that only last for one or two symbols usually do not or only very rarely occur so that it can be assumed that the symbol between two disturbed symbols is also disturbed.

Due to the unknown modulation type and the unknown modulation rate of the disturber, it may happen that, due to the filtering in data receiver 110, a disturbed symbol has a reception amplitude which is within the permissible range.

To ensure that these symbols are also suppressed when decoding the FEC, "median filtering" can be used.

With this filtering, the neighboring symbols of disturbed symbols can also be marked as disturbed. That means if the previous and the following symbol are disturbed, the current symbol is also considered to be disturbed.

Alternatively, a symbol can be marked as disturbed if only the previous or the following symbol is marked as disturbed. This can be extended to include the next to last and the next but one symbol.

When using more than one symbol in the past/future, the symbols can be weighted according to the distance (e.g. a symbol which is closer to the current symbol has a higher weighting).

In embodiments, a decision can also be made on the basis of the symbols marked as disturbed, e.g. by using a rule for the neighboring symbols, as to whether they are disturbed. In this case, symbols below the threshold value can also be marked as disturbed and/or weighted less.

The rule can contain the previous, the following or both symbols. Optionally, several symbols can be inserted in the past and the future for the decision.

6. Weighting the Disturbed Symbols in Static Channels on the Basis of Transmission Power and Noise Variance According to their Probability of being Disturbed In embodiments, the data receiver 110 can be configured to weight symbols or samples of the signal section 126 based on a distribution (e.g. Gaussian curve) of receive information of the histogram for further processing (e.g. decoding or detection) (e.g. of received data packets or partial data packets) (e.g. to suppress interferences of the interference-infested channel).

Figure 18:
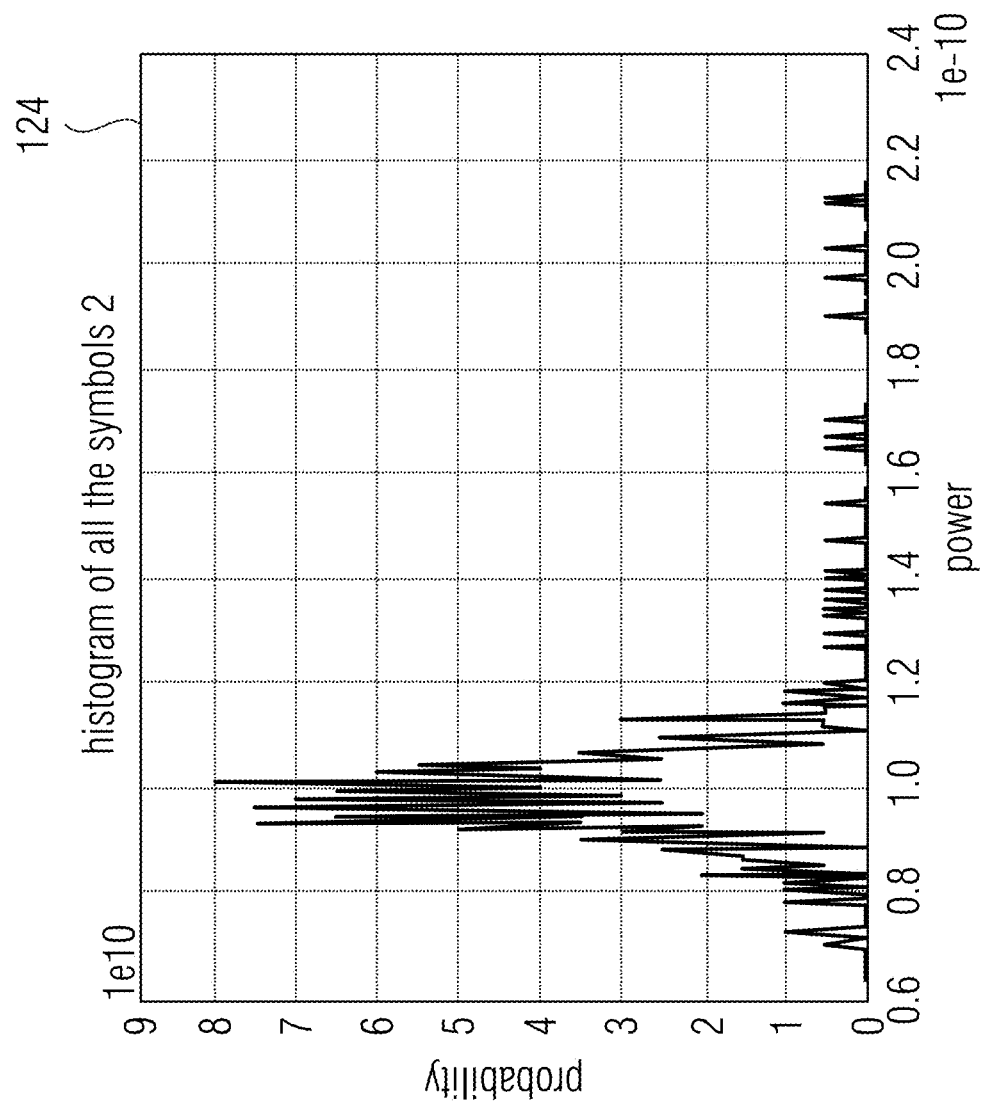
FIG. 18 shows, in a diagram, a histogram of the reception powers of samples or symbols of a received signal, the received signal having disturbances (interferences)

FIG. 18 shows a histogram 124 of reception powers of samples or symbols of a received signal 120 in a diagram, the received signal comprising 120 disturbances (interferences). In other words, FIG. 18 shows a section of a histogram of the powers of the symbols of a received telegram with disturbances.

As can be seen in FIG. 18, the Gaussian curve with the undisturbed symbols is distributed around the power 1 e−10. The symbols whose powers are shown on the far right in FIG. 18 are obviously disturbed and can be discarded. For symbols whose power is closer to the Gaussian curve of the undisturbed symbols, it cannot be clearly determined whether they are disturbed or undisturbed. It can be assumed that the probability that a symbol is disturbed increases with the distance to the Gaussian curve. The higher the power, the higher the probability that the symbol is disturbed (applies to symbols with powers higher than the mean value of the Gaussian curve). When decoding, this information can be used for weighting each received symbol in the form of soft-decision decoding (decoding with reliability information). Here, each symbol can be weighted according to the probability of being disturbed. For example, a symbol can be weighted the lesser, the further its power is from the center of the Gaussian curve.

In embodiments, based on the distribution of the previously determined signal power and noise power in the channel, all symbols can be weighted according to their probability of being disturbed.

7. Multi-Level Disturbance Detection Before and After Synchronization

In embodiments, the signal 120 can comprise at least one data packet or partial data packet 142 which is transferred over the interference-infested channel, the at least one data packet or partial data packet 142 comprising a synchronization sequence, wherein the data receiver can be configured to perform an iterative further processing (e.g. synchronization and/or demodulation) of the at least one data packet or partial data packet 142 based on the synchronization sequence of the at least one data packet or partial data packet 142, and to suppress interferences of the interference-infested channel in at least one iteration step of the iterative detection of the at least one data packet or partial data packet 142.

For example, the interferences of the interference-infested channel can be suppressed by ignoring symbols or samples of the synchronization sequence which are above a threshold value (e.g. reception amplitude threshold). For example, the data receiver can be configured to determine a mean value of e.g. an absolute value of a reception amplitude and a standard deviation of the noise based on the determined mean receive information and the noise variance, and to determine the threshold value (e.g. reception amplitude threshold) based on the determined mean value (e.g. of the absolute value) of the reception amplitude and the standard deviation of the noise.

For example, the interferences of the interference-infested channel can be suppressed by weighting symbols or samples of the synchronization sequence which do not keep a given distance to disturbed symbols, less. For example, the data receiver 110 can be configured not to consider, or weight less, symbols or samples of the signal portion whose reception amplitudes (e.g. whose absolute values of reception amplitudes) are below the threshold value and which have a predetermined distance (e.g. one, two, three, or four symbols or samples) from symbols or samples whose reception amplitudes (e.g. whose absolute values of reception amplitudes) are above the threshold value, during detection or decoding (e.g. of received data packets or partial data packets) (e.g. as symbols or samples of the signal portion whose reception amplitudes (e.g. whose absolute values of reception amplitudes) are below the threshold value).

For example, the interferences of the interference-infested channel can be suppressed by weighting symbols or samples of the synchronization sequence. For example, the data receiver 110 can be configured to weight symbols or samples of the signal portion 126 based on a distribution (e.g. Gaussian curve) of receive information of the histogram for further processing (e.g. decoding or detection) (e.g. of received data packets or partial data packets).

In embodiments (as described in section 2), however, the algorithms can start after detection but before synchronization.

Since the frequency, time and phase offsets are generally unknown, the synchronization can (e.g. at first) be performed also in the case of a disturbed channel. If the synchronization is carried out on the basis of the input symbols before the disturbance detection, estimation errors can occur due to the disturbed symbols. These errors can be so large, for example, that a subsequent decoding (even with subsequent suppression of the disturbers) is not possible.

It is therefore helpful to carry out interferer suppression before synchronization or to carry it out again after synchronization (taking into account possible interferences of synchronization symbols). There are (according to section 5 and section 6) again two possibilities of exploiting knowledge about disturbed synchronization symbols:

complete suppression of disturbed synchronization symbols using a threshold value (section 5), and/or
weighting of the synchronization symbols according to their reliability (section 6).

This process can be carried out iteratively in several stages, for example by the following steps:

disturber (or interferer) detection and suppression,
new phase synchronization,
new disturber detection and suppression using the newly phase-synchronized receive symbols,
new frequency synchronization,
new disturber detection and suppression using the newly frequency-synchronized receive symbols,
new disturber detection and suppression using the newly frequency-synchronized receive symbols,
new time synchronization,
new disturber detection and suppression based on the newly time-synchronized receive symbols,
final decoding of the information symbols.

In embodiments, one iteration step each for time, frequency and phase estimation can be performed or alternatively one iteration step for all three or only two kinds of synchronization.

In addition to this, several iteration steps can be performed for one kind of synchronization, like for example:

disturber detection and suppression,
new phase synchronization,
new disturber detection and suppression using the newly phase-synchronized receive symbols,
renewed phase synchronization.

This may entail suppressing the suspected interferences before synchronization. By suppressing disturbed symbols, fewer symbols are then available, but the probability is high that they are not disturbed.

If this is done, the following cases may occur:

pilot sequence not disturbed,
pilot sequence partially disturbed, or
pilot sequence fully disturbed For frequency estimation, it is advantageous to use only pilot sequences which are not disturbed. Here, it is important to make sure that enough pilot sequences are left, otherwise the frequency estimation will not be sufficiently accurate.

In embodiments, the remaining pilot sequences can be used for the frequency estimation.

For time and phase estimation, pilot sequences can also be used, which are partially disturbed and in which therefore only a part of the pilot symbols is available. However, it is advantageous that a previously defined minimum number of pilot symbols are available.

With the remaining pilot sequences, the time estimation can then be performed. For the phase estimation, a single value can usually be calculated for each signal part. Thus, if the pilot sequence is completely or almost completely destroyed, no phase estimation parameter is available for this part.

All the sequences that are completely destroyed or where more than the previously defined amount of symbols are destroyed can be marked as completely disturbed. This information may be needed in the further process.

In embodiments, a new synchronization can be performed iteratively in several steps. In each iteration step, disturber detection and interference suppression can be performed at first and then a new synchronization of the message, where information about disturbances of synchronization symbols are considered.

After the synchronization is completed, the symbols can be processed further in the data receiver. For example, the ISI can be removed in an MSK or M-PSK.

After this has been done, the disturbance detection and disturbance suppression for the data symbols can be performed again according to section 3. The pilot symbols can also be subjected to disturbance detection and suppression, but they are normally no longer required for further processing.

After all the data symbols have been subjected to the disturbance detection, the information about the disturbed pilot sequences obtained in the first disturbance detection can be used again. All data areas in which the pilot sequence is completely disturbed or is disturbed beyond the defined value can be completely suppressed, because for these areas at least no phase estimation is available.

If the telegram splitting method [1] is used, such a range can typically comprise a partial data packet 142 or, in the case of two pilot sequences, half of a partial data packet.

After this step has been carried out, the remaining symbols can be fed to the FEC for further processing and then decoding.

In embodiments, a further disturbance detection and suppression can be performed after synchronization for the data symbols. Previously detected (completely) disturbed pilot sequences can mark a complete area as disturbed.

8. Optimized LLR Scaling on the Static Channel for AWGN and Interference Disturbance In the following embodiments, it is assumed that the detection and synchronization regarding time, frequency and phase position as already mentioned above has taken place. Detection and synchronization can be based on one of the embodiments in sections 2 to 7. However, it is also possible for the detection and synchronization not to be based on one of the embodiments of sections 2 to 7, but that another detection and/or synchronization was performed.

In asynchronous transfer, these tasks are performed before coherent demodulation for each packet, independently of the previously received packets. For example, one of the embodiments described above in section 4 can be used to improve frequency and phase synchronization, although other methods can also be applied.

Embodiments of the present invention can be used in a radio-based system with asynchronous packet transfer, in which the transmission pauses are considerably longer than the packet duration and in which telegram splitting (TSMA) is applied. Telegram splitting is described in DE 10 2011 082098 B4 and [1]. Embodiments prove to be particularly robust in interference-limited systems in which a plurality of data transmitters 100 transmit uncoordinated telegrams which are to be received and decoded by a single data receiver 110, as is the case, for example, in telemetry systems, sensor networks and all future applications under the keyword Internet of Things (IoT).

Embodiments are mainly concerned with scaling the soft-decision values (e.g. bits with reliability information) provided by the demodulator, which are used for the decoding of various FEC (forward error correction) codes such as block codes, convolutional codes, and their concatenated variations [5], since they contain significantly more information than pure hard-decision values (e.g. hard-decision bits (without reliability information)) and thus provide a significantly lower packet error rate. The soft-decision values can be called Log-Likelihood Ratios (LLRs) [5], for example.

In telegram splitting, each packet can be split into A partial data packets 142 (also called sub-packets or hops), wherein each partial data packet 142 can contain its own pilot sequence (often called training sequence or synchronization sequence) having P modulation symbols known to the data receiver 110. The pilot sequence is also called preamble or midamble if it is located at the beginning or in the middle of the partial data packet 142. A pilot sequence can also be distributed within the partial data package 142 in the form of two or more partial sequences between which the data symbols are transferred. It is common practice to take the pilot symbols from the same modulation alphabet as the data symbols.

Figure 19:
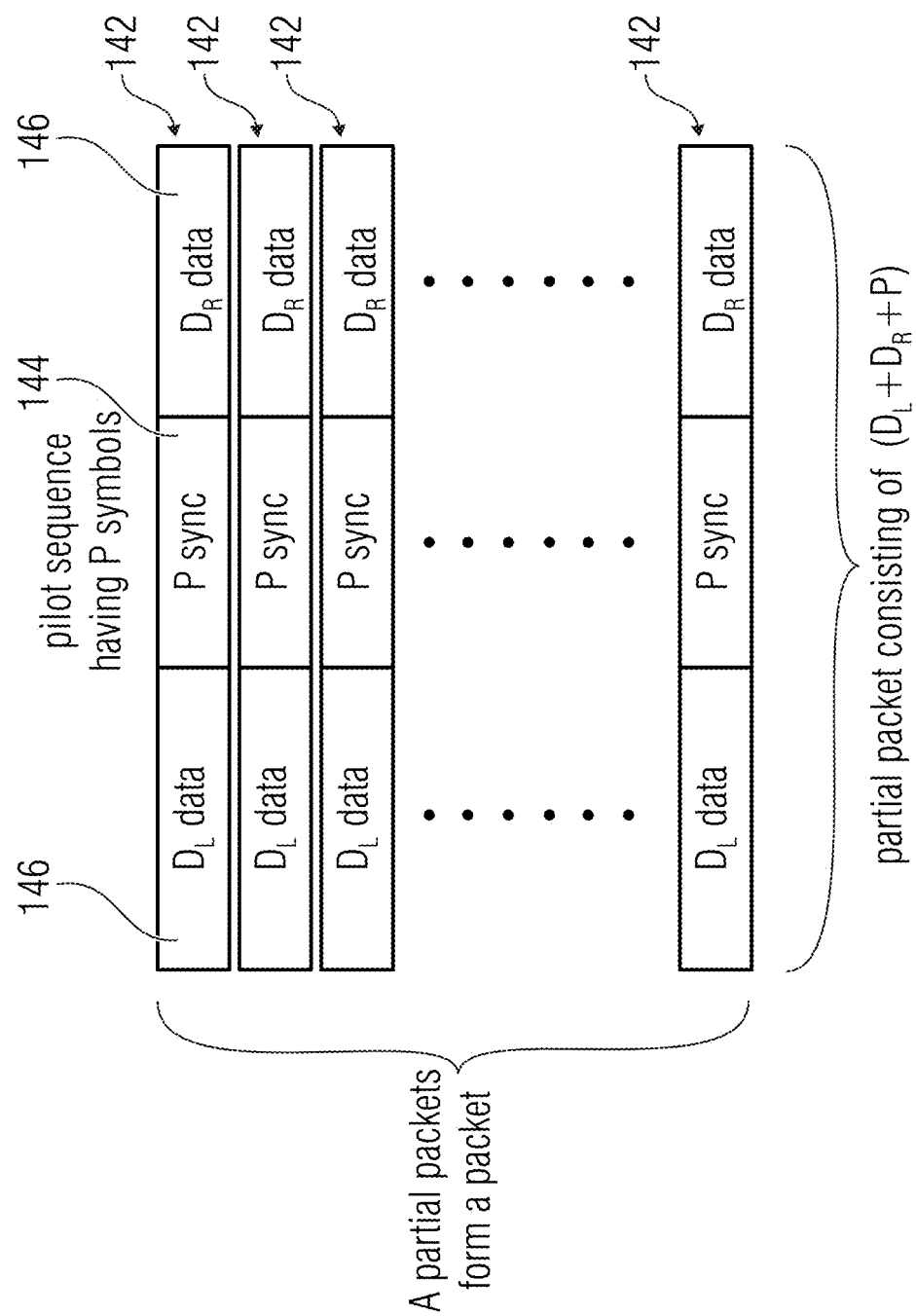
FIG. 19 shows a schematic view of a plurality of partial data packets, the partial data packets comprising a pilot sequence (or synchronization sequence) with P pilot symbols (or synchronization symbols) and two data sequences with DL+DR data symbols.

FIG. 19 shows a schematic view of a plurality of partial data packets 142, the partial data packets 142 comprising a pilot sequence (or synchronization sequence) having P pilot symbols 144 (or synchronization symbols) and two data sequences having DL+DR data symbols 146. In other words, FIG. 19 shows a possible structure of the A partial packets 142 (exemplary packet division into partial data packets 142 with midamble and data blocks). The P symbols 144 of the pilot sequence are located approximately in the middle of the individual partial data packets 142, surrounded by the two data blocks, which in turn may have different lengths (here marked DL and DR).

The method described in the following assumes a static channel, which means that there is no temporal change of the channel during the transfer of all the partial data packets 142. This will, for example, be fulfilled approximately if both data transmitter 100 and data receiver 110 are stationary. Furthermore, a modulation method with the same amplitude is assumed for all the constellation points (all symbols lie on the unit circle, as in MSK or FSK, for example). Then, besides the known pilot symbols 144, also the unknown data symbols 146 can be used to determine the disturbance variance.

In newer data receivers 110 of radio-based systems, it is common practice to mix the reception signal 120 down to the baseband after bandpass filtering and to sample and quantize it equidistantly in time using an analog-to-digital converter (ADC). Each sample value can be complex-valued and have a real and an imaginary part. The sampling can be performed at least in symbol clock or a multiple thereof (oversampling). With the P known pilot symbols p 144 and the reception signal values r at these positions, it is possible in a first step to estimate the impulse response $$\hat{h}^{(a)} = \frac{1}{P} \sum_{\mu=0}^{P-1} r^{(a)}_{\mu+D_L} \cdot p_\mu, \, a = 1 \ldots A$$

for each of the A partial data packets 142, where the index μ refers to the symbol position within the partial data packet 142 and the index a refers to the respective partial data packet. Furthermore, it can be assumed that the complex coefficient of the impulse response has a length of 1 and thus no inter-symbol interference is present. An estimation of the noise power for each partial data packet 142 can be made on the basis of calculating a difference signal between the reception signal and the reconstructed signal according to $$\hat{N}^{(a)} = \frac{1}{P} \sum_{\mu=0}^{P-1} \left( r^{(a)}_{\mu+D_L} - \hat{h}^{(a)} \cdot p_\mu \right)^2, \, a = 1 \ldots A$$

Figure 20A:
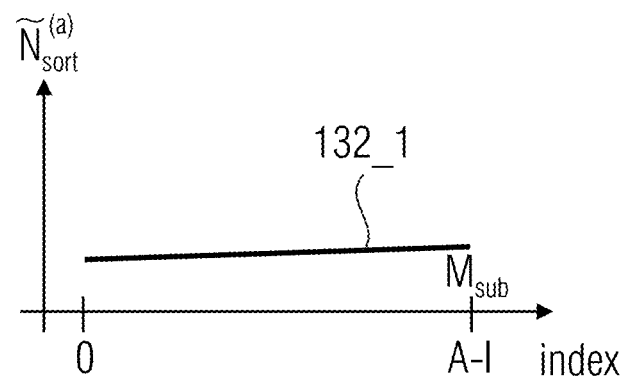
FIG. 20a shows, in a diagram, a course of sorted interference powers of received partial data packets, the partial data packets not being disturbed by an interferer.

In the case of a pure white Gaussian distribution AWGN (additive white Gaussian noise) disturbance, all A estimated noise powers would be approximately equal within their averaging accuracy (see also FIG. 20*a*). However, it cannot be assumed that all A pilot sequences are free of interference disturbances. Depending on the load, more and more pilot sequences will be disturbed by interference. In order to estimate the number of pilot sequences disturbed by interference, the estimated disturbance powers $\hat{N}^{(a)}$ per partial data packet 142 can be sorted in ascending order $$[\tilde{N}_{sort}^{(a)}, idx] = \text{sort}\{\hat{N}^{(a)}\}.$$

Figure 20B:
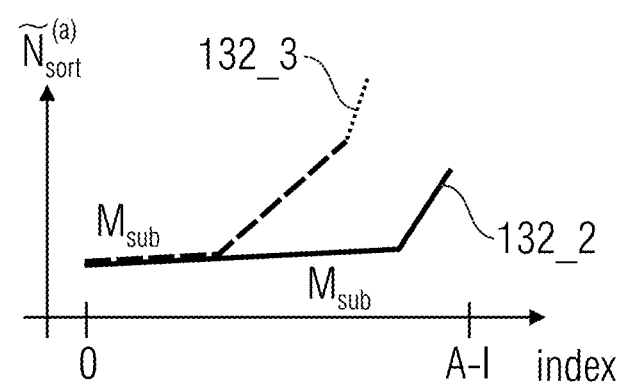
FIG. 20b shows, in a diagram, courses of sorted interference powers of received partial data packets, where a different number of partial data packets are disturbed by an interferer.

FIG. 20*a* shows a course 132_1 of sorted disturbance powers of received partial data packets 142 in a diagram, where the partial data packets are not disturbed by a disturber. FIG. 20*b* shows the courses 132_2 and 132_3 of sorted disturbance powers of received partial data packets 142 in a diagram, wherein a different number of partial data packets 142 are disturbed by a disturber. In FIGS. 20*a* and 20*b*, the ordinate describes the disturbance power and the abscissa the index. In FIG. 20*b*, a first curve 132_2 describes a course of sorted disturbance powers for the case that few partial data packets 142 are disturbed by a disturber, while a second curve 132_3 shows a course of sorted disturbance powers for the case that many partial data packets 142 are disturbed by a disturber.

In other words, FIGS. 20*a* and 20*b* show three schematic courses 132_1 to 132_3. FIG. 20*a* shows the interference-free case, while FIG. 20*b* shows two courses 132_2 and 132_3 with different loads. If a pilot sequence is disturbed by an interferer, the estimated interference power in this partial data packet increases the more pilot symbols are disturbed by the interferer and in dependence on the interference power of the interferer.

As can be seen from FIGS. 20*a* and 20*b*, $M_{sub} \in L_u \ldots A-1$ partial packages that are not corrupted by interference are to be determined. Without limiting the generality, it can be assumed that not all A partial packets are disturbed by interference, but a minimum number of Lu partial packets are disturbed only by AWGN.

For the determination of $M_{sub}$, there are different possibilities. For example, over the first $L_u$ sorted values of $\tilde{N}_{sort}^{(a)}$, an initial mean value $\tilde{N}_{var}$ can be formed. This mean value can then be multiplied by a gain factor X (for example X=2.5) and then compared with the sorted ($L_u$+1)-th disturbance power. If this ($L_u$+1)-th disturbance power is greater than the mean value weighted with X, then the loop is aborted and $M_{sub}=L_u$ applies. Otherwise, the loop counter can be increased from $L_u$ to $L_{u+1}$ and a new average value $\tilde{N}_{var}$ be formed over the first ($L_u$+1) sorted values of $\tilde{N}_{sort}$. Then, the ($L_u$+2)-th disturbance power is compared again with the new average value weighted with X. This loop, which can run up to a maximum of A−1, determines the largest possible number of $M_{sub}$ partial data packets 142, which is not corrupted by interference. The final impulse response can then be determined via the $M_{sub}$ selected partial data packets 142:

$$\hat{h} = \frac{1}{P \cdot M_{sub}} \sum_{m=0}^{M_{sub}-1} \sum_{\mu=0}^{P-1} r^{(idx(m))}_{\mu+D_L} \cdot p_\mu$$

The reception signal r 120 can then be scaled with the complex scalar 1/h so that the resulting impulse response becomes h=1.

In the noise-free case, the undisturbed RX symbols are then equal to +1 or −1. An estimation of the symbol-based squared noise values for each symbol clock k can then be calculated with $$\hat{n}_k = (|r_k| - 1)^2 \quad (1)$$

for all pilot and data symbols of a partial data packet. For practical reasons, it proves to be useful to limit the squared noise values downwards by means of a threshold $0 \leq \Theta$ (for example $\Theta = 0.1$):

$$n_k = \max(\hat{n}_k, \Theta) \quad (2)$$

The symbol-based log likelihood ratios of all $A \cdot (D_L + D_R)$ data symbols of a partial data package 142 are, for example, calculated according to:

$$LLR_k = \frac{2 \cdot r_k}{\sigma_k^2} \quad (3)$$

where $r_k$ represents the undisturbed RX symbols and $\sigma_k^2/2$ represents the symbol-based noise variance of the quadrature component of real and imaginary parts.

Embodiments now deal with the question how the noise variance $\sigma_k^2$ for each symbol clock k can be estimated best starting from the symbol-based squared noise values $n_k$ limited downwards.

In the case of a pure white Gaussian distribution noise (AWGN), averaging over all noise values of a complete packet, i.e. $A \cdot (D_L + D_R + P)$ values, would be most favorable:

$$\hat{\sigma}_{AWGN}^2 = \frac{1}{A \cdot (D_L + D_r + P)} \sum_{\mu=0}^{A \cdot (D_L + D_R + P) - 1} n_\mu.$$

All LLR values would then be scaled with this one value. However, due to the uncoordinated transfer of data from many participants, disturbing superimpositions by signals from other participants can occur at any time, which may originate from both the own network and other networks. Such interference disturbances start at unknown times and can also have different durations. It can be assumed, however, that the disturbances in adjacent partial data packets 142 are usually independent of each other. Therefore, the best possible LLR scaling is found for both the more noisy AWGN disturbance as well as for the strongly interference dominated case.

Figure 21:
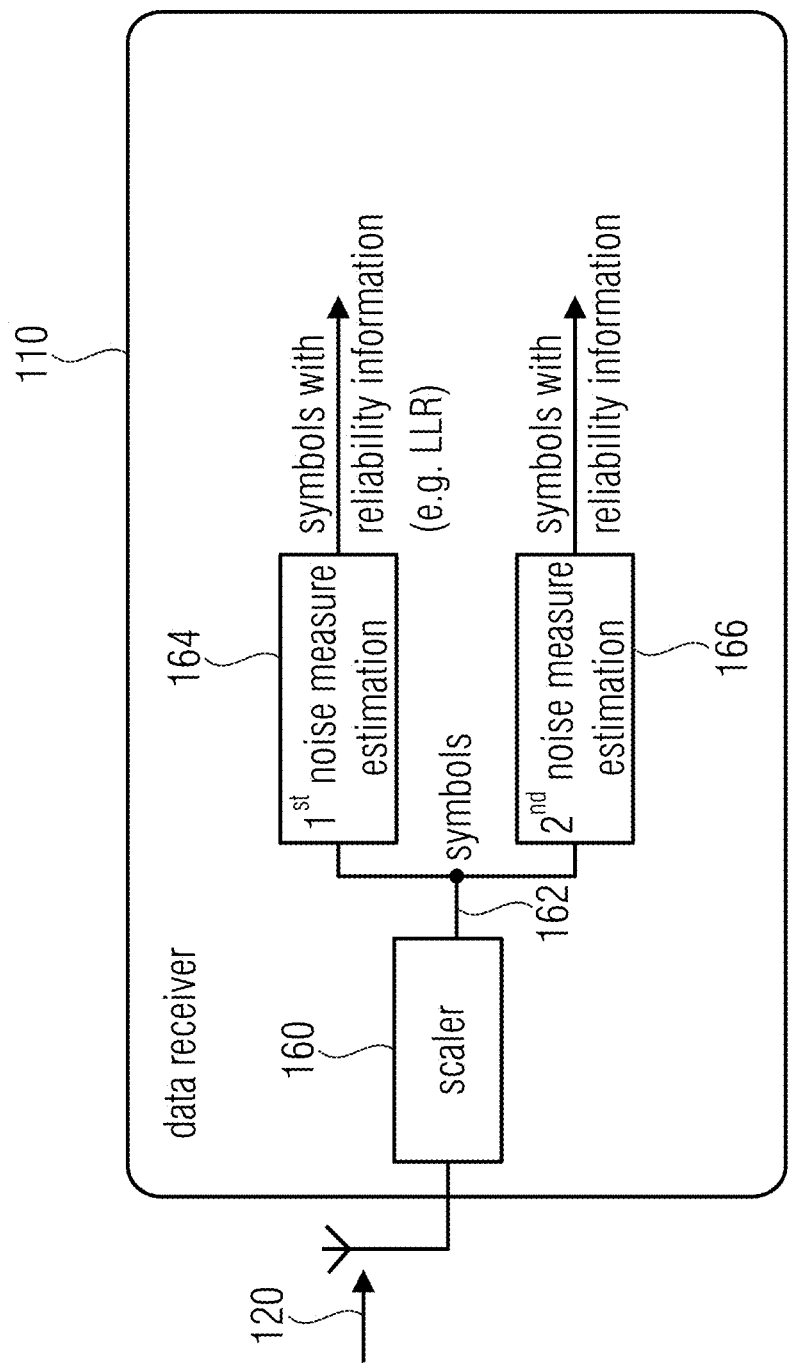
FIG. 21 shows a schematic block diagram of a data receiver, according to an embodiment

FIG. 21 shows a schematic block diagram of a data receiver 110 according to an embodiment. The data receiver 110 can be configured to receive a signal 120 and scale it with an averaged impulse response 160 (e.g. using a scaler) to obtain received symbols 162, the signal 120 comprising interferences of an interference-infested transmission channel, the signal 120 comprising at least one partial data packet 142 (e.g. a plurality of partial data packets) transmitted over the interference-infested channel.

The data receiver 110 can be configured to determine reliability information (e.g. LLR values) for the received data symbols 162 of the at least partial data packet 142 (e.g. per partial data packet 142) based on a first symbol-based noise measure estimation 164 (e.g. by means of a first noise measure estimator) (e.g. AWGN-optimized LLR scaling) and/or a second symbol-based noise measure estimation 166 (e.g. by means of a second noise measure estimator) (e.g. interference-optimized LLR scaling).

The data receiver 110 can be configured to determine a noise measure over a subset (e.g. the right or left data block in FIG. 19) of the received data symbols of the at least one partial data packet 142 in case of the first symbol-based noise measure estimation 164 (e.g. AWGN-optimized LLR scaling), the subset comprising at least two symbols, The data receiver 110 can be configured to determine a noise measure for the received data symbols of the at least one partial data packet 142 symbol by symbol (e.g. for each data symbol) in case of the second symbol-based noise measure estimation (e.g. interference-optimized LLR scaling).

In the following, embodiments of the first symbol-based noise measure estimation 164 (e.g. AWGN-optimized LLR scaling) and the second symbol-based noise measure estimation 166 (e.g. interference-optimized LLR scaling) are described in more detail.

AWGN-Optimized LLR Scaling

In embodiments, the right and left halves of each of the partial data packets 142 can be viewed separately and separate averaging can be performed, namely $$\hat{\sigma}_k^2 = \frac{1}{D_L + P/2} \sum_{\mu=0}^{D_L + \frac{P}{2} - 1} n_\mu, k = 0 \ldots D_L - 1,$$

for the left data block of each partial data packet 142, and $$\hat{\sigma}_k^2 = \frac{1}{D_R + P/2} \sum_{\mu=0}^{D_R + \frac{P}{2} - 1} n_\mu, k = D_L + P \ldots D_L + D_R + P - 1,$$

for the right data block per partial data packet. In these equations, the index k no longer refers to the complete packet indexing, but to the symbol index within each partial data packet 142. If the lengths of the data blocks of $D_L$ and $D_R$ are not equal but different, the difference in the different lengths of P can be compensated for in such a way that the right and left total averaging lengths are identical in the two equations. Thus, 2A different noise variances are estimated per packet. All LLRs in one of the 2A data blocks are scaled in accordance with a single value of a noise variance. Packet error rate simulations with pure AWGN disturbance have shown that, for the case under consideration, the difference between optimal AWGN scaling or data blockwise scaling is less than 0.2 dB.

Interference-Optimized LLR Scaling

In embodiments, a symbol-wise LLR scaling can be performed in the interference-dominated case, since the disturbance ratios can change significantly from symbol to symbol. Therefore, smoothing of neighboring values of $n_k$ can be performed. The best known smoothing is the polynomial smoothing according to Savitzky and Golay [6]. By using FIR filter coefficients, the data are usually weighted by quadratic or cubic polynomials. However, the method of Savitzky and Golay also allows the simplest smoothing method of measured data, i.e. (weighted) moving averaging. Here, the data points are replaced by the arithmetic mean value of the neighboring points (or a weighted form thereof):

$$\hat{\sigma}_k^2 = \frac{1}{2F + 1} \sum_{\mu = k-F}^{k+F} w_\mu \cdot n_\mu, k = F \ldots D_L + D_R + P - F - 1.$$

The size of the moving window is 2F+1 and $w_\mu$ are the corresponding weights. In our example, F=4 and the window width is 9 values. The first F values of the noise variance at the beginning and at the end of each partial data packet 142 entail special treatment. The noise variances of the first F=4 symbols in each partial data packet are calculated as follows:

$$\hat{\sigma}_0^2 = \frac{1}{F+1}\sum_{\mu=0}^{F} w_\mu n_\mu, \hat{\sigma}_1^2 = \frac{1}{F+2}\sum_{\mu=0}^{F+1} w_\mu n_\mu,$$

$$\hat{\sigma}_2^2 = \frac{1}{F+3}\sum_{\mu=0}^{F+2} w_\mu n_\mu, \hat{\sigma}_3^2 = \frac{1}{F+4}\sum_{\mu=0}^{F+3} w_\mu n_\mu$$

while the last F=4 noise variances show a correspondingly decreasing window width and can be calculated in a correspondingly analogous way. If the window width F would be increased or decreased, the number of special cases at the beginning and at the end would have to be adjusted accordingly.

Further Processing

Before the determined LLRs of a packet are fed to the interleaver and then to the FEC decoder, a limitation of the soft output values, so-called clipping, can be performed:

$$LLR_k = \max\left(\min\left(\frac{2 \cdot r_k}{\hat{\sigma}_k^2}, L_m\right), -L_m\right) \quad (4)$$

For example, $L_m$ can take a value of 13. Similar to eq. (2), eq. (4) tries to avoid a single LLR-value from becoming arbitrarily large. Such measures have a positive effect on the packet error rate.

All degrees of freedom, such as the threshold value Θ and $L_m$ from equation (2) and equation (4), as well as the window size F and the weight factors $w_\mu$ are selected on the basis of simulations in such a way that the packet error rates for the used load scenarios and the different circuit variants are kept as low as possible.

It is clear that only by appropriate interconnection of the two scaling variants (AWGN-optimized LLR scaling and interference-optimized LLR scaling) can a satisfactory packet error performance be achieved both in the pure AWGN case and in the interference-dominated and load-dependent case. Essentially, there are four different combination variations:

1) upstream detection to select an option (FIG. 22)
2) LLR combining with subsequent decoding (FIG. 23)
3) 2-way processing with post-selection (FIG. 24)
4) multi-way processing with post-selection The variations 1) to 4) are arranged according to their increasing complexity and are expected to show better and better performance with increasing ranking.

Figure 22:
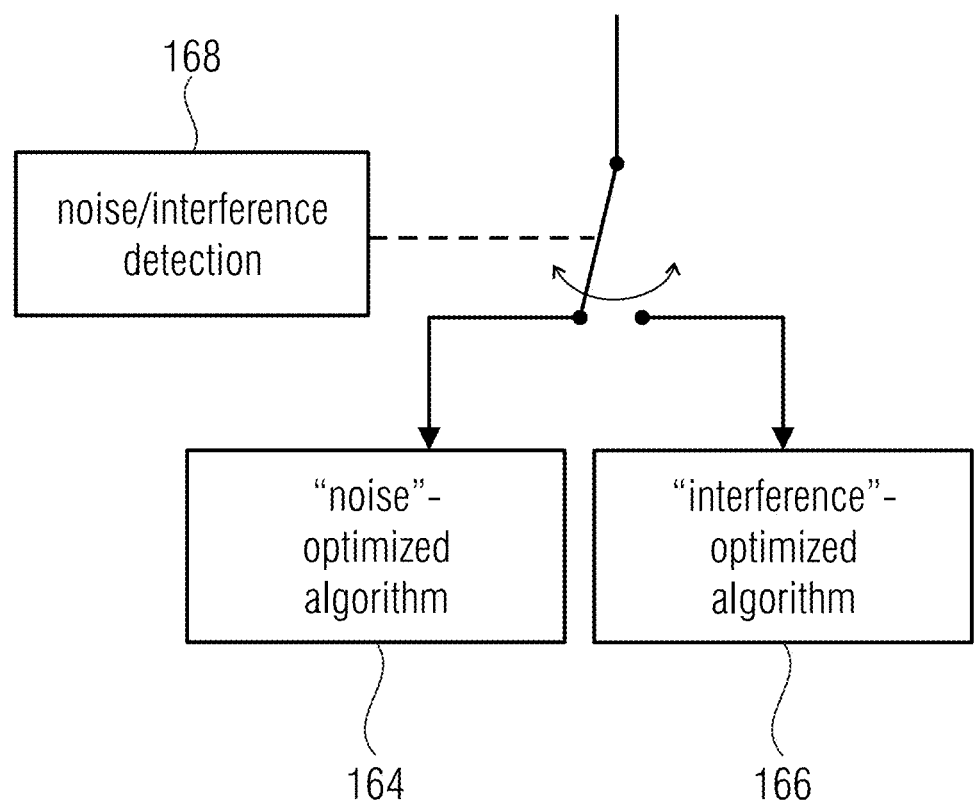
FIG. 22 shows a schematic view of interference detection upstream of the first symbol-based noise measure estimation and the second symbol-based noise measure estimation, for selecting the first symbol-based noise measure estimation or the second symbol-based noise measure estimation based on the interference rate, according to an embodiment.

According to the first variation, the data receiver 110 in embodiments can be configured to determine an interference rate of the interference-infested channel, and to determine, in dependence on the determined interference rate, the reliability information (LLR values) for the received symbols of the at least one partial data packet 142 either based on the first symbol-based noise measure estimation (AWGN-optimized LLR scaling) or based on the second symbol-based noise measure estimation (interference-optimized LLR scaling), as is shown in FIG. 22.

In detail, FIG. 22 shows a schematic view of an interference detection 168 preceding the first symbol-based noise measure estimation 164 and the second symbol-based noise measure estimation 166, for selecting the first symbol-based noise measure estimation 164 or the second symbol-based noise measure estimation 166 based on the interference rate.

In other words, FIG. 22 shows a schematic view of an upstream noise or interference detection for selecting an option. Variation 1 according to FIG. 22 tries to make a selection whether the partial data packet 142 is more noisy or interference-infested, by means of an evaluation, for example based on the embodiments of sections 2 and 3. Accordingly, the first symbol-based noise measure estimation (AWGN-optimized LLR scaling) or the second symbol-based noise measure estimation (interference-optimized LLR scaling) is then performed. This hard-switched approach is likely to achieve the worst performance. To be used only with very limited computing resources.

Figure 23:
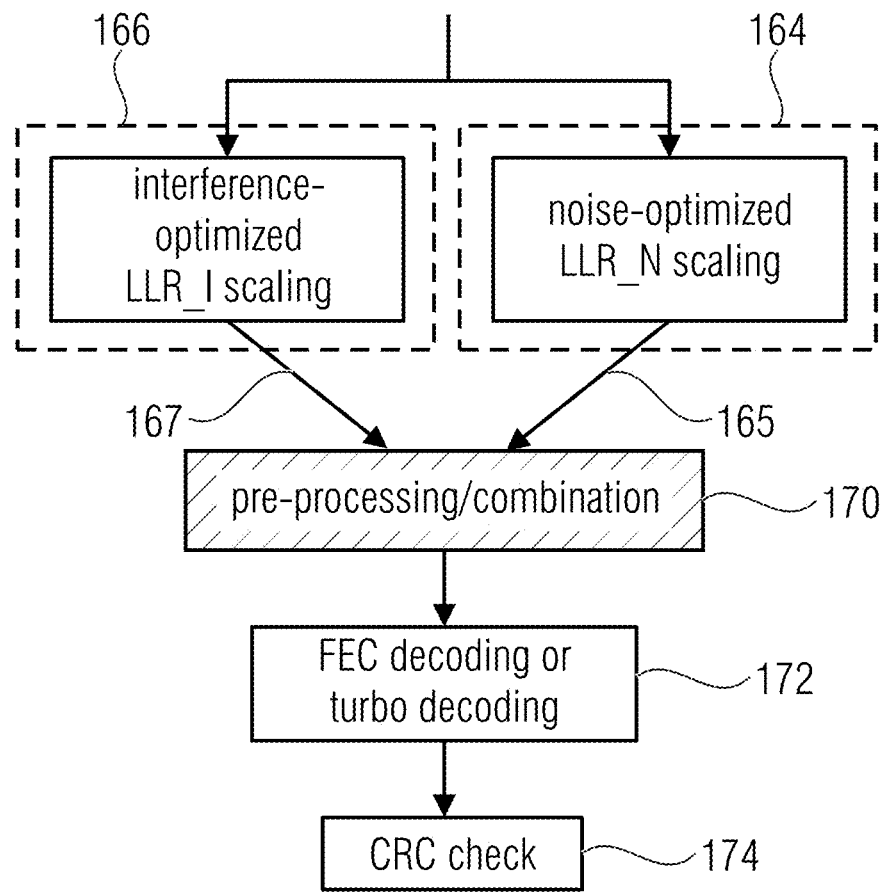
FIG. 23 shows a schematic view of a combination downstream of the first symbol-based noise measure estimation and the second symbol-based noise measure estimation, and further processing of the first reliability information provided by the first symbol-based noise measure estimation and the second reliability information provided by the second symbol-based noise measure estimation, according to an embodiment.

According to the second variation, the data receiver 110 in embodiments can be configured to determine the reliability information (e.g. LLR values) for the received data symbols of the at least one partial data packet 142 separately based on the first noise measure estimation (AWGN-optimized LLR scaling) and the second noise measure estimation (interference-optimized LLR scaling) to obtain first reliability information and second reliability information and, as is shown in FIG. 23, combine 170 for further processing (e.g. decoding 172 (e.g. FEC decoding or turbo decoding) and verification 174 (e.g. CRC check)).

In detail, FIG. 23 shows a schematic view of a combination 170 downstream of the first symbol-based noise measure estimation 164 and the second symbol-based noise measure estimation 166 and further processing 172, 174 of the first reliability information provided by the first symbol-based noise measure estimation 164 and the second reliability information 167 provided by the second symbol-based noise measure 166, according to an embodiment.

In other words, FIG. 23 shows an LLR combination with subsequent decoding. As can be seen in FIG. 23, in the second variation, both LLR scaling variations 164 and 166 are performed and then a combination 170 is performed in such a way that the LLRs of both processes 164 and 166 are added up (equally or differently weighted). This second variation should perform significantly better in terms of packet error rate than the first variation.

Figure 24:
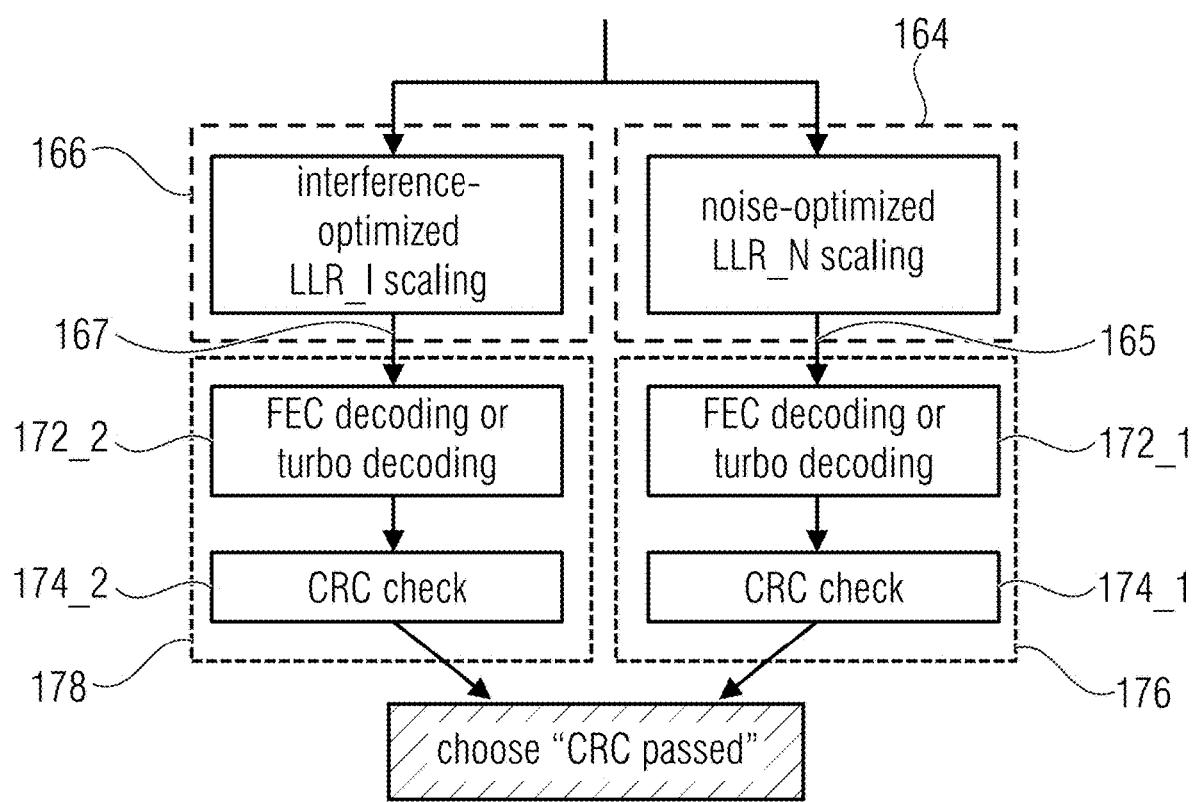
FIG. 24 shows a schematic view of a further separate processing, downstream of the first symbol-based noise measure estimation and the second symbol-based noise measure estimation, of first reliability information provided by the first symbol-based noise measure estimation and second reliability information provided by the second symbol-based noise measure estimation, according to an embodiment.

According to the third variation, the data receiver 110 can be configured to determine reliability information (e.g. LLR values) for the received data symbols of the at least one partial data packet 142 separately based on the first symbol-based noise measure estimation 164 (AWGN-optimized LLR scaling) and the second symbol-based noise measure estimation 166 (interference-optimized LLR scaling) to obtain first reliability information 165 and second reliability information 167 and to process these separately, as is shown in FIG. 24.

In detail, FIG. 24 shows a schematic view of separate further processing 176 and 178, downstream of the first symbol-based noise measure estimation 164 and of the second symbol-based noise measure estimation 166, of the first reliability information 165 provided by the first symbol-based noise measure estimation 164 and of the second reliability information 167 provided by the second symbol-based noise measure estimation 166, according to an embodiment.

As can be seen in FIG. 24, further processing 176 of the initial reliability information 165 provided by the first symbol-based noise measure estimation 164 can include decoding 172_1 (e.g. FEC decoding or turbo decoding) and checking 174_1 (e.g. CRC check). Further processing 178 of the second reliability information 167 provided by the second symbol-based noise measure estimation 167 can include decoding 172_2 (e.g. FEC decoding or turbo decoding) and checking 174_2 (e.g. CRC check), outputting the values that pass the checking.

In other words, FIG. 24 shows 2-way parallel processing with post-selection. In the third variation, each LLR scaling variation also has its own decoding pass with its own CRC check. If no CRC error occurs in at least one of the variations, then the partial data packet has been successfully transferred. This 2-way solution can be passed sequentially. Starting with interference-optimized scaling, its CRC value is checked. If there is no "successful", the next scaling variation (AWGN) is passed and its CRC is checked. This third (2-way) variation can be extended with the fourth variation by further branches each with different parameter settings. For example, other LLR scaling variations with different window sizes and/or other weight factors can be used, which show a better performance at higher a load, for example. Also the optimal scaling for the AWGN case with $\hat{\sigma}_{AWGN}^2$ can be included in the multi-branch variation. This is only dependent on the available processing resources.

9. Noise Power Determination from the Broadband Signal

In embodiments, interferers are suppressed in the data receiver 110 of a radio transfer system with packet transfer. The radio transfer system can have a high number of data transmitters 100, which emit data packets, which are to be received and evaluated by the data receiver 110, in a non-coordinated way. Non-coordinated in this context means that the temporal and frequency positions of the data packet emissions of the data transmitters 100 are not known in the data receiver 110 and that there are no temporal or frequency relations between the data packet emissions of the data transmitters. The uncertainty regarding the frequency refers to the frequency position within a frequency band assigned to the radio transfer system, which is also used by other radio transfer systems. It follows that the reception signal of a data packet emission of a certain data transmitter 100 arriving at the data receiver 110 can be disturbed in two ways:

1. There may be an overlap in time and/or frequency with a data packet emission of another data transmitter of the same system.
2. There can be an overlap in time and/or frequency with an emission of another system.

In systems with coordinated emissions, special procedures are available for the first case to suppress the mutual disturbance of overlapping emissions. However, in this case, the respective prerequisites do not apply.

Furthermore, there are methods for detecting and suppressing disturbances during symbol processing in the data receiver 110. However, this entails a sufficiently accurate synchronization with respect to frequency, phase and time. However, the disturbances also interfere with the algorithms used for synchronization, so that here, too, the prerequisites are not easily met.

What is needed is a concept that can detect and suppress disturbances in all relevant processing steps in the data receiver 110. In the following, embodiments are described that meet the requirements in all scenarios in which the reception level of a received data packet varies only insignificantly during the packet duration, i.e. no so-called fading is present.

Figure 25:
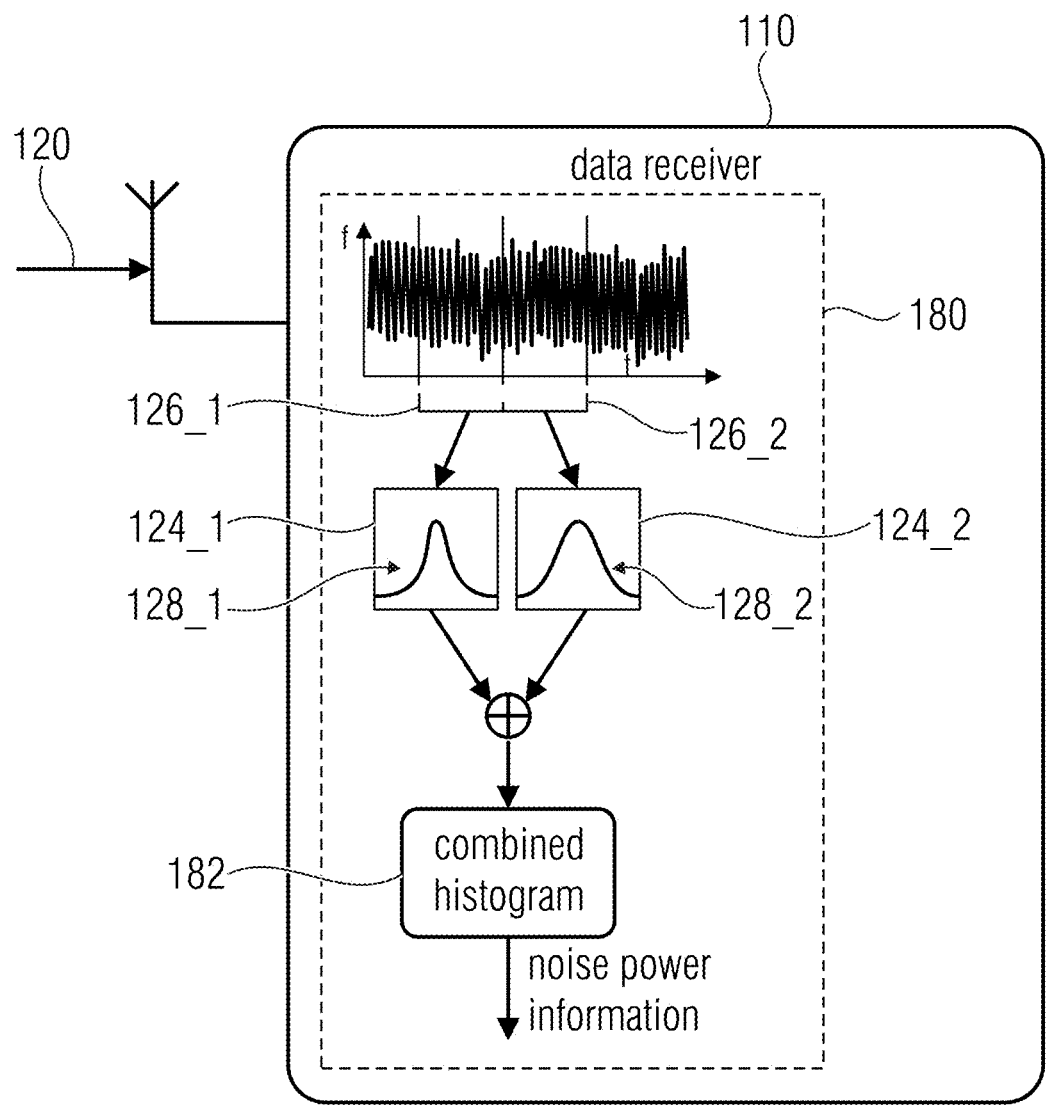
FIG. 25 shows a schematic block diagram of a data receiver, according to an embodiment.

FIG. 25 shows a schematic block diagram of a data receiver 110 according to an embodiment. The data receiver 110 is configured to receive a signal 120, the signal 120 having interferences 122 of an interference-infested transmission channel.

In embodiments, the data receiver 110 (may, for example, comprise a packet detector 180 which) may be configured to form at least two histograms 124_1 and 124_2 of reception power information (e.g. reception powers, logarithmic reception powers) of two different signal portions 126_1 and 126_2 (e.g. of a set of samples or a set of symbols) of the received signal.

For example, the data receiver 110 (or the packet detector 180) can form a first histogram 124_1 of reception power information of a first signal portion 126_1 of the received signal and a second histogram 124_2 of reception power information of a second signal portion 126_2 of the received signal.

The data receiver can further be configured to combine (e.g. add) the at least two histograms 124_1 and 124_2 or distributions 128_1 and 128_2 of reception power information of the at least two histograms 124_1 and 124_2 bin after bin to obtain a combined histogram 182 and to determine noise power information (e.g. noise power) from the combined histogram 182.

In embodiments, the data receiver 110 can be configured to determine first receive information (e.g. reception powers, logarithmic reception powers) for a set of samples or symbols of the first signal portion 126_1, and to form the first histogram 124_1 of the determined first receive information (e.g. reception powers, logarithmic reception powers).

For example, the data receiver 110 can be configured to determine receive information (e.g. reception powers, logarithmic reception powers) for each sample or symbol of the first signal portion 126_1 of the received signal 120, to obtain the determined first receive information for the set of samples or symbols of the first signal section 126_1, and to form the first histogram 124_1 of the determined first receive information.

In embodiments, the data receiver 110 can be configured to determine second receive information (e.g. reception powers, logarithmic reception powers) for a set of samples or symbols of the second signal portion 126_2, and to form the second histogram 124_2 of the determined second receive information (e.g. reception powers, logarithmic reception powers).

For example, the data receiver 110 can be configured to determine receive information (e.g. reception powers, logarithmic reception powers) for each sample or symbol of the second signal portion 126_2 of the received signal 120, to obtain the determined second receive information for the second set of samples or symbols of the second signal portion 126_2, and to form the first histogram 124_1 of the determined second receive information.

In embodiments, the reception power information can be reception powers or logarithmic reception powers.

In embodiments, the data receiver 110 can be configured to determine the noise power information based on a maximum of a distribution of combined reception power information of the combined histogram 182.

Detailed embodiments of the data receiver 110 are described below.

Figure 26:
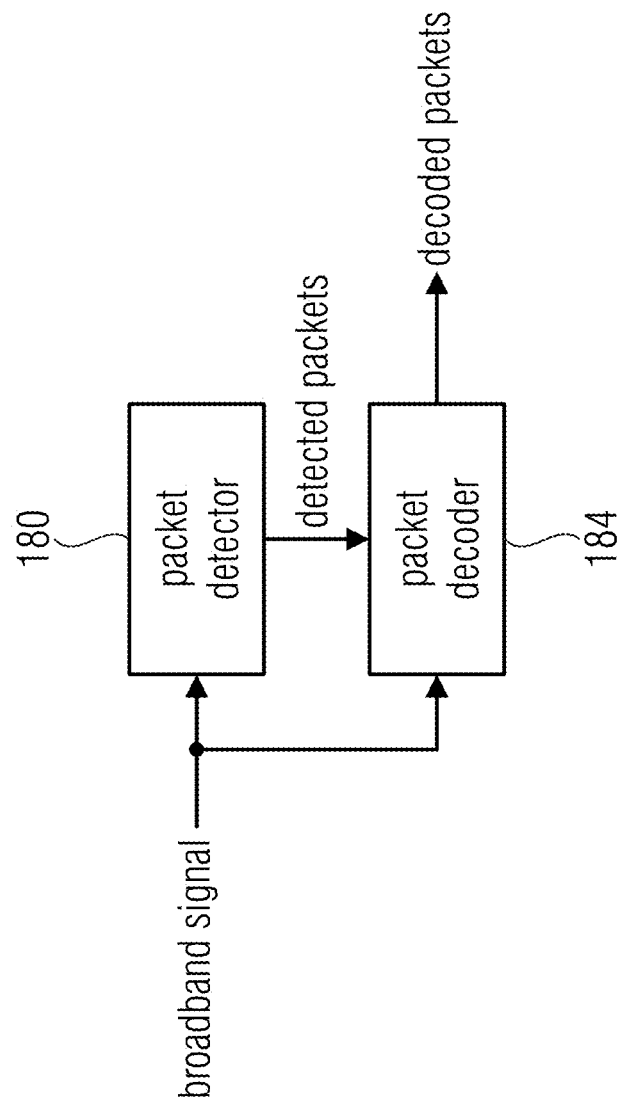
FIG. 26 shows a schematic block diagram of a data receiver, according to an embodiment.

FIG. 26 shows a schematic block diagram of a data receiver 110 according to an embodiment. In other words, FIG. 26 shows processing in the data receiver 110. A packet detector 180 processes the broadband signal at the input and detects existing packets; the time and frequency position of the packets are approximated. On the basis of this information on the position, a packet decoder 184 extracts the time and frequency signal portions used for processing the packet from the broadband signal and then processes them.

Both the packet detector 180 and the packet decoder 184 may be sufficiently resistant to disturbances. The entailed measures in the packet detector 180 are not part of the present invention. It is therefore assumed in the following that the packets can be detected sufficiently accurately even under the influence of the expected disturbances.

Figure 27:
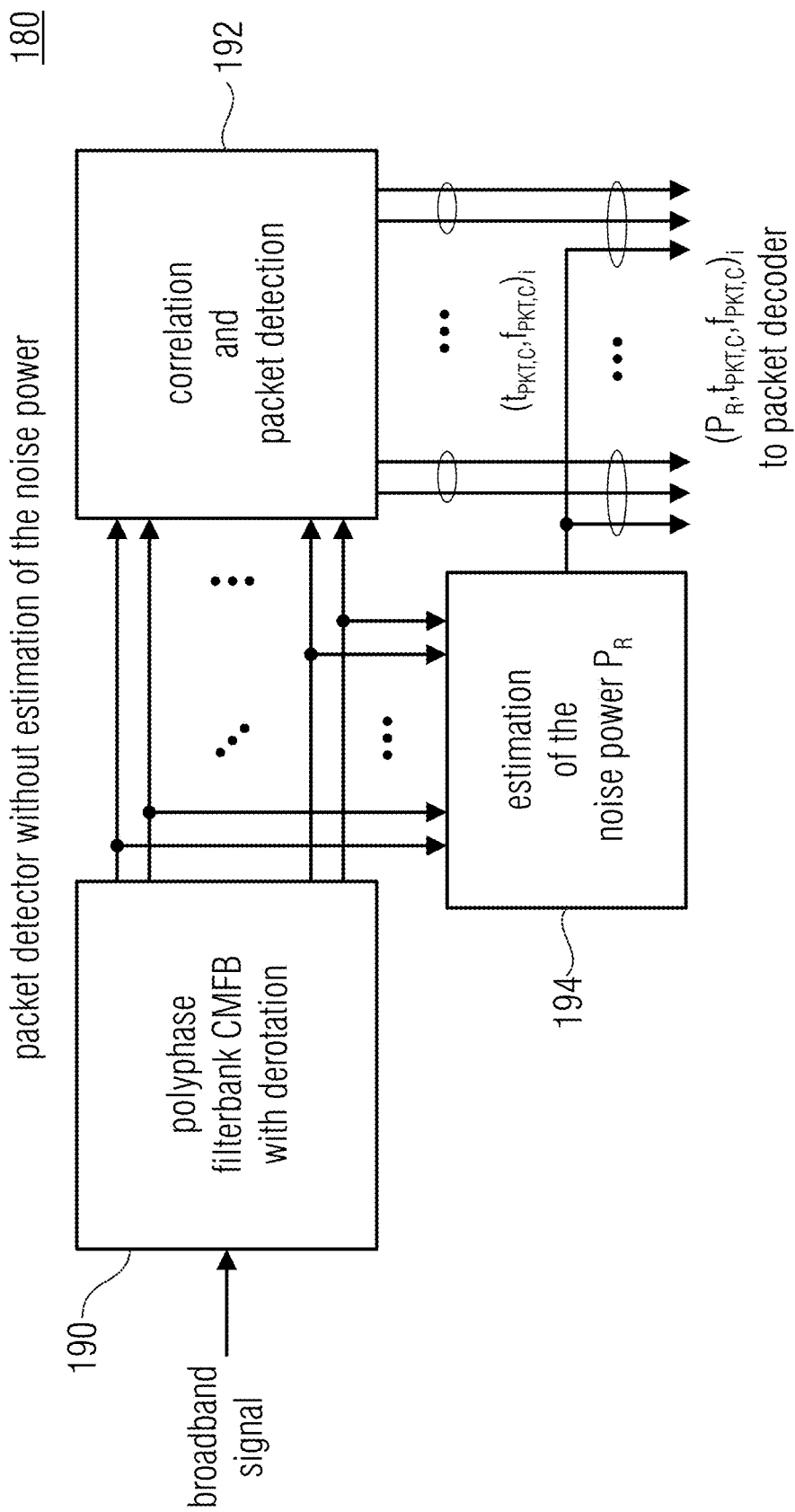
FIG. 27 shows a schematic block diagram of a packet detector of the data receiver, according to an embodiment.

Some embodiments nevertheless also relate to the packet detector 180, since the entailed measures in the packet decoder 184 benefit from knowing the noise power and the packet detector 180 can estimate this quantity much more easily and accurately than the packet decoder 184. In addition to the time and frequency position of a detected packet, the packet detector 180 therefore also transfers the noise power estimated by it to the packet decoder 184 as metadata. FIG. 27 shows the extension of the packet detector 180 for estimating the noise power.

In detail, FIG. 27 shows a schematic block diagram of a packet detector 180 of the data receiver 110 according to an embodiment. The packet detector 180 of the data receiver 110 comprises a filter bank (e.g. a polyphase filter bank) 190, correlation and packet detection 192 and estimation of the noise power PR 194.

In the following, first the estimation of the noise power in the packet detector 180 is described. What follows is a description of the processing in the packet decoder 184.

Estimation of the Noise Power in the Extended Packet Detector

In embodiments, the packet detector 180 can have a polyphase filter bank 190 of high frequency resolution, which can be used to calculate the power density spectrum of the broadband signal. In the following, the noise power $P_R$ is understood to be the noise power in one channel of the filter bank 190, i.e. the product of the noise power density and the noise bandwidth of the filter. Therefore, it can be calculated directly from the squares of the absolute values of the output signals of the filter bank, without further scaling.

As with spectral analyzers, temporal averaging over successive power density spectra is first performed to reduce the variance of the values. However, the averaging factor used for this purpose can be kept relatively low here, since a high occupancy of the evaluated frequency band has to be expected and a too large temporal averaging can prevent a recognizable noise base from forming. In addition, comparatively short broadband disturbances from other systems are to be expected in the provided frequency bands. These disturbances can follow one another very closely and are resolved in time so that an evaluable noise base can be formed. In the present case, an averaging factor M=4 is used.

Averaging is performed by a weighted addition of M successive power density spectra. For the reasons already mentioned, there is no under-sampling in the time direction, i.e. there is no additional temporal fuzziness caused by under-sampling.

Figure 28:
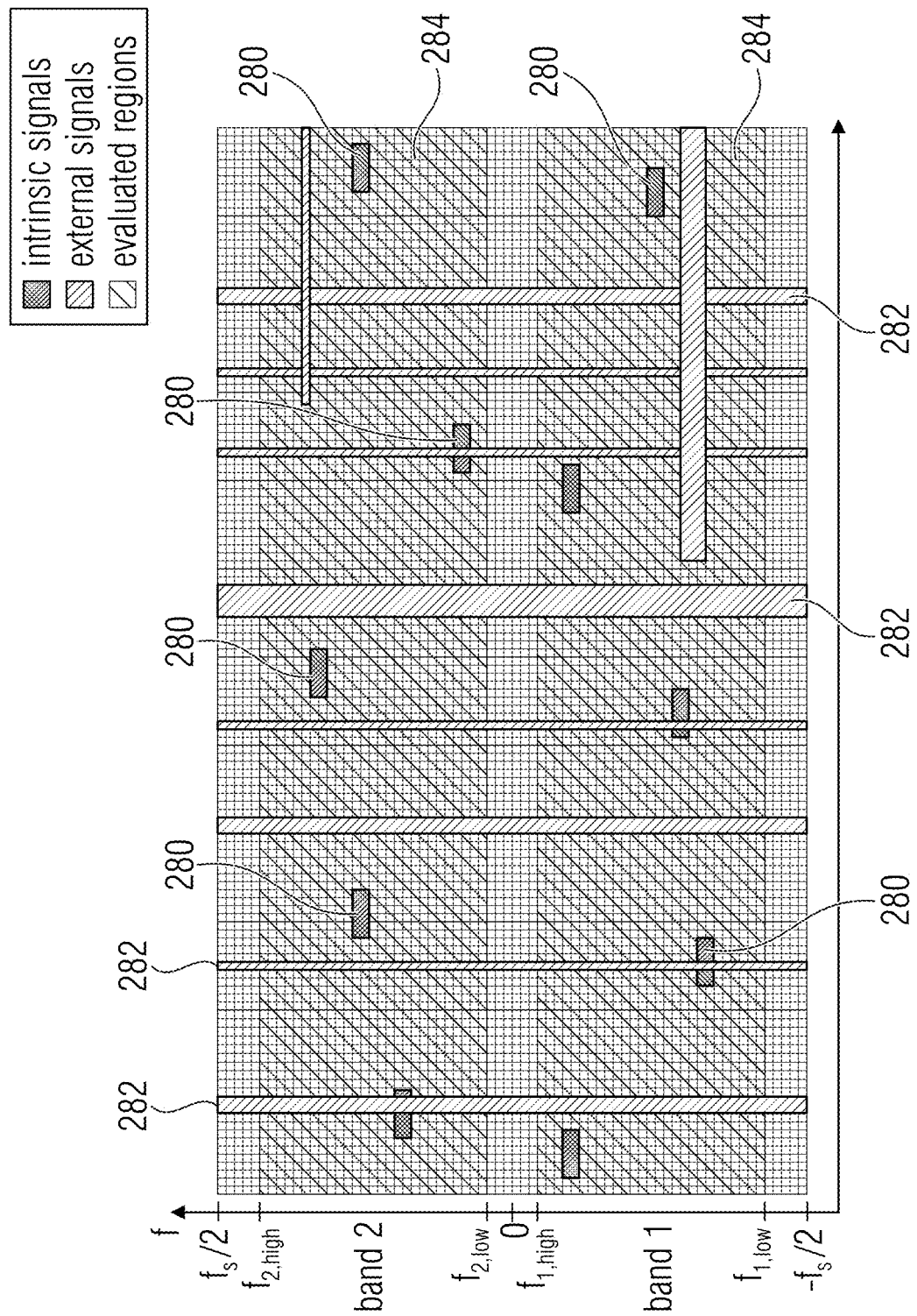
FIG. 28 shows, in a diagram, own signals, external signals and evaluated areas (e.g. channels; band 1, band 2) of the broadband signal.

FIG. 28 shows own signals 280, external signals 282 and evaluated ranges 284 (e.g. channels; band 1, band 2) of the broadband signal in a diagram. The ordinate describes the frequency and the abscissa the time.

In other words, FIG. 28 shows an example of the evaluated areas including an exemplary signal scenario in a diagram. The acquired frequency range, for a sampling rate $f_S$, is the interval $[-f_S/2, f_S/2]$. Within this range, several subranges can be used for evaluation, usually a subrange below the center frequency (band 1) and a subrange above the center frequency (band 2). The ranges at the edges ($f < f_{1,low}$ and $f > f_{2,high}$) are not evaluated, because the frequency response of the broadband signal in these ranges drops due to the preceding filtering of the broadband signal. A narrow region around the center frequency ($f_{1,high} < f < f_{2,low}$) is not evaluated either, which may contain a disturbing DC component or disturbing low-frequency signal components in certain receiver topologies.

The time and frequency resolution of the M-fold averaged power density spectra is indicated by the grid. The signal scenario consists of emissions of the own radio system (intrinsic signals) and transmissions of other radio systems (external signals). The intrinsic signals are narrow-banded compared to the bandwidths of the bands, while the external signals can be narrow-banded or broad-banded. Broadband external signals usually have a shorter duration than the intrinsic signals, whereas narrowband external signals usually have a longer duration. In FIG. 28, all cells of the grid influenced by the signals are marked. The signals themselves, on the other hand, are generally not located within the grid, neither in the time nor frequency direction.

It follows from the illustration in FIG. 28 that there is always a certain number of cells not influenced by the signals, in which, under the condition of a constant noise base (so-called white broadband noise), very similar power values occur, whose expected value corresponds to the noise power $P_R$ sought. On the other hand, in the cells influenced by the signals, there are usually very different power values. It follows that the noise power $P_R$ can be determined by means of a histogram of the power values. Even in scenarios that contain considerably more signals than the example in FIG. 28, a clear maximum is formed in the range of small power values, whose position can be used as an estimate of the noise power $P_R$. This also applies in case this is only a local and not the global maximum of the histogram.

Figure 29:
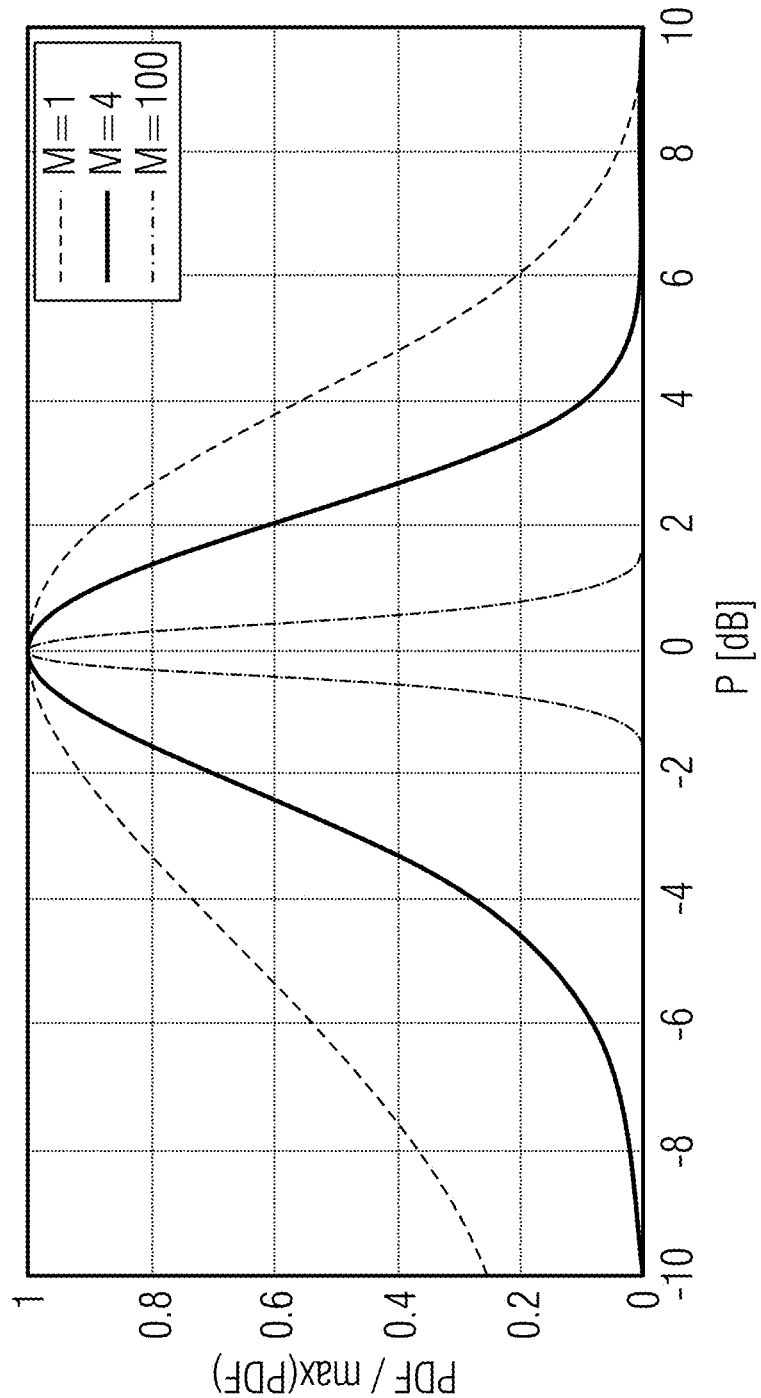
FIG. 29 shows, in a diagram, normalized distributions of the power values for a noise signal with PR=1 or PR=0 dB for different averaging factors M.

FIG. 29 shows a normalized distribution of the power values for a noise signal with $P_R=1$ or $P_R=0$ dB for different averaging factors M in a diagram. The ordinate describes the PDF (probability density function) and the abscissa the power.

For very high averaging factors, a logarithmic representation of the power or linear representation of the power in dB results approximately in a Gaussian distribution. This is the case for M=100. For M=4, however, the distribution is asymmetrical. It can also be seen from FIG. 29 that the resolution of the histogram for M=4 should be in the order of 0.5 dB; in this case, about 8 values are in the range between −2 dB and 2 dB.

Figure 30:
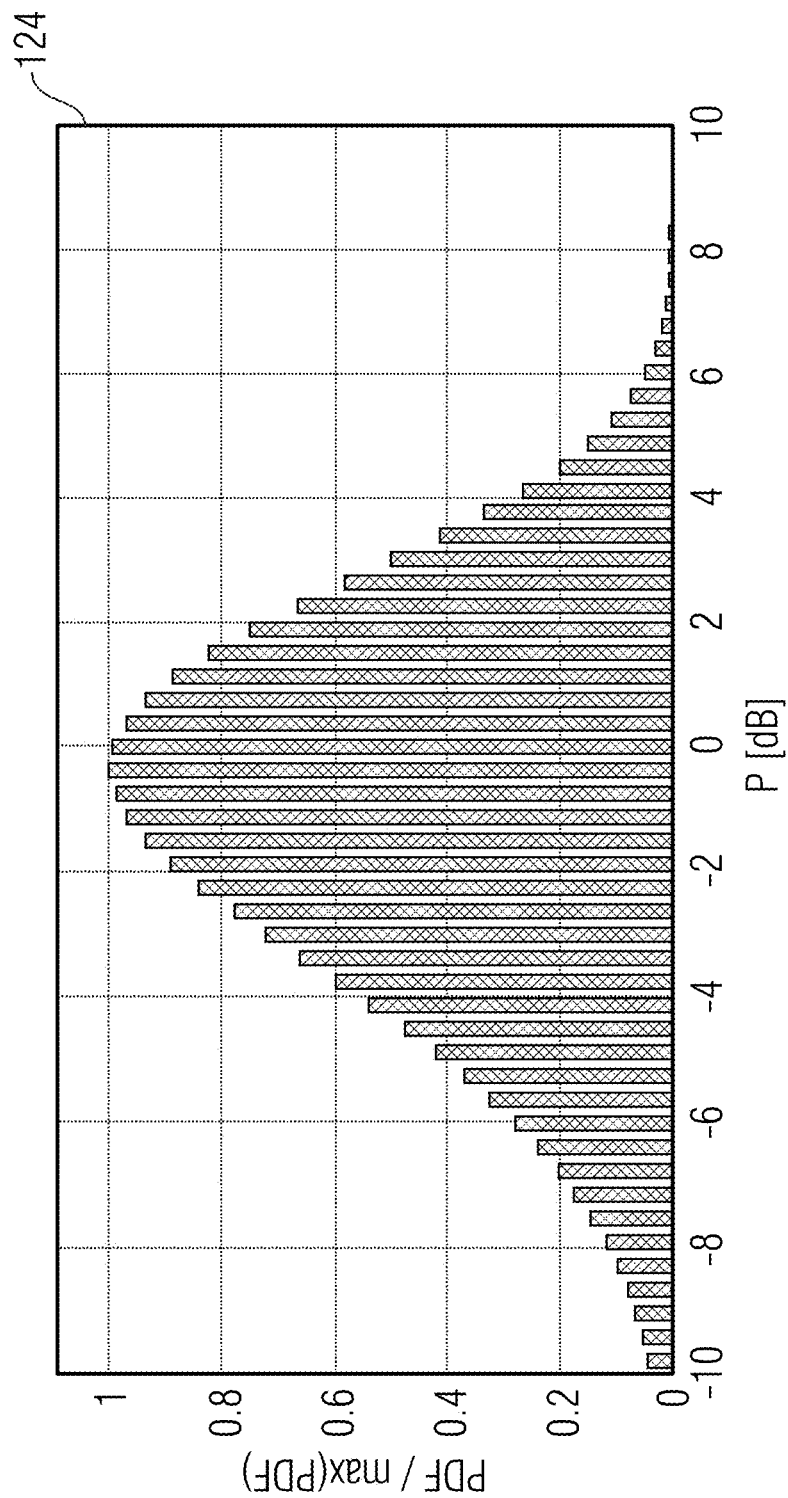
FIG. 30 shows, in a diagram, a measured histogram 124 for PR=0 dB and M=4.

FIG. 30 shows a measured histogram 124 for $P_R=0$ dB and M=4 in a diagram, resulting in two deviations compared to FIG. 29:

1. The measured histogram 124 is wider.
2. The maximum is not 0 dB, but slightly below.

Both deviations are caused by the correlation of the measured power values in the time and frequency direction. While the larger width is insignificant, the displacement of the maximum entails a correction with a constant factor, which has to be determined by simulation, since no analytical term is available.

The maximum can be determined by a parabola approximation using the values in the vicinity of the maximum. Due to the asymmetry of the distribution, a small error occurs, which can also be corrected by the correction factor mentioned above.

If a particularly high accuracy is used, a reference curve can be used and the position of the maximum can be determined by correlating the values of histogram 124 with the values of the reference curve (maximum likelihood method). The values of the reference curve can be determined by simulation, in which a much greater signal length is used than in the specific application.

In practice, slow changes of the noise power $P_R$ are expected. In order to be able to follow these changes, in embodiments the power values can be evaluated block by block, as shown in FIG. 31.

Figure 31:
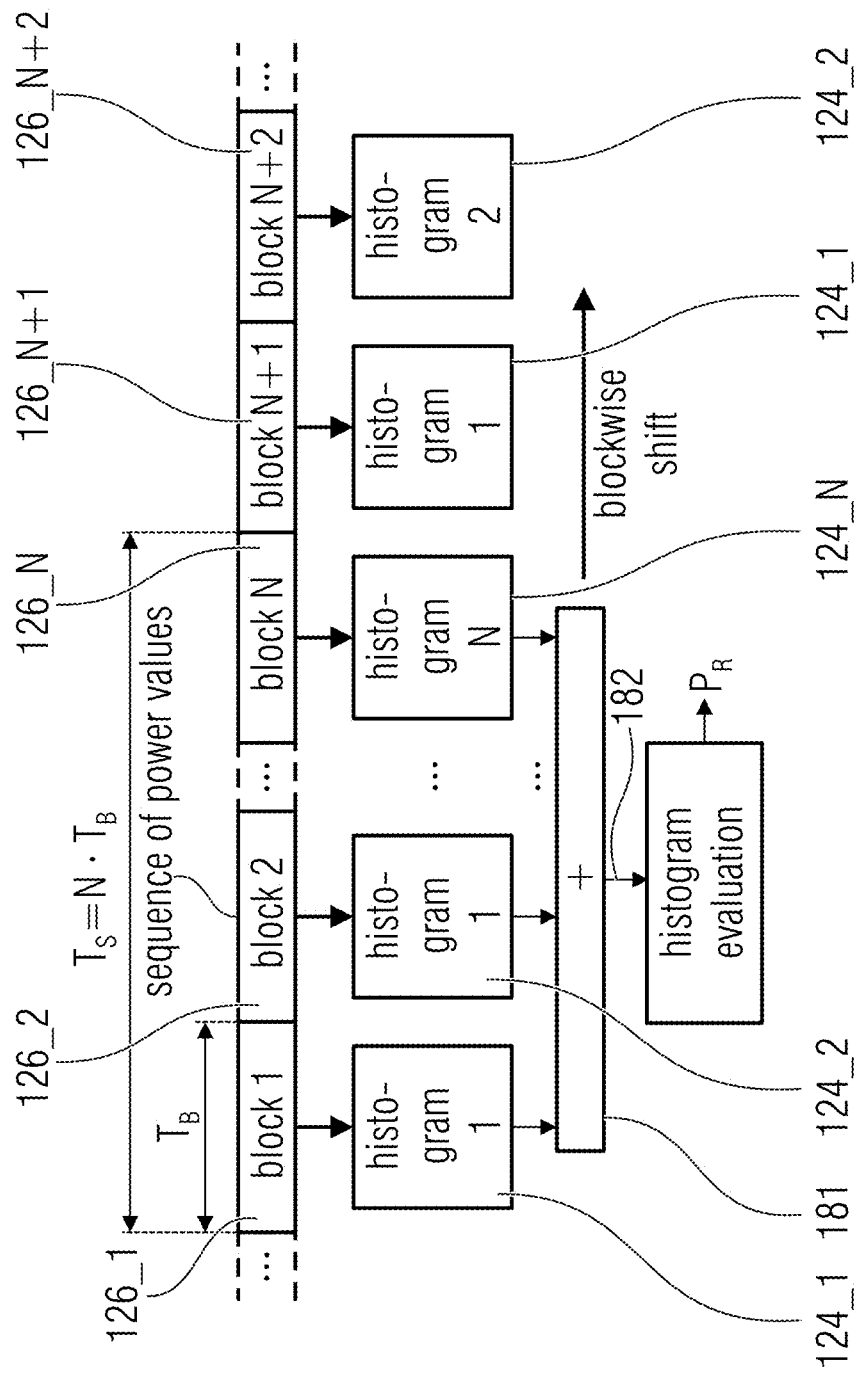
FIG. 31 shows a schematic view of calculation and evaluation of the histograms, according to an embodiment.

FIG. 31 shows a schematic view of a calculation and evaluation of the histograms according to an embodiment. As can be seen in FIG. 31, the power values of all averaged power density spectra occurring within a block duration TB can be combined to form a block 126_1 to 126_N. For each block 126_1 to 126_N, a separate histogram 124_1 to 124_N can be calculated. Subsequently, N consecutive histograms 124_1 to 124_N are added 181 and evaluated. The histograms can be described cyclically, i.e. the histogram 1 124_1 is used again for block N+1. Successive values of the noise power $P_R$ result from the blockwise shift indicated in FIG. 31. Due to the cyclical use of the histograms, no special measures are required to realize this shift.

In practice, however, the noise power $P_R$ is estimated by adding the N histograms 124_1 to 124_N and evaluating the resulting sum histogram 182 only if a packet was detected and the noise power $P_R$ is actually used according to FIG. 27. Once estimated, the noise power $P_R$ remains valid until a further block has been processed, i.e. the noise power $P_R$ is estimated only once per block duration TB, even if a large number of packets are detected.

For the calculation of histograms 124_1 to 124_N, the logarithm of the power values can be used. Since the accuracy requirements for this logarithm formation are very low due to the granularity of the histogram, very rough approximations can be used for the logarithm. Because of the binary representation of fixed-point and floating-point numerical values in processors, it is advisable to use the binary logarithm with base 2 instead of the decadic logarithm. This is particularly easy to do with floating point values, since these values are already represented in the value=mantissa2$^{exponent}$.

and the mantissa and the exponent can be extracted from the binary representation with simple bit operations. The following applies:

log$_2$(value)=exponent+log$_2$(mantissa)

The binary logarithm of the mantissa can also be easily determined, since the mantissa is restricted to the following value range:

0.5≤mantissa<1

In practice, the most significant bits (MSB) are taken from the mantissa and mapped using a correction table. The implemented correlation is as follows:

log$_2$(value)=exponent+table(MSB(mantissa))

The following C program code implements this procedure in case the 8 most significant bits of the mantissa are used as index into a correction table with 256 values and the resulting result has 4 bits after the decimal point, i.e. the binary logarithm is accurate to 1/16.

```
int LogApprox::log2FracTab[256] =
{
0, 0, 0, 0, 0, 0,
1, 1, 1, 1, 1, 1, 1, 1, 1, 1, 1, 1,
2, 2, 2, 2, 2, 2, 2, 2, 2, 2, 2, 2,
3, 3, 3, 3, 3, 3, 3, 3, 3, 3, 3,
4, 4, 4, 4, 4, 4, 4, 4, 4, 4, 4, 4, 4, 4,
5, 5, 5, 5, 5, 5, 5, 5, 5, 5, 5, 5, 5,
6, 6, 6, 6, 6, 6, 6, 6, 6, 6, 6, 6, 6, 6, 6,
7, 7, 7, 7, 7, 7, 7, 7, 7, 7, 7, 7, 7, 7, 7,
8, 8, 8, 8, 8, 8, 8, 8, 8, 8, 8, 8, 8, 8, 8,
9, 9, 9, 9, 9, 9, 9, 9, 9, 9, 9, 9, 9, 9, 9, 9, 9,
10, 10, 10, 10, 10, 10, 10, 10,
10, 10, 10, 10, 10, 10, 10, 10, 10,
11, 11, 11, 11, 11, 11, 11, 11, 11,
11, 11, 11, 11, 11, 11, 11, 11, 11,
12, 12, 12, 12, 12, 12, 12, 12, 12,
12, 12, 12, 12, 12, 12, 12, 12, 12,
13, 13, 13, 13, 13, 13, 13, 13, 13, 13,
13, 13, 13, 13, 13, 13, 13, 13, 13, 13,
14, 14, 14, 14, 14, 14, 14, 14, 14, 14,
14, 14, 14, 14, 14, 14, 14, 14, 14, 14,
15, 15, 15, 15, 15, 15, 15, 15, 15, 15,
15, 15, 15, 15, 15, 15, 15, 15, 15, 15,
16, 16, 16, 16, 16, 16, 16, 16, 16, 16
};
int log2int4(float x)
{
union
{
int32_t i;
float f;
} xif;
xif.f = x;
return ((xif.i >> 19) & 4080)
+ log2FracTab[(xif.i >> 15) & 255];
}
```

For fixed-point numerical values, a conversion to a representation with mantissa and exponent can be done first; for this purpose, the number of leading zero bits of the fixed-point value can be determined and the value be shifted accordingly. Many processors have a special command to determine the number of leading zero bits, e.g. CLZ (Count Leading Zeros).

The limitation of the accuracy to 1/16 corresponds to a resolution of the power values of 0.188 dB and is therefore already more than sufficient for the histogram calculation. Depending on the application, the accuracy can be reduced to ⅛ or ¼ by rounding.

Limiting the accuracy also allows efficient calculation without prior range checking of the power values. The fixed-point result of the C function log$_2$ int4 is used as index to the histogram to be calculated either directly or after rounding to 3 or 2 decimal bits. In this case, the histogram has the lengths and resolutions shown in the following table:

| decimal point bits | resolution in dB | histogram length |
| --- | --- | --- |
| 4 | 0.188 | 4096 |
| 3 | 0.376 | 2048 |
| 2 | 0.752 | 1024 |

However, these lengths only apply to the actual calculation. For storage in the N histogram memories shown in FIG. 31, the value range can be limited; the N histogram memories then contain only the relevant section of the calculated histogram and a shift value. In this case, the addition of the N histograms is done under consideration of the shift values. For the selection of the respective relevant section, there are several efficient methods, which are not subject of this idea.

Simplified Estimation of Noise Power

A histogram processing based on all available power values can, under certain circumstances, lead to a considerable computing effort. For this reason, the following describes embodiments, with which a reduction of the computing time can be achieved under certain conditions.

In embodiments, not all relevant power values of the averaged power density spectra are included in the histogram calculation, but first characteristic values are formed and only these characteristic values are evaluated by means of histograms. The following are used as characteristic values:

1. the sum of the relevant power values
2. the minimum of the relevant power values.

The selection of these variables is motivated by the processing capabilities in modern processors with SIMD (Single Instruction Multiple Data) instruction set. The calculation of the power values by absolute square formation of the complex-valued output values of the DFT filter bank, averaging with M=4, formation of the sum and determining the minimum can be performed very efficiently using SIMD instructions. However, this means special assembler programming.

The processing shown in FIG. 31 is carried out in parallel for the total values and the minima. However, this reduces the number of values to be processed in a block and thus also the number of values in the histograms by a factor which corresponds to the number of relevant power values in a power density spectrum. In other words: The frequency dimension in FIG. 28 disappears and only two values are processed per time step. FIG. 32a shows the usual and FIG. 32b the simplified histogram calculation.

Figure 32B:
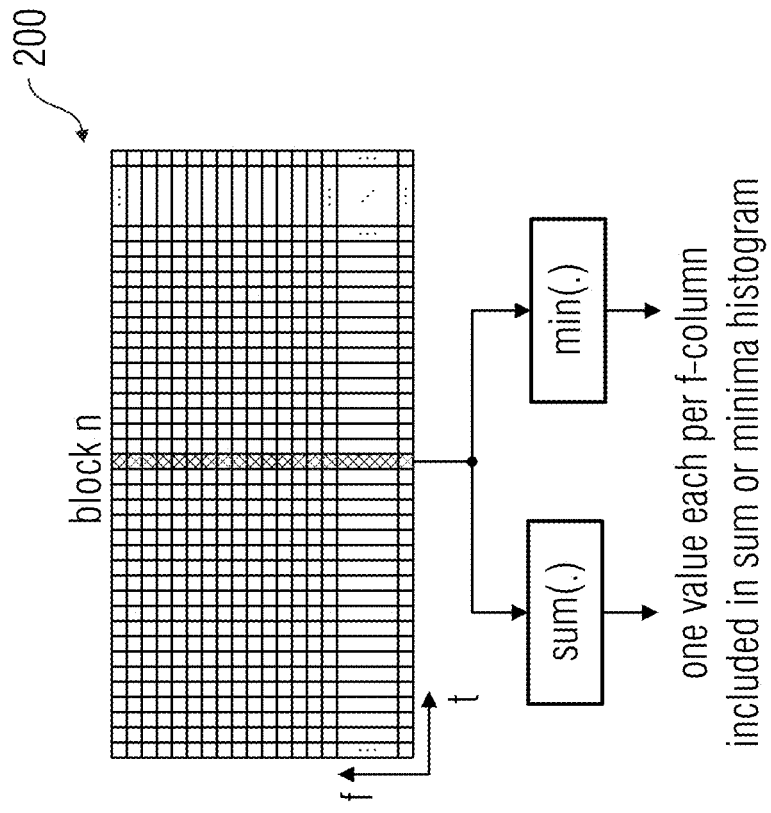
FIG. 32b shows a schematic view of a simplified histogram calculation, according to an embodiment.
Figure 32A:
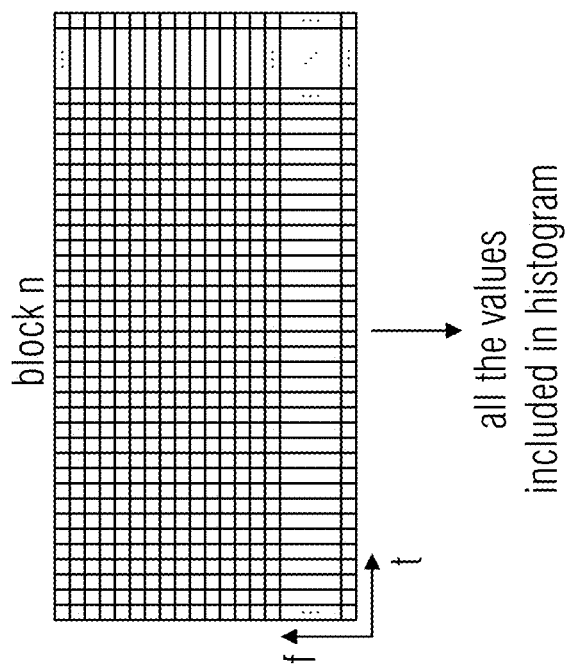
FIG. 32a shows a schematic view of an ordinary histogram calculation.

As can be seen in FIG. 32b, in embodiments, the data receiver 110 (e.g. the packet detector 180 of the data receiver 110) can be configured to determine power information (e.g. reception powers, logarithmic reception powers) of samples or symbols of an equal temporal signal portion of the plurality of subband signals, for example to obtain a two-dimensional array 200 of power information, where a first dimension (in FIG. 32b the y-axis (frequency axis)) of the two-dimensional array 200 describes the plurality of subband signals and a second dimension (in FIG. 32b the x-axis (time axis)) of the two-dimensional array 200 describes the sampling instants.

Furthermore, the data receiver 110 (e.g. the packet detector 180 of the data receiver 110) can be configured to perform summation over the respective power information of the two-dimensional array 200 for each sampling instant of the signal portion, to obtain a set of sum power information for the signal portion, and to form a sum histogram over the set of sum power information. For example, the determined power information can form a matrix of power information, wherein rows of the matrix describe the plurality of subband signals, wherein columns of the matrix describe sampling instants, wherein the data receiver 110 can be configured to perform the summation over the respective power information column by column.

Furthermore, the data receiver 110 (e.g. the packet detector 180 of the data receiver 110) can be configured to perform a minimum formation (e.g. minimum search) over the respective power information of the two-dimensional array 200 for each sampling instant of the signal portion, to obtain a set of minimum power information for the signal portion, and to form a minimum histogram over the set of minimum power information. For example, the determined power information can form a matrix of power information, where rows of the matrix describe the plurality of subband signals, where columns of the matrix describe sampling instants, wherein the data receiver 110 can be configured to perform the minimum formation over the respective power information column by column.

In other words, as shown in FIG. 32b, the estimation of the noise power $P_R$ can be done by parallel estimation of two noise powers:

1. noise power $P_{R,sum}$ from the N sum histograms
2. noise power $P_{R,min}$ from the N minima histograms The noise power $P_{R,sum}$ is highly accurate, but only matches the actual noise power $P_R$ if there are a sufficient number of instants or f-columns in which no or only weak intrinsic or external signals are present. This is, for example, the case in the left part of the signal scenario shown in FIG. 28. In the right part of the scenario shown in FIG. 28, however, a too high value will always be estimated if the two horizontally running external signals are active for a longer period of time and together have a power which is in the range of or exceeds the total noise power in the relevant bands. The same problem occurs when there are considerably more intrinsic signals with comparatively high power. In this case, although there is no constant power as with the two external signals, the power in the relevant bands is higher than the total noise power at all times. In both cases, the estimated noise power $P_{R,sum}$ is greater than the actual noise power $P_R$.

In the mentioned problem cases, the noise power $P_{R,min}$ serves as a substitute value. It is much less accurate; thus, the comparison with the noise power $P_{R,sum}$ and the selection are made using a threshold factor $k_P$=1.2 . . . 1.4:

$$\begin{aligned}&\text{if } (P_{R,sum} > k_P \cdot P_{R,min}) \\ &\quad P_R = P_{R,min} \\ &\text{else} \\ &\quad P_R = P_{R,sum} \\ &\text{end}\end{aligned}$$

The following relations exist between the maxima determined from the N added sum or minimum histograms and the powers $P_{R,sum}$ or $P_{R,min}$:

1. For the sum histograms, all values were added in an f-column. Accordingly, the value resulting from the maximum can be divided by the number of values to obtain the noise power $P_{R,sum}$. Usually, no correction factor is used.
2. With the minima histograms, the correlation is much more complicated. Numerous simulations suggest a factor of the form (number of values)$^K$ with K= 0.4 . . . 0.45, but it is recommended to determine the factor by simulation.

Figure 33:
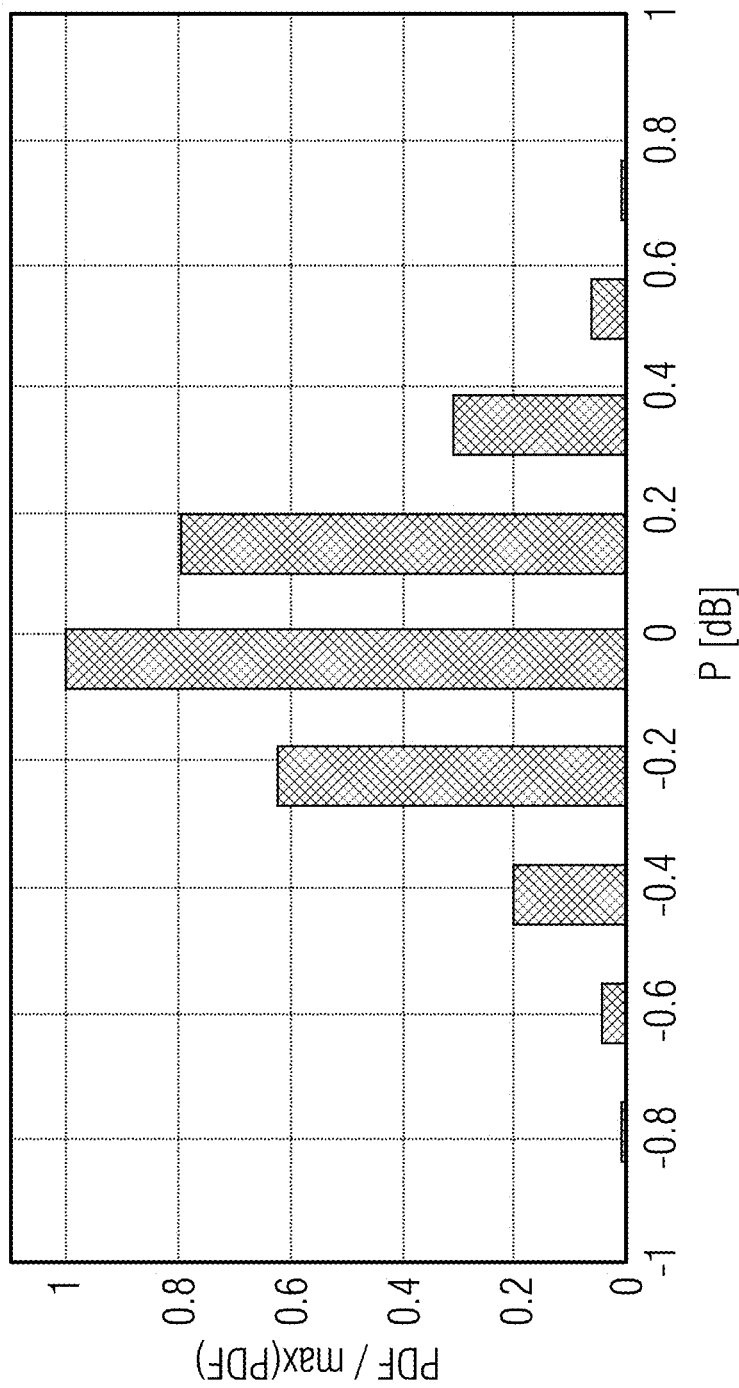
FIG. 33 shows, in a diagram, an example of a sum histogram resulting from the simplified histogram calculation of FIG. 32b.
Figure 34:
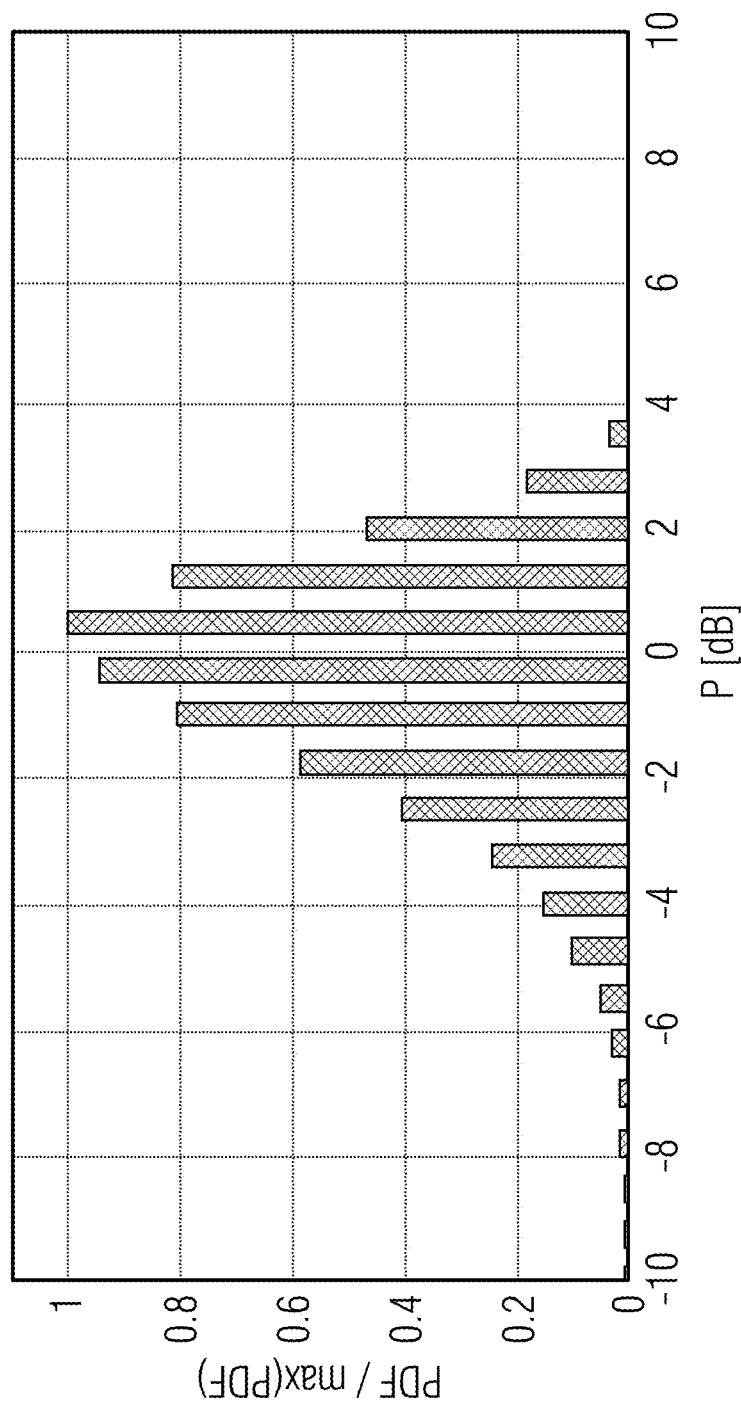
FIG. 34 shows, in a diagram, an example of a minimum histogram resulting from the simplified histogram calculation of FIG. 32b.

FIG. 33 shows an example of a sum histogram in a diagram, while FIG. 34 shows an example of a minimum histogram. In the examples in FIGS. 33 and 34, the sum histogram uses the high resolution with 4 decimal bits and the minimum histogram uses a resolution reduced to 2 decimal bits. FIGS. 33 and 34 show that this results in comparable conditions with regard to determining the maxima. It can also be seen that an accuracy of less than 0.1 dB can be expected in the sum histogram, whereas deviations in the minimum histogram in the range of 0.5 dB can be expected.

The decision whether to use the simplified or the ordinary procedure described in the previous section depends on the circumstances. In scenarios with a large number of intrinsic and external signals, adequate disturber models are used to check how the noise power estimated with the simplified method behaves with increasing utilization of the frequency band. This depends strongly on the signal-to-noise ratio (SNR) of the signals. Signals with high SNR are shown in the histograms to the right of the searched maxima and practically do not influence the evaluation. In contrast, signals with an SNR in the range around 0 dB enter the range relevant for evaluation.

Processing in the Packet Decoder

Figure 35:
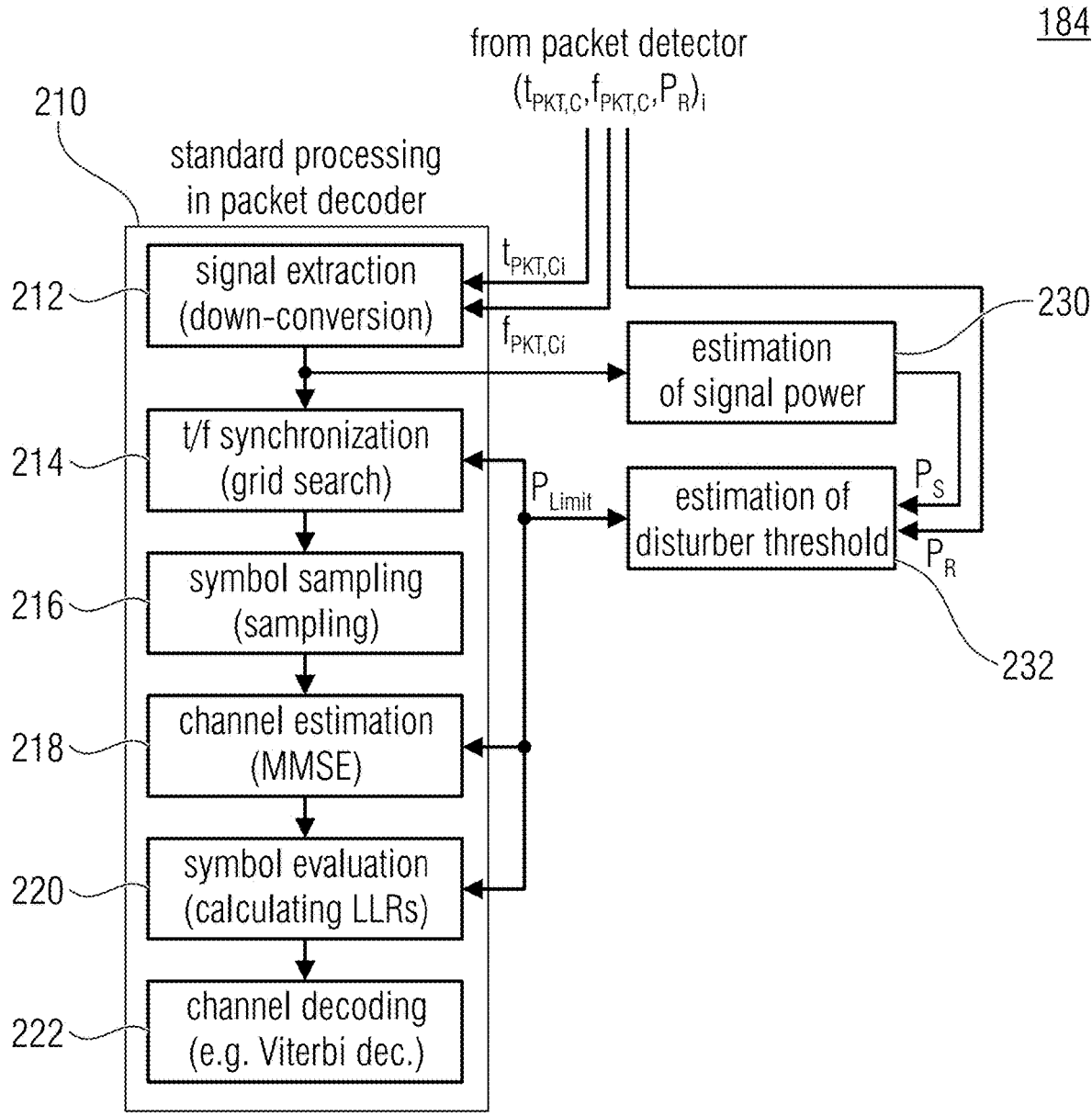
FIG. 35 shows a schematic block diagram of a packet decoder of the data receiver, according to an embodiment.

FIG. 35 shows a schematic block diagram of a packet decoder 184 of the data receiver 110 according to an embodiment. The packet decoder 184 comprises standard processing 210 comprising signal extraction 212, t/f synchronization 214, symbol sampling 216, channel estimation 218, symbol evaluation 220 and channel decoding 222. Further, the packet decoder 184 comprises a signal power estimation 230 configured to estimate a signal power to obtain an estimated signal power $P_S$ and a disturber threshold estimation 232 configured to obtain a disturber threshold $P_{Limit}$ based on the estimated signal power $P_S$ and the noise power $P_R$ estimated by the packet detector 180.

The central quantity of disturber suppression is the estimation of the disturber threshold $P_{Limit}$ from the estimated noise power $P_R$, which is taken from the packet detector 180, and the estimated signal power $P_S$, which is obtained from the relevant signal portions. The relevant signal portions are provided by the signal extraction, which is based on the indication provided by the packet detector 180 regarding the temporal ($t_{PKT,Ci}$) and frequency ($f_{PKT,Ci}$) position of the packet. The pair of values ($t_{PKT,Ci}$, $f_{PKT,Ci}$) represents all the parameters used to locate the signal portions of the packet. In the case of packets consisting of partial packets distributed in the time and frequency direction, this includes information on the position of the partial data packets 142 or information on the hopping patterns used to derive the position of the partial data packets 142.

For processing reasons, the signals of the DFT filter bank of the packet detector 180 are usually not used in the packet decoder 184, but separate processing based on the broadband signal is performed. How the relevant signal portions are provided in the course of signal extraction is irrelevant for further processing in the packet decoder 184 and thus also for disturber suppression.

The estimation of the signal power $P_S$ is based on the power values of the relevant signal portions. For this purpose, the same method is used as for determining the noise power $P_R$ in the packet detector 180. However, only a single histogram is formed, which includes all the power values of the relevant signal portions.

The calculation of the disturber threshold $P_{Limit}$ is performed under the assumption of a Gaussian distribution of the power values, where the mean value μ of the distribution is given by the root of the signal power $P_S$ and the standard deviation σ of the distribution is given by the root of the sum of the noise power $P_R$ and an "intrinsic noise" $P_{RS}$. In this case, it can be assumed that the probability for power values that exceed $$P_{Limit}=(\mu+3\cdot\sigma)^2=(sqrt(P_S)+3\cdot sqrt(P_R+P_{RS}))^2$$

is negligibly low. In practice, however, this correlation only serves as a starting point for optimization by simulation. The optimal values depend on the modulation of the packets and the robustness of the processing steps against estimation errors of the disturber threshold.

Figure 36:
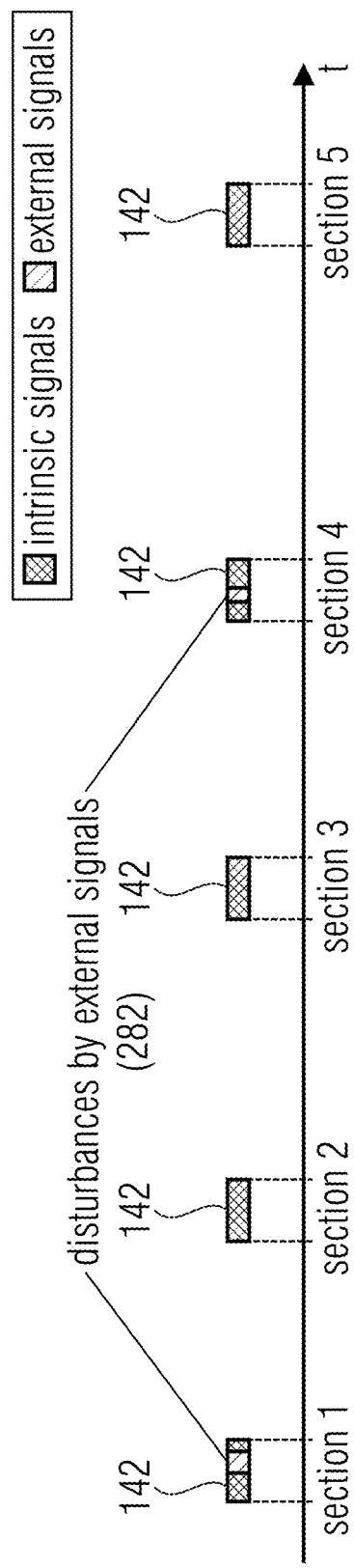
FIG. 36 shows, in a diagram, a schematic view of five partial data packets, wherein two of the partial data packets are disturbed by external signals.

As an example for the processing in packet decoder 184, it can be assumed that the intrinsic signals shown in the signal scenario in FIG. 28 in band 2 form a packet with 5 partial data packets 142. This results in the signal portions shown in FIG. 36. In this case, portions 1 and 4 are disturbed by external signals. Disturbances by intrinsic signals of other packets are also possible, but are not present here.

The disturber threshold $P_{Limit}$ can be used in the processing steps 214, 218, 220, to which $P_{Limit}$ is assigned in FIG. 35, to exclude signal components or symbols whose power exceeds the disturber threshold from processing. The way in which this is done depends on the processing step:

In t/f synchronization, those parts of the signal portions whose power exceeds the disturber threshold can be excluded from processing. For packets with many partial data packets 142, where each partial data packet 142 contains synchronization symbols, it is alternatively possible to completely exclude from t/f synchronization all the partial data packets 142 in which the signal exceeds the disturber threshold in the range of the synchronization symbols.

In channel estimation, the symbols whose power exceeds the disturber threshold can be excluded from processing or set to zero.

In symbol evaluation, the Log Likelihood Ratios (LLR) of the symbols whose power exceeds the disturber threshold can be set to zero.

The effectiveness of disturber suppression depends on the power of the disturber compared to the power of the relevant signal portions. If the disturbers have a lower power, they cannot be detected, but then they usually do not have a serious effect. If the disturbers have a significantly higher power, they are clearly visible in the histogram for determining the signal power $P_S$ and are therefore also significantly above the disturber threshold $P_{Limit}$. Disturbers whose power is in the range of the power of the partial data packets 142 or slightly above are critical. In this case, the components overlap in the histogram and a correct determination of the signal power is no longer possible. In this case, however, disturber suppression by excluding certain signal components or symbols from processing is practically impossible, so that the method is no longer suitable in this case anyway.

Embodiments provide a method for disturber suppression when receiving packets in packet-oriented radio transmission systems, characterized by an estimation of the noise power by means of histogram formation on the basis of the output values of a filter bank according to FIG. 27.

Embodiments provide a method for disturber suppression when receiving packets in packet-oriented radio transmission systems, characterized by an efficient calculation of histograms using the binary number representation of the power values according to the above C program code.

Embodiments provide a method for disturber suppression when receiving packets in packet-oriented radio transmission systems, characterized by a floating estimation of the noise power according to FIG. 31.

Embodiments provide a method for disturber suppression when receiving packets in packet-oriented radio transmission systems, characterized by an optional simplified calculation with separate histograms for the sums and the minima of the power values according to the arrangement shown in FIG. 32b including the mentioned selection between the two estimated noise power values PR,sum and PR,min.

Embodiments provide a method for disturber suppression when receiving packets in packet-oriented radio transmission systems, characterized by an estimation of the signal power by means of histogram formation on the basis of the relevant signal portions according to FIG. 35.

Embodiments provide a method for disturber suppression when receiving packets in packet-oriented radio transmission systems, characterized by determining a disturber threshold according to FIG. 35.

Embodiments provide a method for disturber suppression when receiving packets in packet-oriented radio transmission systems, characterized by the use of the disturber threshold in the relevant processing steps of a packet decoder with the aim of excluding disturbed signal portions or symbols from processing or setting them to zero.

10. Further Embodiments

Figure 37:
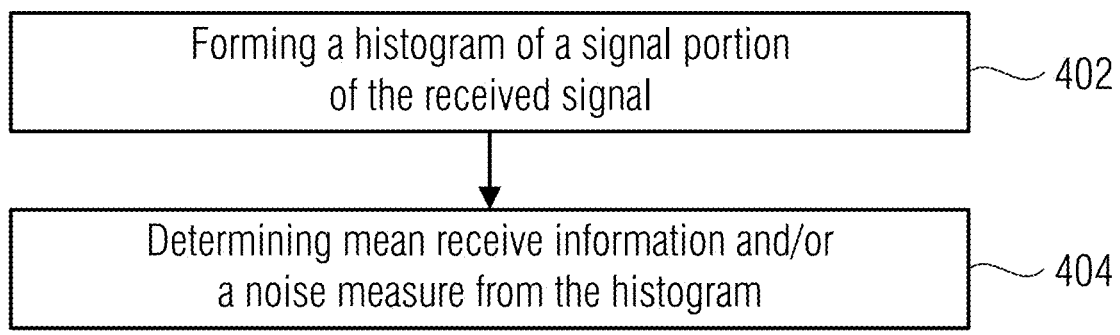
FIG. 37 shows a flowchart of a method for receiving a signal, according to an embodiment.

FIG. 37 shows a flowchart of a method 400 for receiving a signal, signal comprising interferences of an interference-infested transmission channel. The method 400 comprises a step 402 of forming a histogram over a signal portion of the received signal. Furthermore, the method 400 comprises a step 404 of determining mean receive information and/or a noise measure from the histogram.

Figure 38:
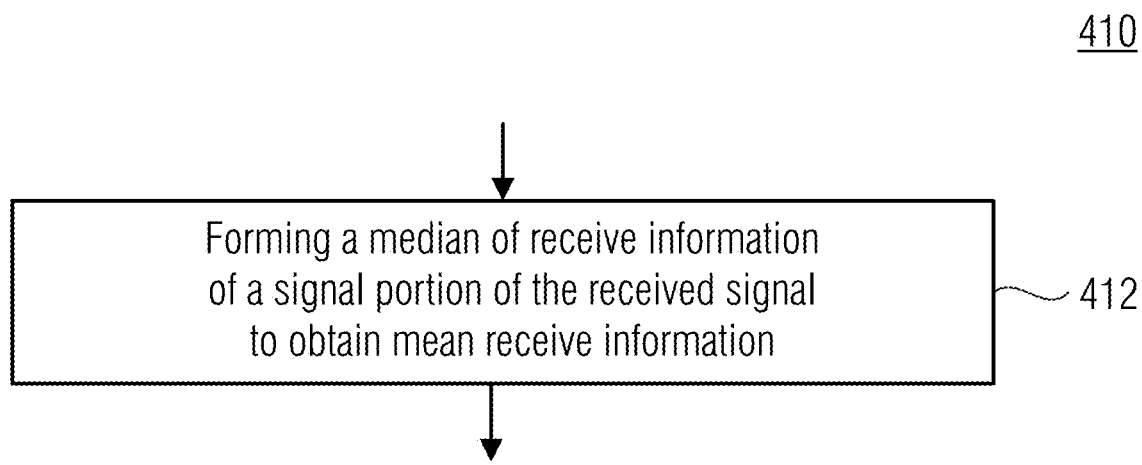
FIG. 38 shows a flowchart of a method for receiving a signal, according to another embodiment.

FIG. 38 shows a flowchart of a method 410 for receiving a signal, the signal comprising interferences of an interference-infested transmission channel. The method 410 comprises a step 412 of forming a median over receive information of a signal portion of the received signal to obtain mean receive information.

Figure 39:
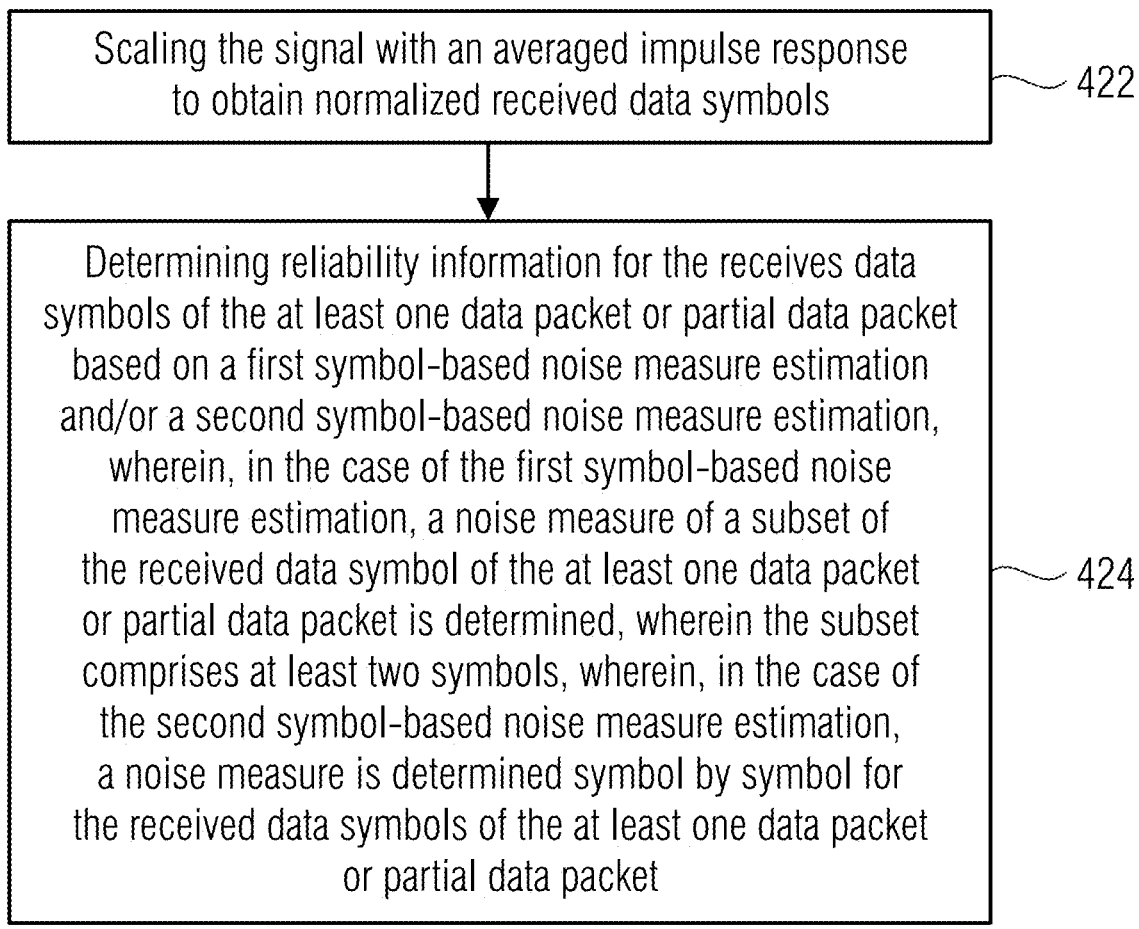
FIG. 39 shows a flowchart of a method for receiving a signal, according to another embodiment.

FIG. 39 shows a flowchart of a method 420 for receiving a signal, the signal comprising interferences of an interference-infested transmission channel, the signal comprising at least one data packet or partial data packet transferred over the interference-infested channel. The method 420 comprises a step 422 of scaling the signal with an averaged impulse response to obtain normalized received data symbols. The method 420 further comprises a step 424 of determining reliability information for the received data symbols of the at least one data packet or partial data packet based on a first symbol-based noise measure estimation and/or a second symbol-based noise measure estimation, wherein in the case of the first symbol-based noise measure estimation, a noise measure is determined over a subset of the received data symbols of the at least one data packet or partial data packet, the subset comprising at least two symbols, wherein in the case of the second symbol-based noise measure estimation, a noise measure is determined symbol by symbol for the received data symbols of the at least one data packet or partial data packet.

Figure 40:
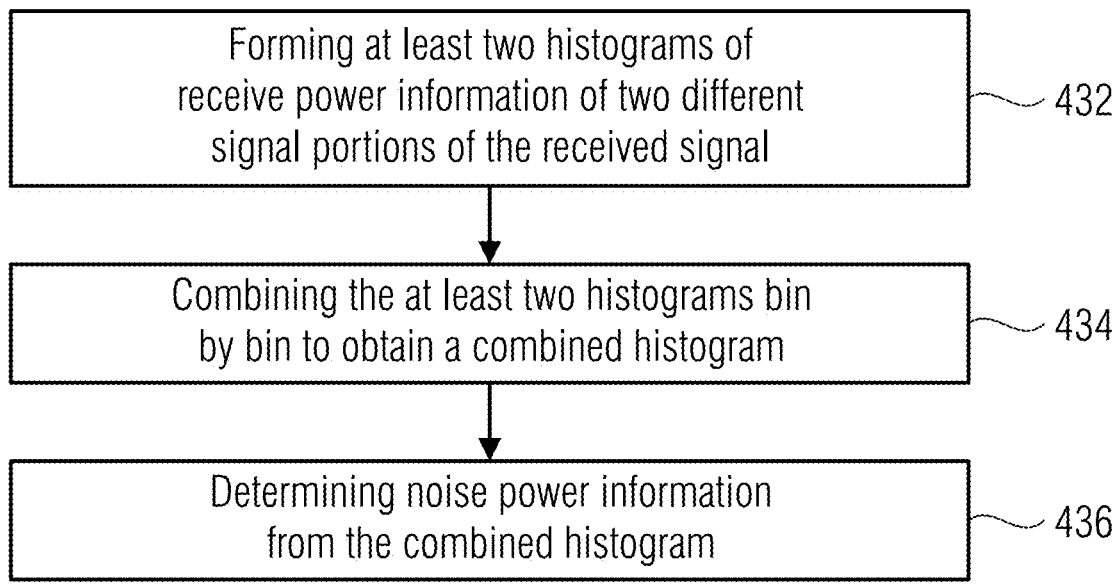
FIG. 40 shows a flowchart of a method for receiving a signal, according to another embodiment.

FIG. 40 shows a flowchart of a method 430 for receiving a signal, the signal comprising interferences of an interference-infested transmission channel. The method 430 comprises a step 432 of forming at least two histograms of reception power information of two different signal portions of the received signal. Further, the method 430 comprises a step 434 of bin-wise combining the at least two histograms to obtain a combined histogram. The method 430 further comprises a step 436 of determining noise power information from the combined histogram.

Figure 41:
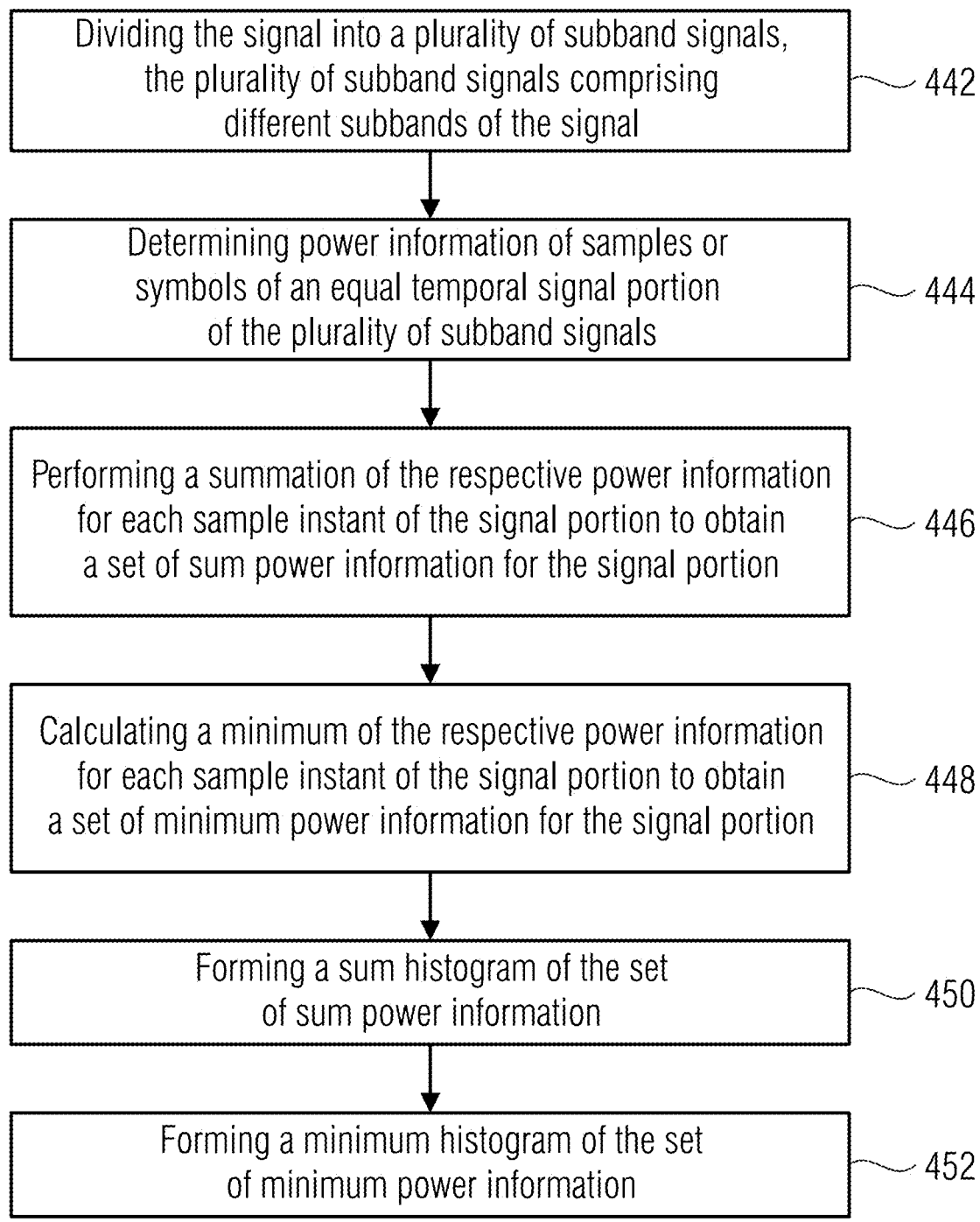
FIG. 41 shows a flowchart of a method for receiving a signal, according to another embodiment.

FIG. 41 shows a flowchart of a method 440 for receiving a signal, the signal comprising interferences of an interference-infested transmission channel. The method 440 comprises a step 442 of dividing the signal into a plurality of subband signals, the plurality of subband signals comprising different subbands of the signal. The method 440 further comprises a step 444 of determining power information of samples or symbols of an equal temporal signal portion of the plurality of subband signals. Further, the method 440 comprises a step 446 of performing summation for each sampling instant of the signal portion over the respective power information to obtain a set of sum power information for the signal portion. The method 440 further comprises a step 448 of performing a minimum formation for each sampling instant of the signal portion over the respective power information to obtain a set of minimum power information for the signal portion. The method 440 further comprises a step 450 of forming a sum histogram of the set of sum power information. The method 440 further includes a step 452 of forming a minimum histogram of the set of minimum power information.

Embodiments of the present invention are used in a system for transferring data from a transmitter to a receiver. The concepts described here apply to any transfer if the channel is not coordinated (ALOHA or slotted-ALOHA access method) and/or the transfer takes place in a non-exclusive band (e.g. ISM band).

In these cases, during the transmission of the data, interference with another participant of the same network or with participants of another transfer may occur.

During this disturbance by the other party, the transferred data (symbols) are corrupted. These disturbed data can be restored with the help of a FEC (forward error correction), wherein the performance of the FEC is strongly dependent on whether it is known which data are disturbed.

Embodiments of the present invention relate to determining the disturbed symbols of a transfer. There are different approaches to this.

In embodiments, the transmit power and noise variance in static channels can be determined.

In embodiments, detection and suppression of disturbances in static channels can be done based on transmit power and noise variance.

In embodiments, two-stage detection and suppression of disturbances can be performed during application before synchronization.

Although some aspects have been described in the context of an apparatus, it is clear that these aspects also represent a description of the corresponding method, such that a block or element of an apparatus also is to be understood as a respective method step or feature of a method step. Analogously, aspects described in the context with or as a method step also represent a description of a corresponding block or item or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, Blu-Ray disc, CD, ROM, PROM, EPROM, EEPROM or FLASH memory, a hard drive or another magnetic or optical memory having electronically readable control signals stored thereon, which cooperate or are capable of cooperating with a programmable computer system such that the respective method will be performed. Therefore, the digital storage medium may be computer-readable.

Some embodiments according to the invention include a data carrier comprising electronically readable control signals, which are capable of cooperating with a programmable computer system such that one of the methods described herein will be performed.

Generally, embodiments of the present invention can be implemented as a computer program product with program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium or the computer-readable medium are typically concrete or objective and/or non-transitory.

A further embodiment of the inventive method is, therefore, a data stream or a sequence of signals representing the computer program for performing one of the methods described herein. The data stream or the sequence of signals may, for example, be configured to be transferred over a data communication connection, for example over the Internet.

A further embodiment comprises processing means, for example a computer or a programmable logic device, configured or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transmission can, for example, be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods are performed by any hardware apparatus. This can be a universally applicable hardware, such as a computer processor (CPU), or hardware specific for the method, such as ASIC.

The apparatuses described here may, for example, be implemented using a hardware apparatus or using a computer or using a combination of a hardware apparatus and a computer.

The apparatuses described here or any components of the apparatuses described here may be implemented, at least partly, in hardware and/or in software (computer program).

The methods described here may, for example, be implemented using a hardware apparatus or using a computer or using a combination of a hardware apparatus and a computer.

The methods described here or any components of the methods described here may be executed, at least partly, by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ABBREVIATIONS

FEC forward error correction
LLR log likelihood ratio

BIBLIOGRAPHY

[1] G. Kilian, H. Petkov, R. Psiuk, H. Lieske, F. Beer, J. Robert, and A. Neuberger, "Improved coverage for low-power telemetry systems using telegram splitting," in Proceedings of 2013 European Conference on Smart Objects, Systems and Technologies (SmartSysTech), 2013
[2] G. Kilian, M. Breiling, H. H. Petkov, H. Lieske, F. Beer, J. Robert, and A. Neuberger, "Increasing Transmission Reliability for Telemetry Systems Using Telegram Splitting," IEEE Transactions on Communications, vol. 63, no. 3, pp. 949-961, March 2015.
[3] https://de.wikipedia.org/wiki/Halbwertsbreite, last retrieval: 31 Jan. 2018
[4] https://de.wikipedia.org/wiki/Normalverteilung, last retrieval: 5 Feb. 2018
[5] B. Friedrichs, "Kanalcodierung. Grundlagen and Anwendungen in modernen Kommunikationssystemen", Springer-Verlag, 1994.
[6] Hans Lohninger: Savitzky-Golay-Filter—Koeffizienten. Grundlagen der Statistik, Mar. 19, 2011
[7] DE1020011082098.1
[8] PCT/EP2015/053947

The invention claimed is:

1. A data receiver, comprising:
at least one hardware processor executing instructions that cause the data receiver to:
receive a signal and scale the same with an averaged impulse response to acquire normalized received data symbols, the signal comprising interferences of an interference-infested transmission channel, the signal comprising at least one data packet or partial data packet which is transferred over the interference-infested channel,
determine reliability information for the received data symbols of the at least one data packet or partial data packet based on a first symbol-based noise measure estimation and/or a second symbol-based noise measure estimation,
in the case of the first symbol-based noise measure estimation, determine a noise measure of a subset of the received data symbols of the at least one data packet or partial data packet, the subset comprising at least two symbols,
in the case of the second symbol-based noise measure estimation, determine a noise measure symbol by symbol for the received data symbols of the at least one data packet or partial data packet.

2. The data receiver in accordance with claim 1,
wherein the data receiver is configured to, in the case of the first symbol-based noise measure estimation, determine the noise measure of noise values of a first subset of the received data symbols of the at least one data packet or partial data packet.

3. The data receiver in accordance with claim 1,
wherein the data receiver is configured to, in the case of the first symbol-based noise measure estimation, determine a first noise measure of a first subset of the data symbols of the at least one data packet or partial data packet and a second noise measure of a second subset of the data symbols of the at least one data packet or partial data packet.

4. The data receiver in accordance with claim 1,
wherein the data receiver is configured to, in the case of the second symbol-based noise measure estimation, determine a noise measure for the received data symbols of the at least one data packet or partial data packet symbol by symbol based on a noise value of the respective data symbol and at least one noise value of an adjacent data symbol.

5. The data receiver in accordance with claim 1,
wherein the data receiver is configured to determine an interference rate of the interference-infested channel and to determine, in dependence on the determined interference rate, the reliability information for the received symbols of the at least one data packet or partial data packet either based on the first symbol-based noise measure estimation or based on the second symbol-based noise measure estimation.

6. The data receiver in accordance with claim 1,
wherein the data receiver is configured to determine the reliability information for the received symbols of the at least one data packet or partial data packet separately based on the first noise measure estimation and the second noise measure estimation to acquire first reliability information and second reliability information and combine the same for further processing (like decoding).

7. The data receiver in accordance with claim 1,
wherein the data receiver is configured to determine the reliability information for the received data symbols of the at least one data packet or partial data packet separately based on the first symbol-based noise measure estimation and the second symbol-based noise measure estimation to acquire first reliability information and second reliability information for separate further processing.

8. The data receiver in accordance with claim 1,
wherein the signal comprises a plurality of partial data packets,
wherein the data receiver is configured to determine impulse responses of the plurality of partial data packets,
wherein the data receiver is configured to determine the averaged impulse response based on the determined impulse responses.

9. The data receiver in accordance with claim 8,
wherein the data receiver is configured to determine the impulse response of the respective partial data packet by averaging a synchronization symbols and the reception signal values comprising the synchronization symbols.

10. The data receiver in accordance with claim 9,
wherein the data receiver is configured to determine a noise power of the respective partial data packet based on the impulse response or a real-valued version of the impulse response.

11. The data receiver in accordance with claim 10,
wherein the data receiver is configured to determine the noise power of the respective partial data packet based on calculating a difference between received symbols of the respective partial data packet and a version of received symbols reconstructed based on the determined impulse response.

12. The data receiver in accordance with claim 10,
wherein the data receiver is configured to determine the averaged impulse response only based on the determined impulse responses of those partial data packets of the plurality of partial data packets, the determined noise powers of which do not exceed a predetermined noise power.

13. The data receiver in accordance with claim 12,
wherein the data receiver is configured to iteratively determine a difference to a respective next higher noise power starting from the mean value of the L smallest noise powers until an increase factor of the respective difference exceeds a predetermined threshold, wherein those partial data packets comprising the respective next higher noise value, the increase factor of which exceeds the threshold, or a greater noise value than the respective next higher noise value, are not considered when determining the averaged impulse response.

14. A method for receiving a signal, the signal comprising interferences of an interference-infested transmission channel, the signal comprising at least one data packet or partial data packet which is transferred over the interference infested channel, the method comprising:
scaling the signal with an averaged impulse response to acquire normalized received data symbols,
determining reliability information for the received data symbols of the at least one data packet or partial data packet based on a first symbol-based noise measure estimation and/or a second symbol-based noise measure estimation,
wherein, in the case of the first symbol-based noise measure estimation, a noise measure of a subset of the received data symbols of the at least one data packet or partial data packet is determined, the subset comprising at least two symbols,
wherein, in the case of the second symbol-based noise measure estimation, a noise measure is determined symbol by symbol for the received data symbols of the at least one data packet or partial data packet.

15. A non-transitory digital storage medium having stored thereon a computer program for performing a method for receiving a signal, the signal comprising interferences of an interference-infested transmission channel, the signal comprising at least one data packet or partial data packet which is transferred over the interference infested channel, wherein the method comprises:
scaling the signal with an averaged impulse response to acquire normalized received data symbols,
determining reliability information for the received data symbols of the at least one data packet or partial data packet based on a first symbol-based noise measure estimation and/or a second symbol-based noise measure estimation,
wherein, in the case of the first symbol-based noise measure estimation, a noise measure of a subset of the received data symbols of the at least one data packet or partial data packet is determined, the subset comprising at least two symbols, wherein, in the case of the second symbol-based noise measure estimation, a noise measure is determined symbol by symbol for the received data symbols of the at least one data packet or partial data packet, when said computer program is run by a computer.

* * * * *